United States Patent
Hwang et al.

(10) Patent No.: US 9,240,916 B2
(45) Date of Patent: Jan. 19, 2016

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG Electronics Inc., Seoul (KR)

(72) Inventors: Jaeho Hwang, Seoul (KR); Sungryong Hong, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/540,405

(22) Filed: Nov. 13, 2014

(65) Prior Publication Data

US 2015/0163083 A1 Jun. 11, 2015

Related U.S. Application Data

(60) Provisional application No. 61/903,400, filed on Nov. 13, 2013, provisional application No. 61/908,169, filed on Nov. 24, 2013.

(51) Int. Cl.
*H04L 27/28* (2006.01)
*H04L 27/26* (2006.01)
*H04L 29/06* (2006.01)
*H04L 1/00* (2006.01)
*H04N 21/236* (2011.01)
*H04N 21/2383* (2011.01)

(52) U.S. Cl.
CPC .......... *H04L 27/2627* (2013.01); *H04L 1/0082* (2013.01); *H04L 69/22* (2013.01); *H04N 21/236* (2013.01); *H04N 21/2383* (2013.01)

(58) Field of Classification Search
CPC ... H04L 1/0071; H04L 5/0053; H04L 1/0041; H04L 5/0007; H04L 27/2602; H04L 1/0072; H04L 27/2626; H04L 1/0058; H04L 1/0625; H04L 49/201; H04N 21/2383; H04N 21/23614; H04N 21/440227; H04N 21/236; H04N 21/2365
See application file for complete search history.

(56) References Cited

U.S. PATENT DOCUMENTS

| | | | |
|---|---|---|---|
| 8,135,020 B1 | 3/2012 | Zhang et al. | |
| 2011/0026636 A1 | 2/2011 | Ko et al. | |
| 2012/0189079 A1 | 7/2012 | Taylor et al. | |
| 2012/0307842 A1* | 12/2012 | Petrov et al. | 370/474 |
| 2012/0314762 A1* | 12/2012 | Herrmann et al. | 375/240.02 |
| 2012/0314786 A1* | 12/2012 | Atungsiri et al. | 375/260 |
| 2012/0327955 A1* | 12/2012 | Herrmann et al. | 370/476 |
| 2013/0039442 A1* | 2/2013 | Smallcomb et al. | 375/308 |
| 2014/0119474 A1* | 5/2014 | Petrov | 375/295 |
| 2014/0126674 A1* | 5/2014 | Petrov | 375/340 |

(Continued)

FOREIGN PATENT DOCUMENTS

| | | |
|---|---|---|
| JP | 2004-88758 A | 3/2004 |
| KR | 1020100003277 A | 1/2010 |
| KR | 1020130122756 A | 11/2013 |

*Primary Examiner* — Khanh C Tran
(74) *Attorney, Agent, or Firm* — Dentons US LLP

(57) ABSTRACT

Disclosed is a method for transmitting broadcast signals, including: formatting input streams to a plurality of data pipes (DPs), wherein the formatting comprises allocating data packets to a payload of a baseband frame (BBF), and adding a header indicating a format of the payload of the baseband frame, and the header comprises at least one of first control information and second control information.

20 Claims, 55 Drawing Sheets

(56) References Cited

U.S. PATENT DOCUMENTS

| | | |
|---|---|---|
| 2015/0003472 A1 | 1/2015 | Sung-hee Hwang et al. |
| 2015/0063357 A1 | 3/2015 | Sung-hee Hwang et al. |
| 2015/0063490 A1* | 3/2015 | Yang et al. .................... 375/295 |
| 2015/0071373 A1* | 3/2015 | Oh et al. ....................... 375/295 |

* cited by examiner

Figure 12

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

Figure 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |

| | |
|---|---|
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC_32 | 32 |

Figure 14

| Content | Bit |
|---|---|
| FIC_FLAG | 1 |
| AUX_FLAG | 1 |
| NUM_DP | 6 |
| for i = NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |
| if DP_PAYLOAD_TYPE==TS('00') | |
| DNP_MODE | 2 |
| ISSY_MODE | 2 |
| HC_MODE_TS | 2 |
| if HC_MODE_TS=='01' or '10' | |
| PID | 13 |
| end | |
| if DP_PAYLOAD_TYPE==IP('01') | |
| HC_MODE_IP | 2 |
| end | |
| RESERVED | 8 |
| end | |
| if FIC_FLAG == 1 | |
| FIC_VERSION | 8 |
| FIC_LENGTH_BYTE | 13 |
| RESERVED | 8 |
| end | |
| if AUX_FLAG == 1 | |
| NUM_AUX | 4 |
| AUX_CONFIG_RFU | 8 |
| for i=1:NUM_AUX | |
| AUX_STREAM_TYPE | 4 |
| AUX_PRIVATE_CONF | 28 |
| end | |

Figure 15

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i = 1:NUM_AUX | |
|     AUX_PRIVATE_DYN | 48 |
| end | |
| CRC 32 | 32 |

Figure 16

| profile |
| Auxiliary streams |
| DPs |
| FIC |
| EAC |
| PLS2 |
| PLS1 |
| Preamble |

Figure 19
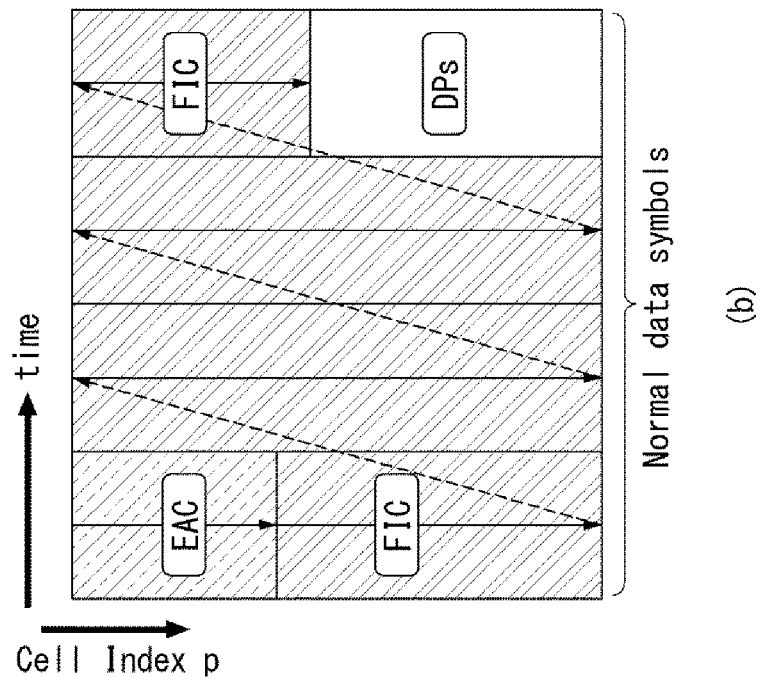
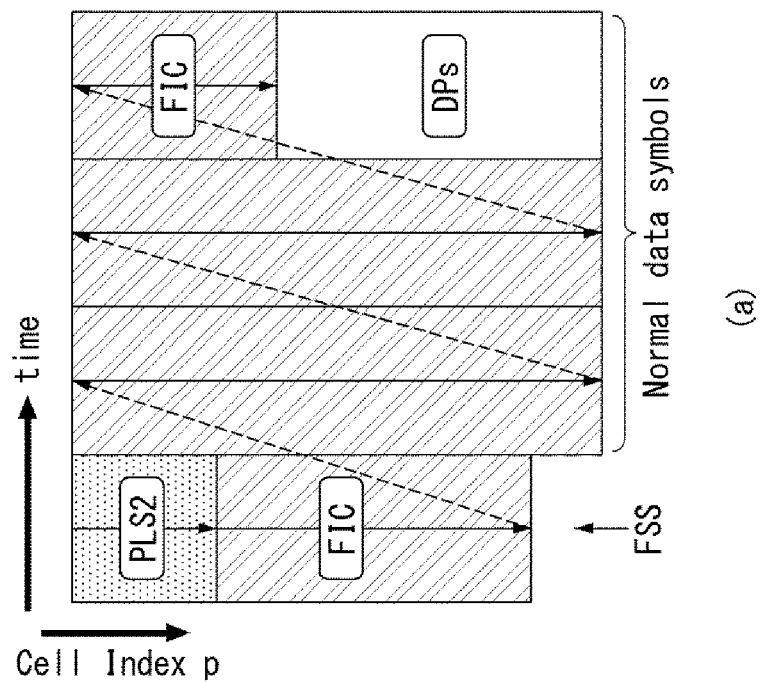

Figure 36

Stuffing Bytes Values

| Total Length N of Stuffing Bytes Field | Size of Length Sub-Field in Bytes | Value of Length Sub-Field |
|---|---|---|
| 1 | 1 | 0xFF (and no stuffing bytes follow) |
| 2 | 2 | 0xFEFF (and no stuffing bytes follow) |
| 3-65278 | 2 | N (and N-2 stuffing bytes follow) |

| Stuff l (0) | ... | | | | | FEC frame (BB frame) payload |
|---|---|---|---|---|---|---|

| Stuff l (1) | ... | 0xFF | | | | FEC frame (BB frame) payload |
|---|---|---|---|---|---|---|

| Stuff l (1) | ... | 0xFE | 0xFF | | | FEC frame (BB frame) payload |
|---|---|---|---|---|---|---|

| Stuff l (1) | ... | MSB | LSB | P | ... | P | FEC frame (BB frame) payload |
|---|---|---|---|---|---|---|---|

Figure 37

This 2-bits field indicates the status of Padding sub-zone

| 00 | No Padding |
| 01 | 1 byte Padding (No PADL field) |
| 10 | Padding equal or more than 2 bytes (2bytes PADL field) |
| 11 | Reserved |

| PADI (00) | ... | FEC frame (BB frame) |
| PADI (01) | ... | P | FEC frame (BB frame) |
| PADI (10) | ... | MSB | LSB | P | ... | P | FEC frame (BB frame) |

Figure 38

| STUFFI | Stuffing Type | Stuffing Size | In-band | 1st Byte | 2nd Byte | 3rd Byte | ... |
|---|---|---|---|---|---|---|---|
| 0 | Data | . | . | data | data | data | ... |
| 1 | Stuffing | 1byte | . | 1 1 1 1 1 1 1 1 | data | data | ... |
| 1 | Stuffing | > 1byte | . | 0 0 0 MSB | LSB | Stuffing | ... |
| 1 | Stuffing +In-band | > 2byte | In-band A signaling | 0 0 1 MSB | LSB | In-band A data | ... |
| 1 | Stuffing +In-band | > 2byte | In-band B signaling | 0 1 0 MSB | LSB | In-band B data | ... |
| 1 | Stuffing +In-band | > 2byte | In-band A,B signaling | 0 1 1 MSB | LSB | In-band A,B data | ... |

[STUFF_ONE] 1byte Stuffing Indicator

[STUFF_TYPE] Stuffing Type signaling

[STUFF_LEN] Stuffing Length

Figure 39

(a) ▪Data only, No stuffing
| STUFFI(0) | ... | FEC frame(BB frame) |

(b) ▪One byte stuffing
| STUFFI(1) | ... | 0xFF | FEC frame(BB frame) |

(c) ▪n-byte stuffing(1<n<8192)
| STUFFI(1) | 000 | STUFF_LEN | ... | Stuff(0xFF) | FEC frame(BB frame) |

(d) ▪n-byte stuffing with In-band A signaling field
| STUFFI(1) | 001 | STUFF_LEN | I.A | ... | FEC frame(BB frame) |

(e) ▪n-byte stuffing with In-band B signaling field
| STUFFI(1) | 010 | STUFF_LEN | I.B | ... | FEC frame(BB frame) |

(f) ▪n-byte stuffing with In-band A and B signaling field
| STUFFI(1) | 011 | STUFF_LEN | I.A | ... | I.B | FEC frame(BB frame) |

Figure 40

| STUFFI | Stuffing Type | Stuffing Size | In-band | (N-2)th Byte | ... | (N-1)th Byte | Nth Byte |
|---|---|---|---|---|---|---|---|
| 0 | Data | . | . | data | ... | data | data |
| 1 | Stuffing | 1byte | . | data | ... | data | 1 1 1 1 1 1 1 1 |
| 1 | Stuffing | > 1byte | . | Stuffing | ... | MSB ··· LSB | 0 0 0 0 |
| 1 | Stuffing +In-band | > 2byte | In-band A signaling | In-band A data | ... | MSB ··· LSB | 0 1 0 0 |
| 1 | Stuffing +In-band | > 2byte | In-band B signaling | In-band B data | ... | MSB ··· LSB | 1 0 0 0 |
| 1 | Stuffing +In-band | > 2byte | In-band A,B signaling | In-band A,B data | ... | MSB ··· LSB | 1 1 1 0 |

[STUFF_ONE] 1byte Stuffing Indicator

[STUFF_TYPE] Stuffing Type signaling

[STUFF_LEN] Stuffing Length

Figure 41

| | | | |
|---|---|---|---|
| (a) | ■Data only, No Padding | STUFFI(0) | ⋯ | FEC frame (BB frame) |
| (b) | ■One byte Padding | STUFFI(1) | ⋯ | FEC frame (BB frame) | 0xFF |
| (c) | ■n-byte Padding (1<n<8192) | STUFFI(1) | ⋯ | FEC frame (BB frame) | Stuff (0xFF) | ⋯ | Stuff (0xFF) | PAD LEN | 000 |
| (d) | ■n-byte Padding with In-band A signaling field | STUFFI(1) | ⋯ | FEC frame (BB frame) | I.A | ⋯ | I.A | PAD LEN | 001 |
| (e) | ■n-byte Padding with In-band B signaling field | STUFFI(1) | ⋯ | FEC frame (BB frame) | I.B | ⋯ | I.B | PAD LEN | 010 |
| (f) | ■n-byte Padding with In-band A and B signaling field | STUFFI(1) | ⋯ | FEC frame (BB frame) | I.A | ⋯ | I.B | PAD LEN | 011 |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS-REFERENCE TO RELATED APPLICATIONS

This application claims priority to Provisional Application No. 61/903,400 filed on 13 Nov. 2013 in U.S., and Provisional Application No. 61/908,169 filed on 24 Nov. 2013 in U.S. the entire contents of which is hereby incorporated by reference in its entirety.

BACKGROUND OF THE INVENTION

1. Field of the Invention

The present invention relates to an apparatus for transmitting broadcast signals, an apparatus for receiving broadcast signals and methods for transmitting and receiving broadcast signals.

2. Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

An object of the present invention is to provide a method for reducing overhead for BB frame transmission, in particular, transmission of a BB frame header by newly defining a baseband frame structure.

Another object of the present invention is to provide a method for adding various functions including in-band signaling, and the like by using a stuffing (alternatively, padding) field including in a BB frame.

Yet another object of the present invention is to provide a method for additionally performing an error checking function by using bits that remain in the BB frame header.

Technical objects to be solved by the present invention are not limited to the aforementioned technical objects and unmentioned technical objects will be clearly understood by those skilled in the art from the specification and the appended claims.

In accordance with an embodiment of the present invention, there is provided a method for transmitting broadcast signals, including: formatting input streams to a plurality of data pipes (DPs); encoding data of the plurality of DPs for each DP; generating one or more signal frames by mapping the encoded DP data; and modulating data of the generated signal frames by an orthogonal frequency division multiplexing (OFDM) scheme and transmitting a broadcast signal including the modulated data of the signal frames, wherein the formatting includes allocating data packets to a payload of a baseband frame (BBF), and adding a header indicating a format of the payload of the baseband frame, the header includes at least one of first control information and second control information, the second control information is divided into a second control information least significant bit (LSB) and a second control information most significant bit (MSB), the first control information indicates whether the second control information is enabled to be expressed by only the second control information LSB, and the second control information indicates a distance from the start of the payload up to a data packet first transmitted in the payload.

The header may further include a check-sum field for checking an error of the header or the first control information.

The size of the second control information LSB may be 6 bits or 7 bits, and the size of the second control information MSB may be 7 bits or 6 bits.

The baseband frame may include a stuffing field including stuffing data, and the stuffing field may be included in the baseband frame when the payload is not filled with a data packet or in-band signaling is used.

The header may include a STUFFI field indicating whether the stuffing field is included in the baseband frame.

The STUFFI field may be positioned subsequent to the second control information or the first control information.

The stuffing field may include a stuffing header and stuffing data.

The stuffing field may include at least one of a STUFF_ONE field representing whether the length of the stuffing field is 1 byte, a STUFF_TYPE field representing the type of the stuffing data, and a STUFF_LEN field representing the length of the stuffing field.

The STUFF_LEN field may be divided into STUFF_LEN_MSB (most significant bit) and STUFF_LEN_LSB (least significant bit).

The stuffing data may represent stuffing or in-band signaling.

When the length of the stuffing field is 1 byte, the STUFF_LEN_LSB may not be included in the STUFF_LEN field. The stuffing field may be positioned subsequent to the payload.

The first control information may be an OPTIONI field and a packet start pointer mode indicator (PSPMI), and the second control information may be a SYNCD field or a packet start pointer (PKTSPTR) field.

In accordance with another embodiment of the present invention, there is provided a transmitting apparatus for transmitting broadcast signals, including: an input formatting module formatting input streams to a plurality of data pipes (DPs); a bit interleaved coding and modulation (BICM) module encoding data of the plurality of DPs for each DP; a frame building module generating one or more signal frames by mapping the encoded DP data; and an OFDM generation module modulating data of the generated signal frames by an orthogonal frequency division multiplexing (OFDM) scheme and transmitting a broadcast signal including the modulated data of the signal frames, wherein the input formatting module includes a baseband frame slicer module allocating data packets to a payload of a baseband frame (BBF), and a baseband frame header insertion module adding a header indicating a format of the payload of the baseband frame, the header includes at least one of first control information and second control information, the second control information is divided into a second control information least significant bit (LSB) and a second control information most significant bit (MSB), the first control information indicates whether the second control information is enabled to be expressed by only the second control information LSB, and the second control information indicates a distance from the start of the payload up to a data packet first transmitted in the payload.

In accordance with yet another embodiment of the present invention, there is provided a receiving apparatus for receiving broadcast signals, including: a demapping and decoding module; and an output processor module restoring a plurality of data pipes output from the demapping and decoding module to input streams, wherein the output processor module includes a baseband frame processor block decoding information transmitted to a header of a baseband frame and restoring the input streams by using the decoded information, the header includes at least one of first control information and second control information, the second control information is divided into a second control information least significant bit (LSB) and a second control information most significant bit (MSB), the first control information indicates whether the second control information is enabled to be expressed by only the second control information LSB, and the second control information indicates a distance from the start of the payload up to a data packet first transmitted in the payload.

A baseband frame structure is newly defined to reduce overhead for transmission of a BB frame header.

Various functions including in-band signaling, and the like can be added by using a stuffing (alternatively, padding) field including in a BB frame.

An error checking function can be additionally performed by using bits that remain in the BB frame header.

Technical objects to be solved by the present invention are not limited to the aforementioned technical object and other unmentioned technical objects will be clearly understood by those skilled in the art from the following description.

BRIEF DESCRIPTION OF THE DRAWINGS

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIGS. 19(a)-19(b) illustrate FIC mapping according to an embodiment of the present invention.

FIG. 36 illustrates another example of the BB frame structure in the related art.

FIG. 37 illustrates yet another example of the BB frame structure in the related art.

FIG. 38 illustrates one example of a BB frame structure proposed in the specification.

FIGS. 39(a)-39(f) illustrate another example of the BB frame structure proposed in the specification.

FIG. 40 illustrates yet another example of the BB frame structure proposed in the specification.

FIGS. 41(a)-41(f) illustrate still another example of the BB frame structure proposed in the specification.

DETAILED DESCRIPTION OF THE EMBODIMENTS

Figure 1:
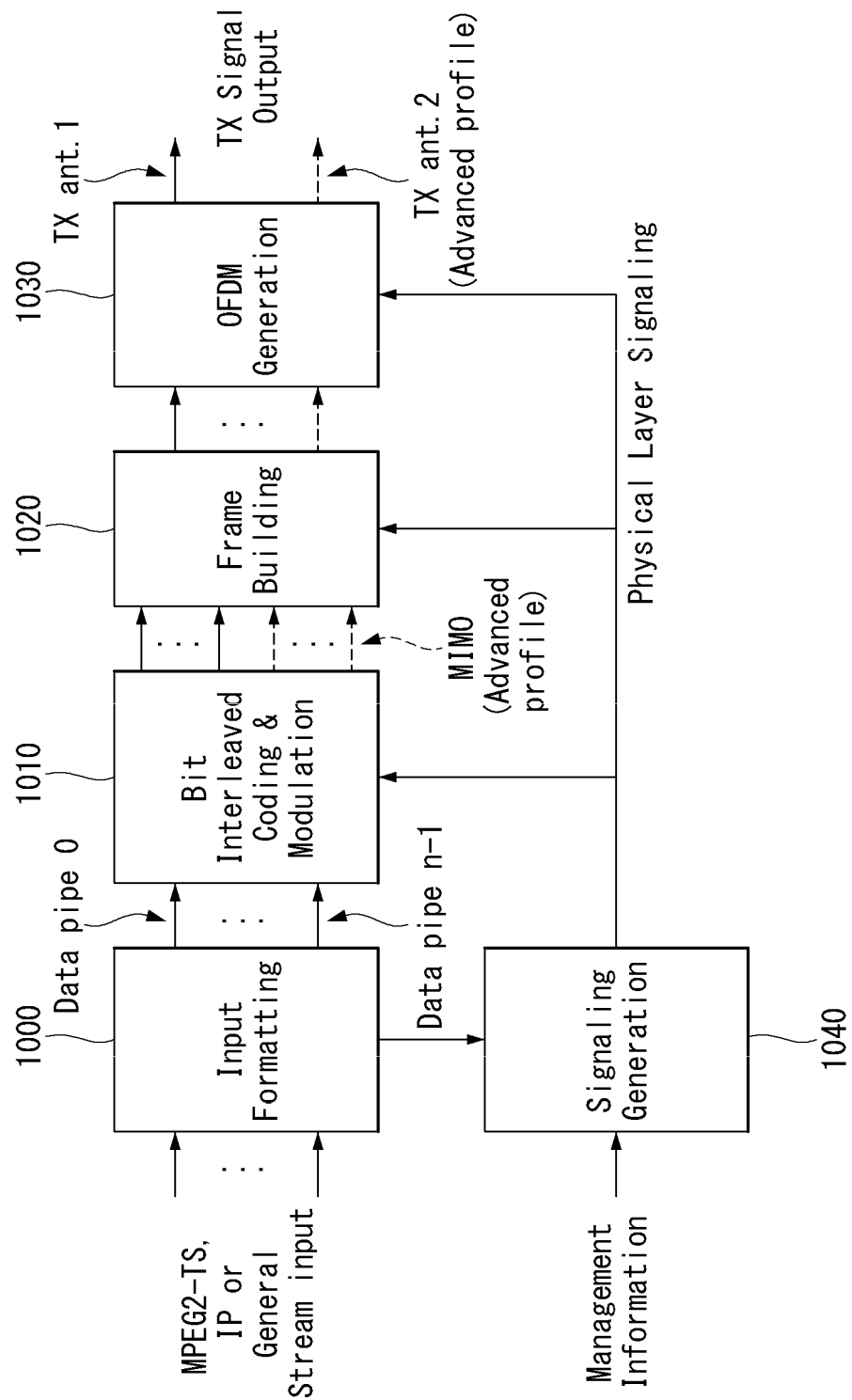
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| LDPC codeword length | 16K, 64K bits |
| Constellation size | 4~10 bpcu (bits per channel use) |

TABLE 1-continued

| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| LDPC codeword length | 16 Kbits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| LDPC codeword length | 16K, 64 Kbits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Is expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
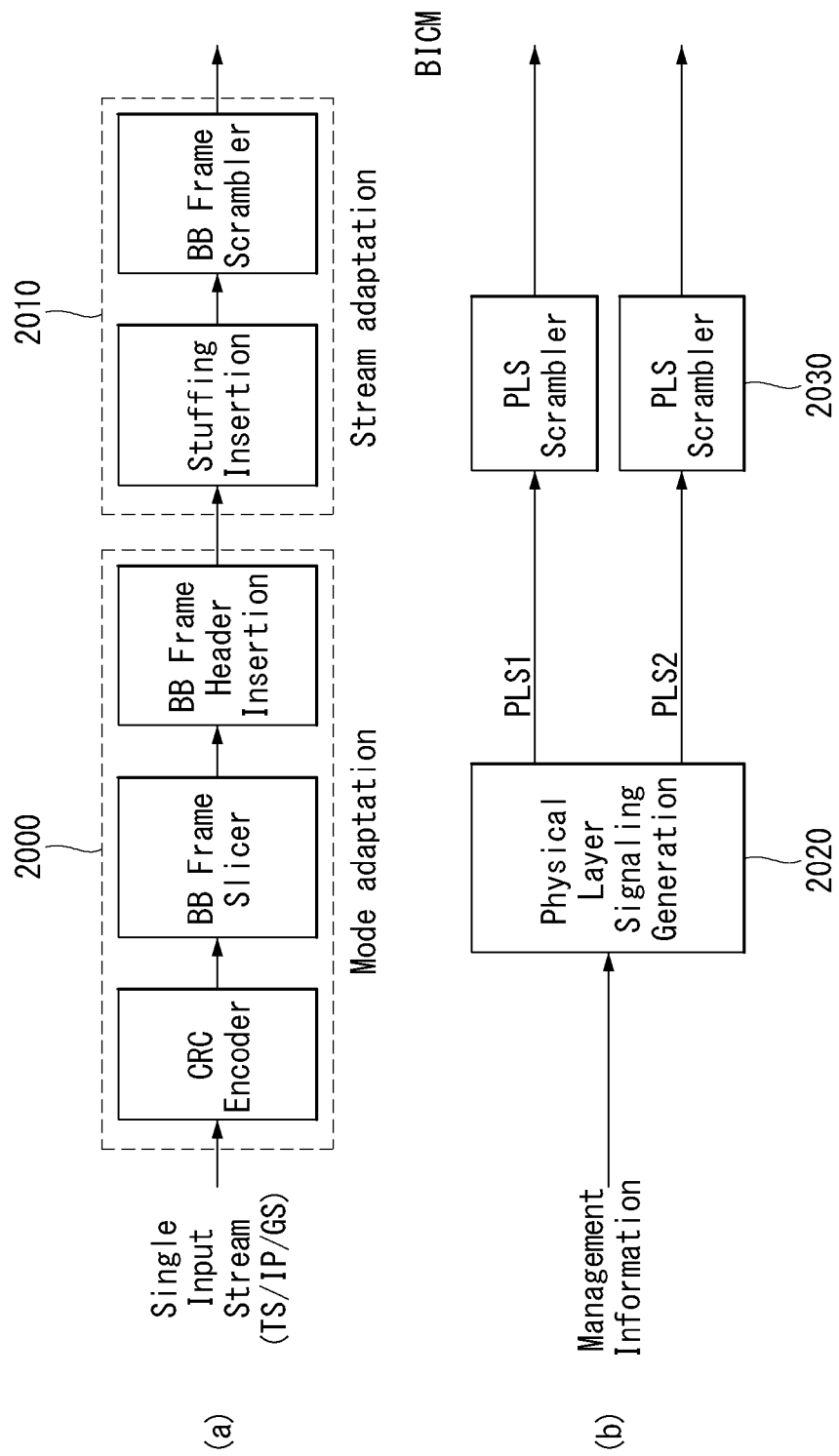
FIGS. 2(a)-2(b) illustrate an input formatting block according to one embodiment of the present invention.
Figure 3:
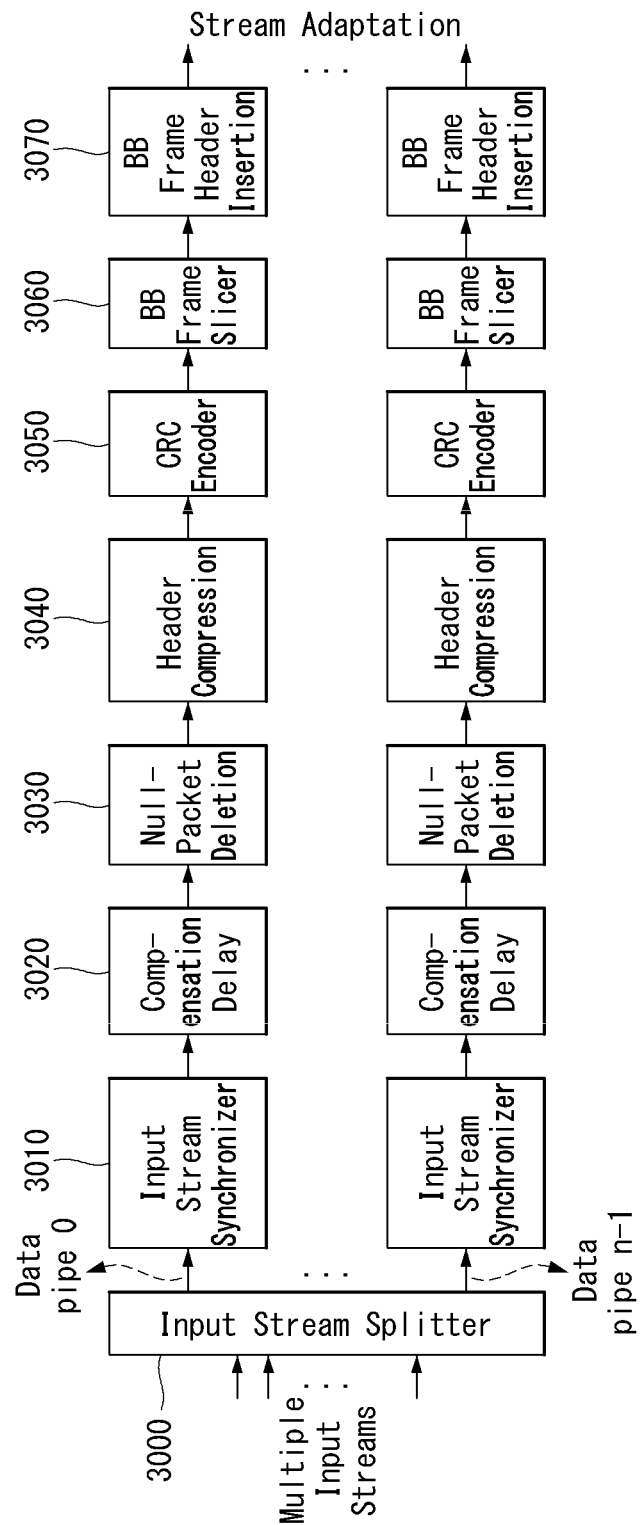
FIG. 3 illustrates an input formatting block according to another embodiment of the present invention.
Figure 4:
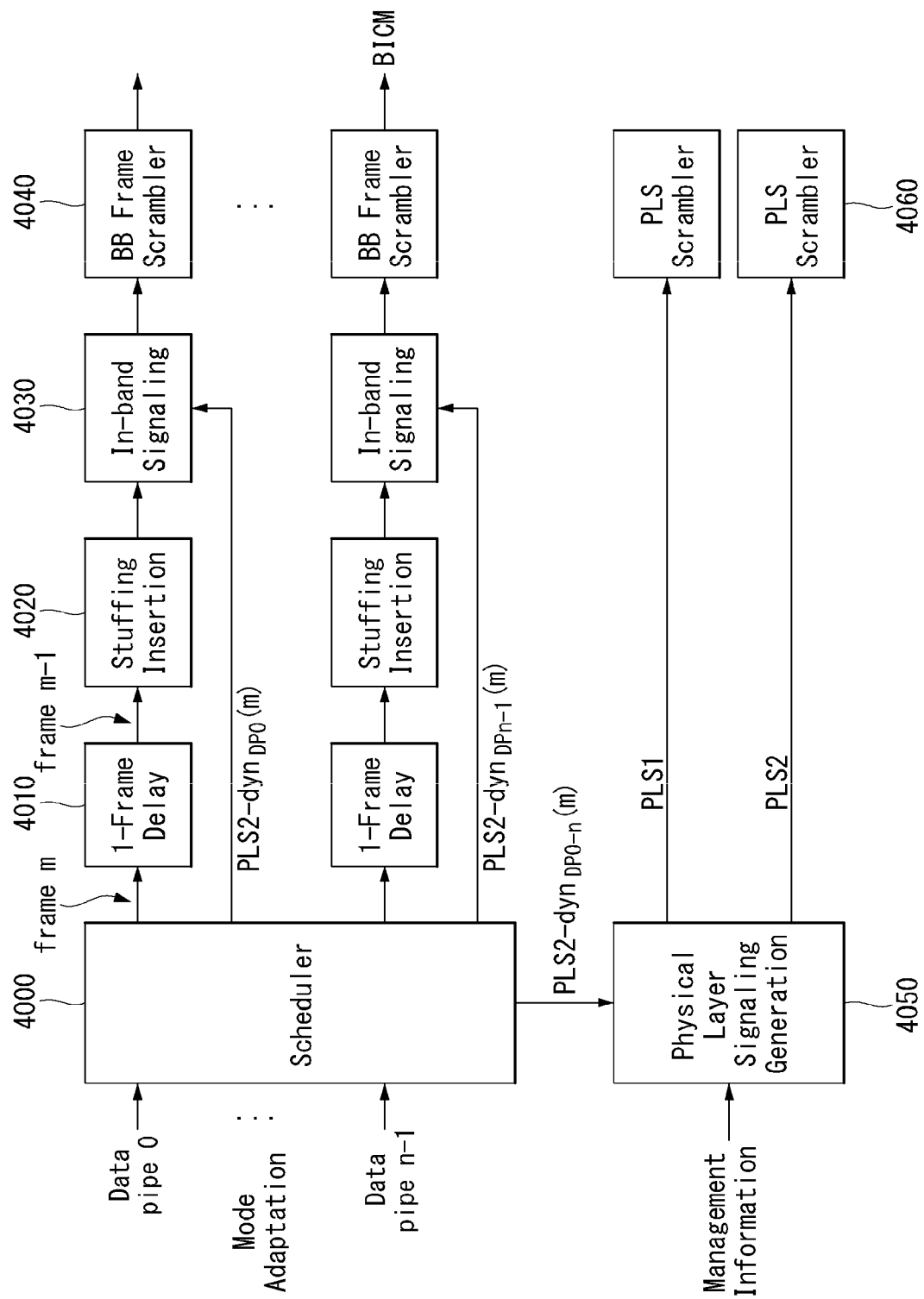
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
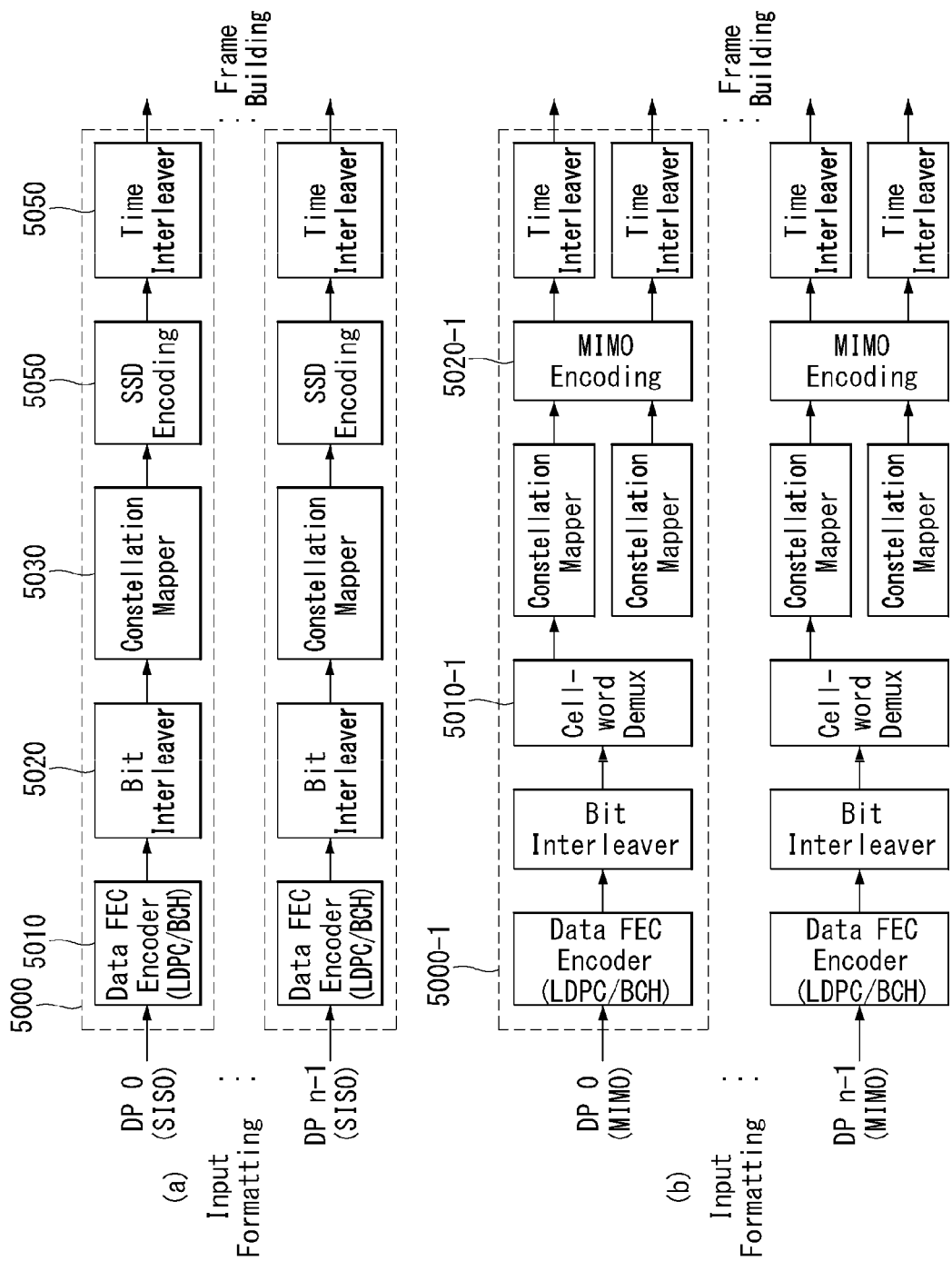
FIGS. 5(a)-5(b) illustrate a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1, i and e2, i) are fed to the input of the MIMO Encoder. Paired MIMO Encoder output (g1, i and g2, i) is transmitted by the same carrier k and OFDM symbol l of their respective TX antennas.

The above-described blocks may be omitted or replaced by blocks having similar or identical functions.

Figure 6:
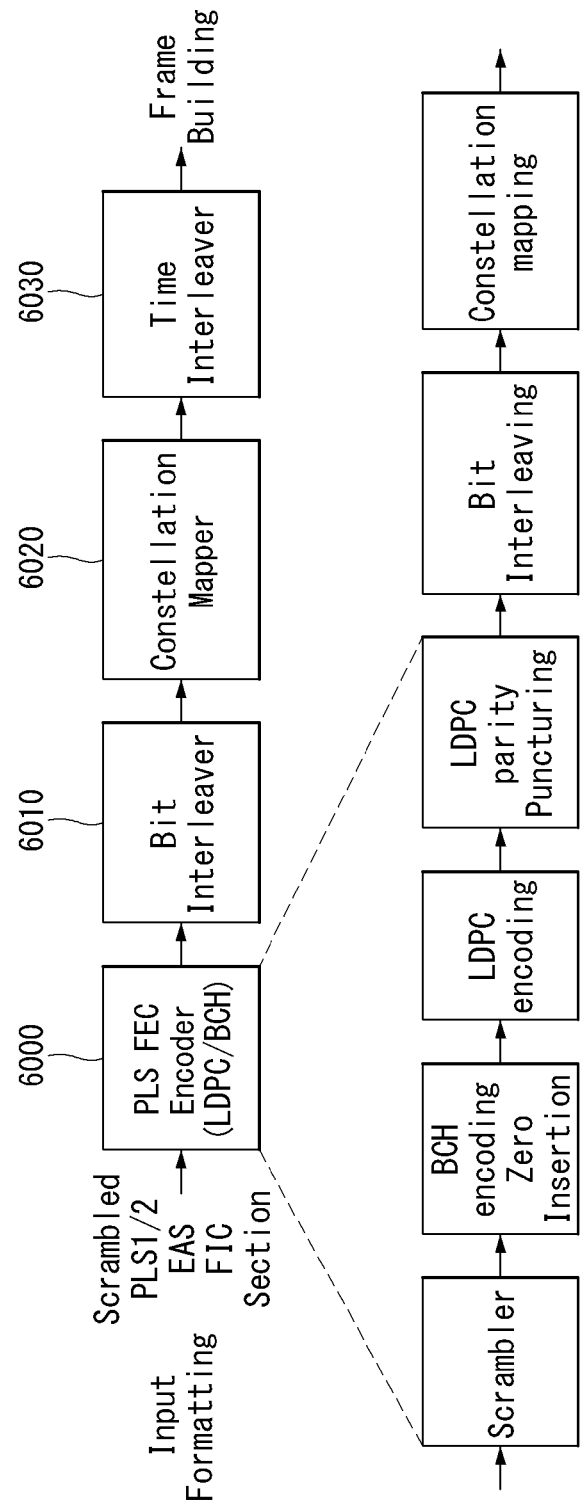
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS ½ data, EAC and FIC section.

The scrambler can scramble PLS1 data and PLS2 data before BCH encoding and shortened and punctured LDPC encoding.

The BCH encoding/zero insertion block can perform outer encoding on the scrambled PLS ½ data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math figure 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 <1021 | | | | | | | | |
| >1020 | 2100 | | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
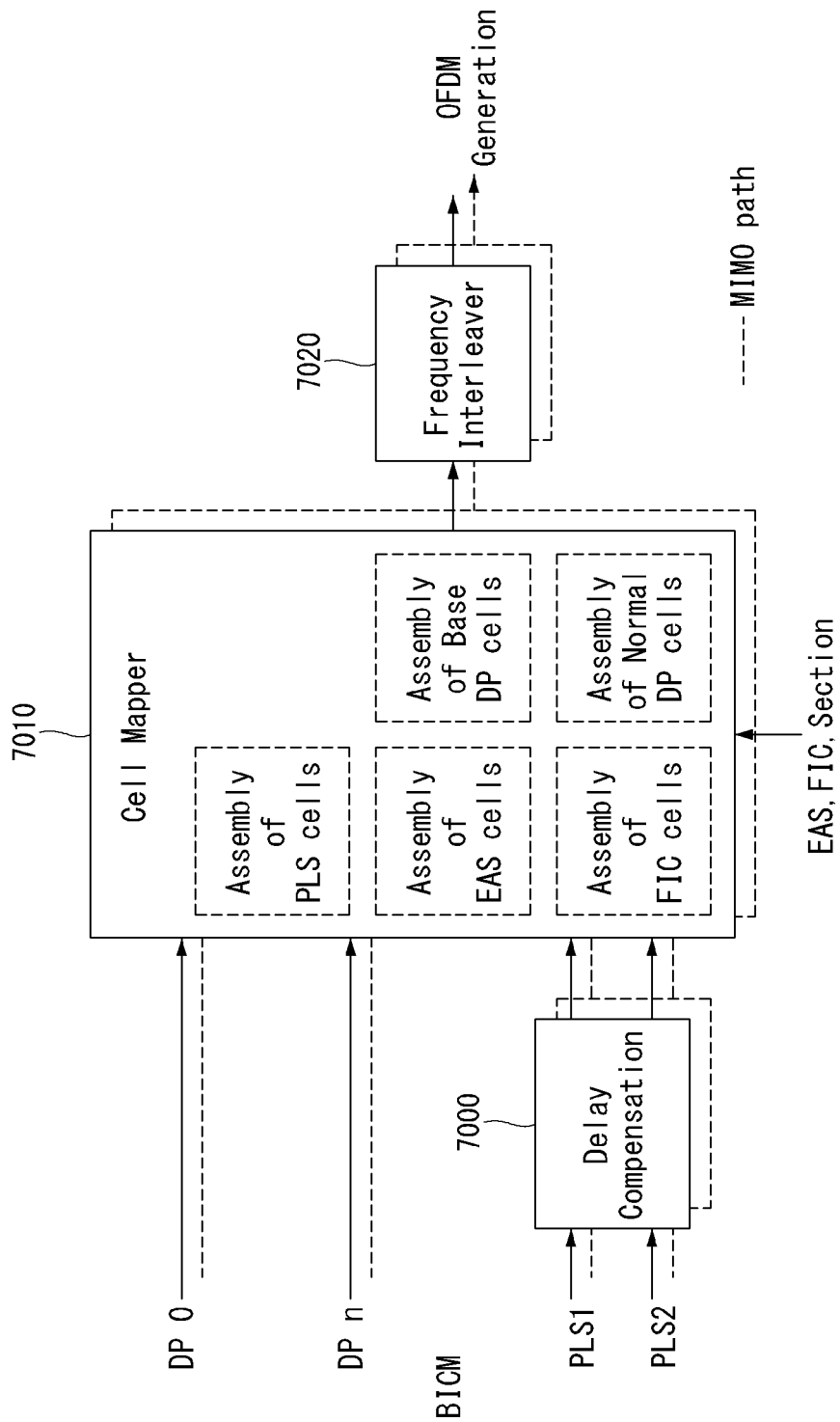
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
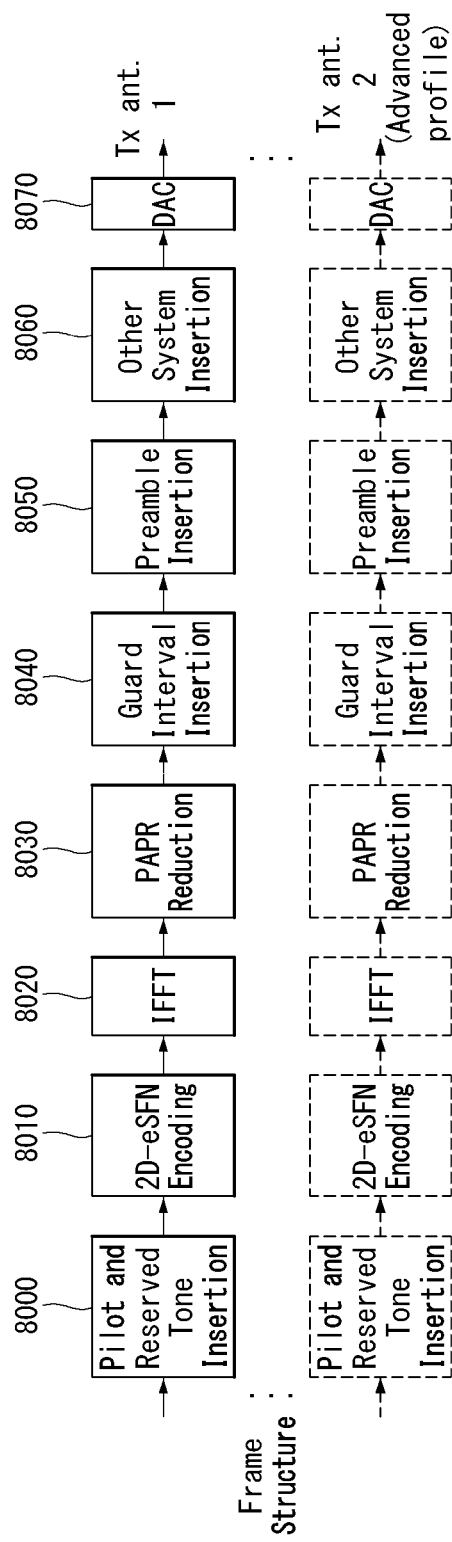
FIG. 8 illustrates an OFMD generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
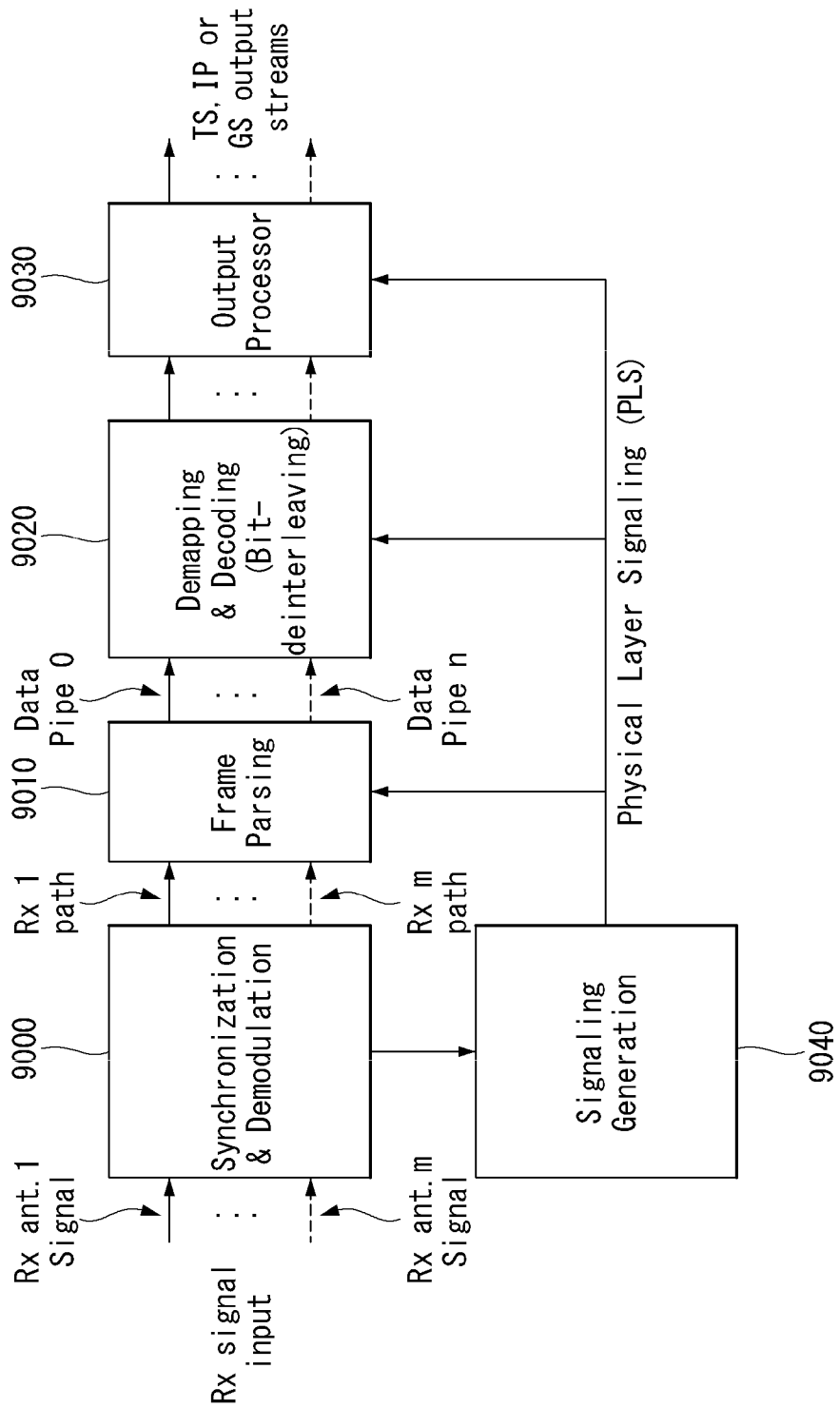
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
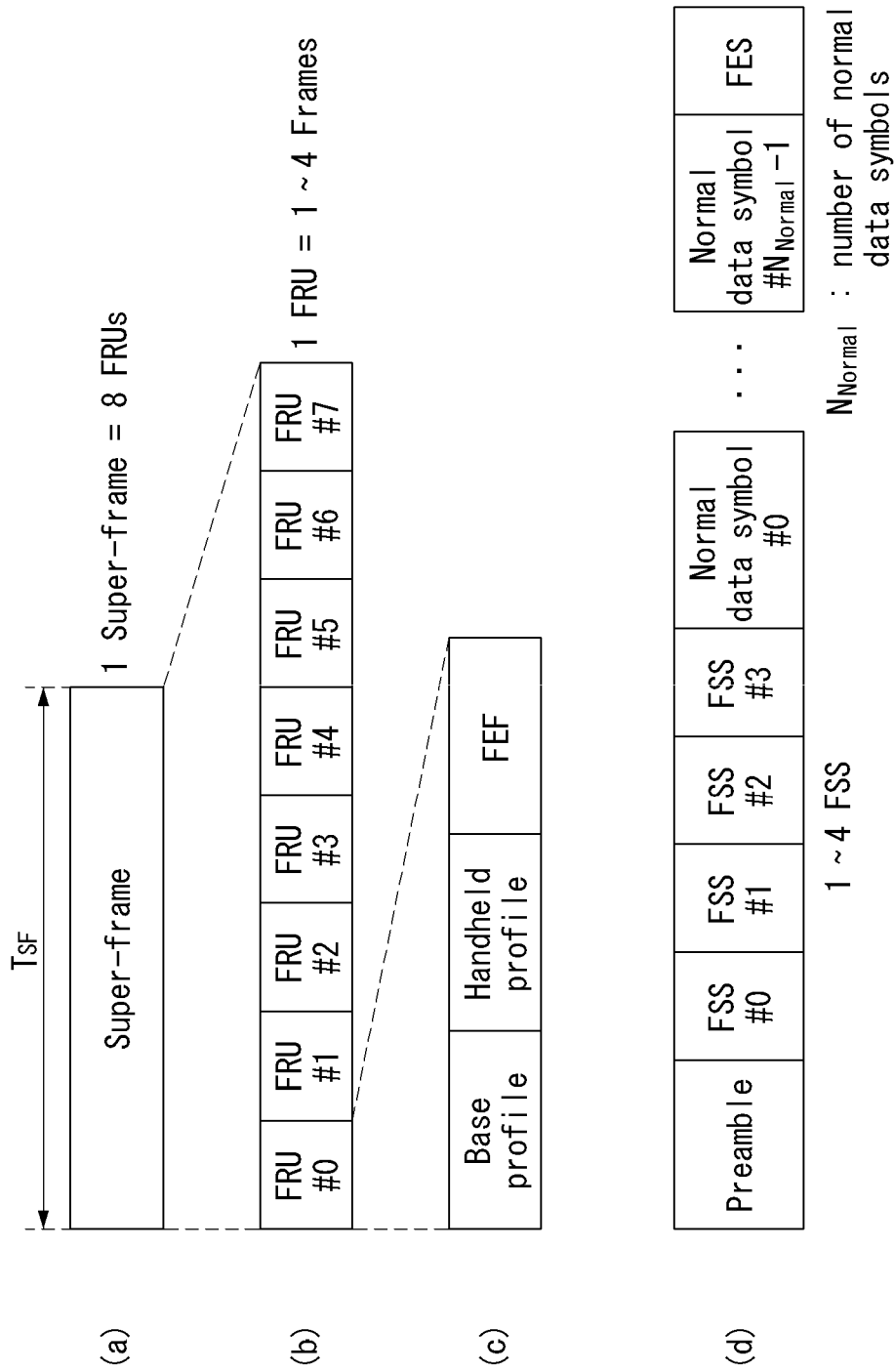
FIGS. 10(a)-10(d) illustrate a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figure 11:
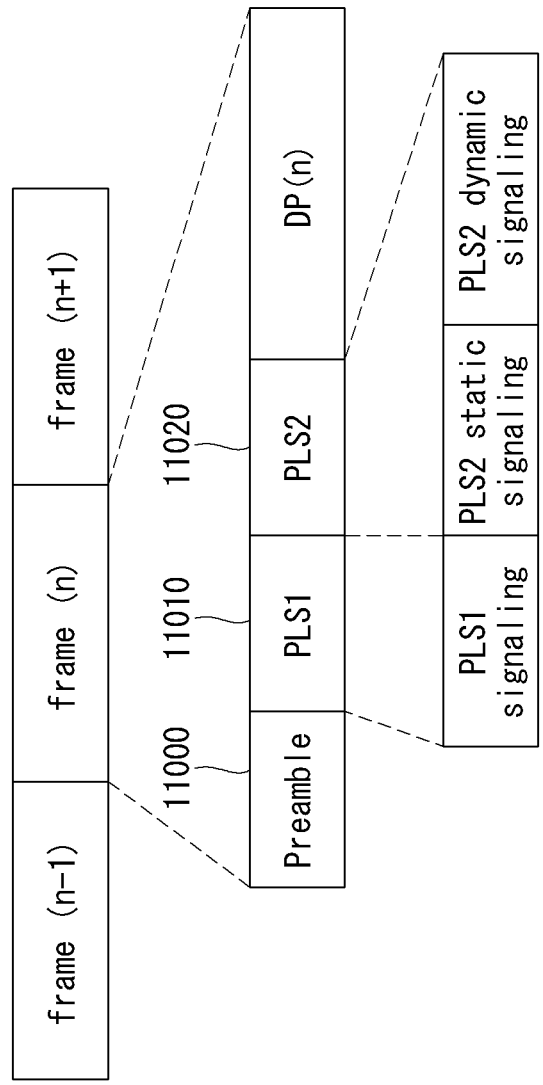
FIG. 11 illustrates a signaling hierarchy structure of the frame according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field.

When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY_mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
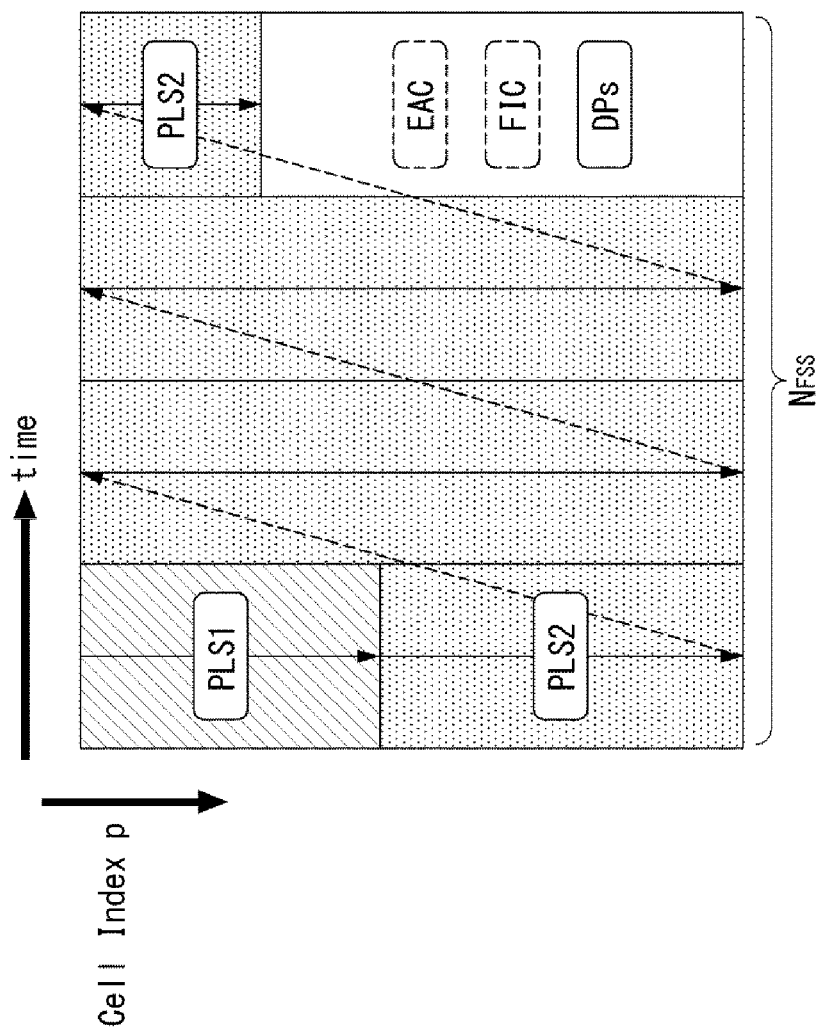
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
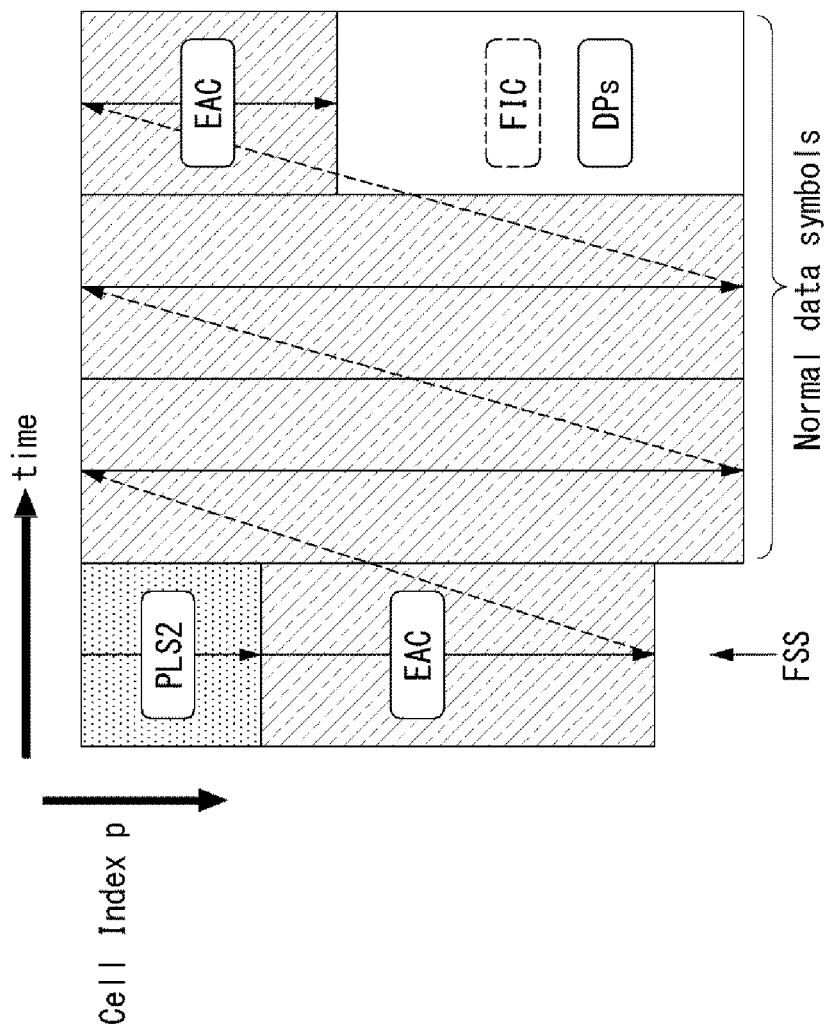
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
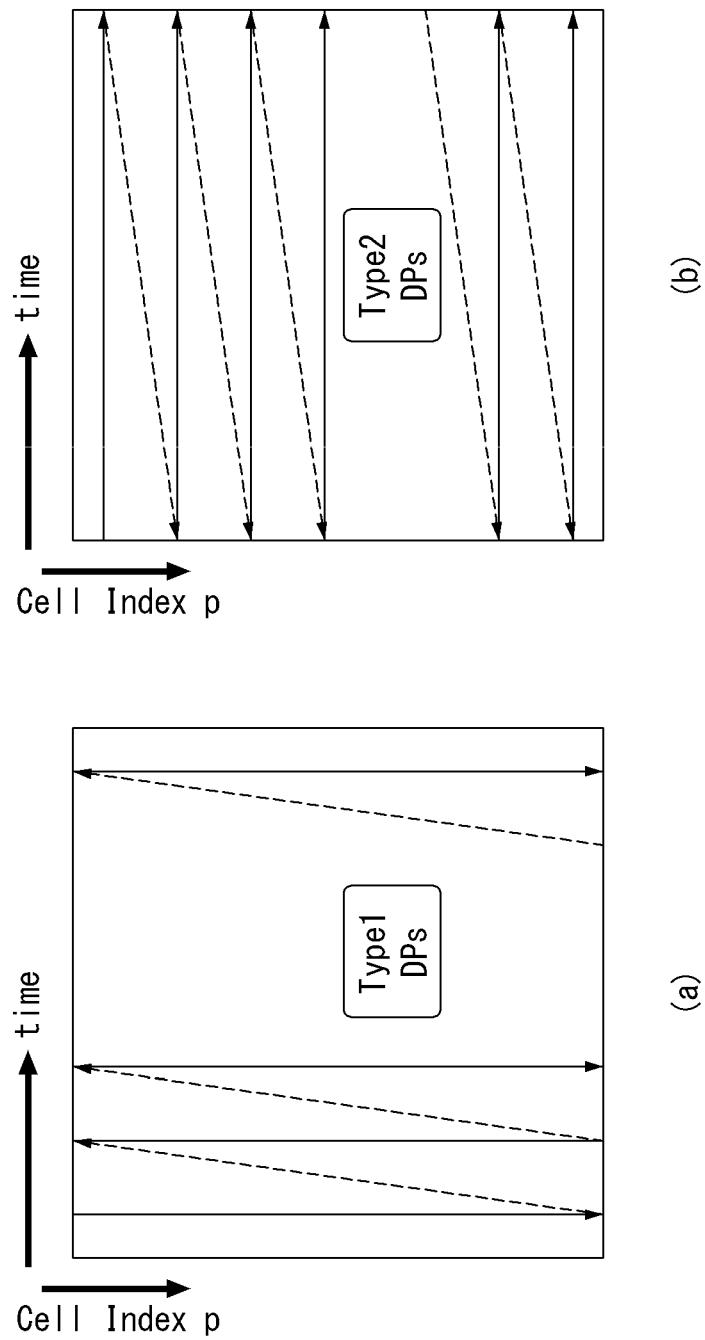
FIGS. 20(a)-20(b) illustrate a type of DP according to an embodiment of the present invention.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
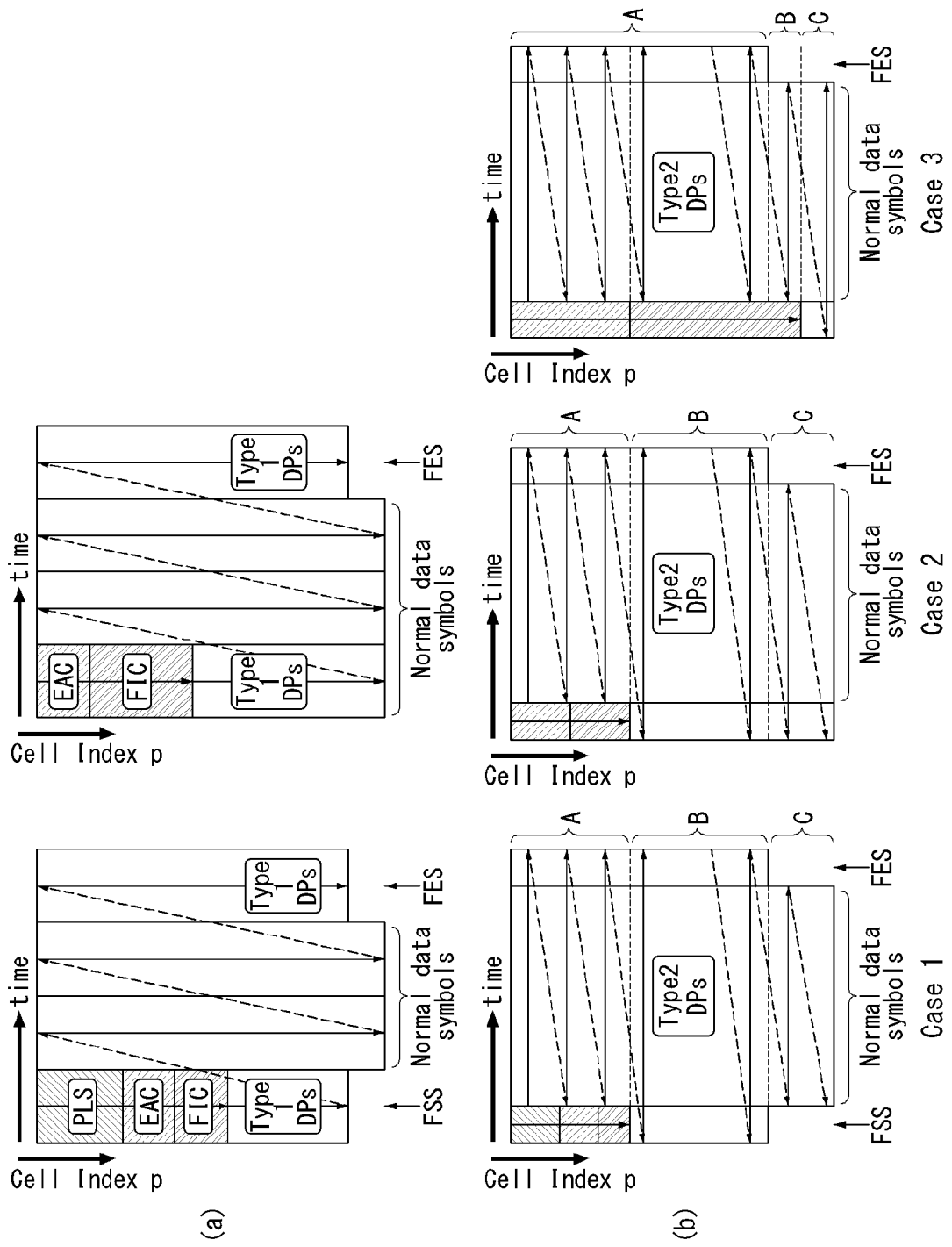
FIGS. 21(a)-21(b) illustrate DP mapping according to an embodiment of the present invention.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
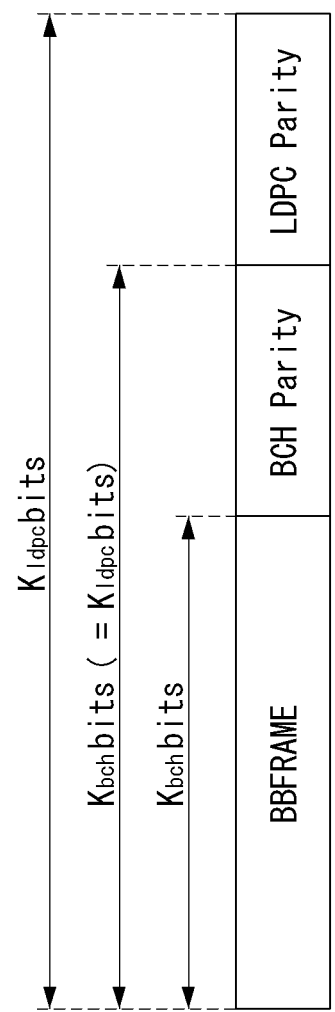
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch-Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch-Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math figure 3]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\ldots=p_{N_{ldpc}-K_{ldpc}-1}=0$$ [Math figure 4]

2) Accumulate the first information bit—i0, at parity bit addresses specified in the first row of an addresses of parity check matrix. The details of addresses of parity check matrix will be described later. For example, for rate 13/15:

$$p_{983}=p_{983}\oplus i_0 \quad p_{2815}=p_{2815}\oplus i_0$$

$$p_{4837}=p_{4837}\oplus i_0 \quad p_{4989}=p_{4989}\oplus i_0$$

$$p_{6138}=p_{6138}\oplus i_0 \quad p_{6458}=p_{6458}\oplus i_0$$

$$p_{6921}=p_{6921}\oplus i_0 \quad p_{6974}=p_{6974}\oplus i_0$$

$$p_{7572}=p_{7572}\oplus i_0 \quad p_{8260}=p_{8260}\oplus i_0$$

$$p_{8496}=p_{8496}\oplus i_0$$ [Math figure 5]

3) For the next 359 information bits, is, s=1, 2, . . . , 359 accumulate is at parity bit addresses using following Math figure.

$$\{x+(s \bmod 360)\times Q_{ldpc}\} \bmod(N_{ldpc}-K_{ldpc})$$ [Math figure 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007}=p_{1007}\oplus i_1 \quad p_{2839}=p_{2839}\oplus i_1$$

$$p_{4861}=p_{4861}\oplus i_1 \quad p_{5013}=p_{5013}\oplus i_1$$

$$p_{6152}=p_{6152}\oplus i_1 \quad p_{6482}=p_{6482}\oplus i_1$$

$$p_{6945}=p_{6945}\oplus i_1 \quad p_{6998}=p_{6998}\oplus i_1$$

$$p_{7596}=p_{7596}\oplus i_1 \quad p_{8284}=p_{8281}\oplus i_1$$

$$p_{8520}=p_{8520}\oplus i_1$$ [Math figure 7]

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the Math figure 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i\oplus p_{i-1}, i=1,2,\ldots,N_{ldpc}-K_{ldpc}-1$$ [Math figure 8]

where final content of pi, i=0, 1, . . . Nldpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
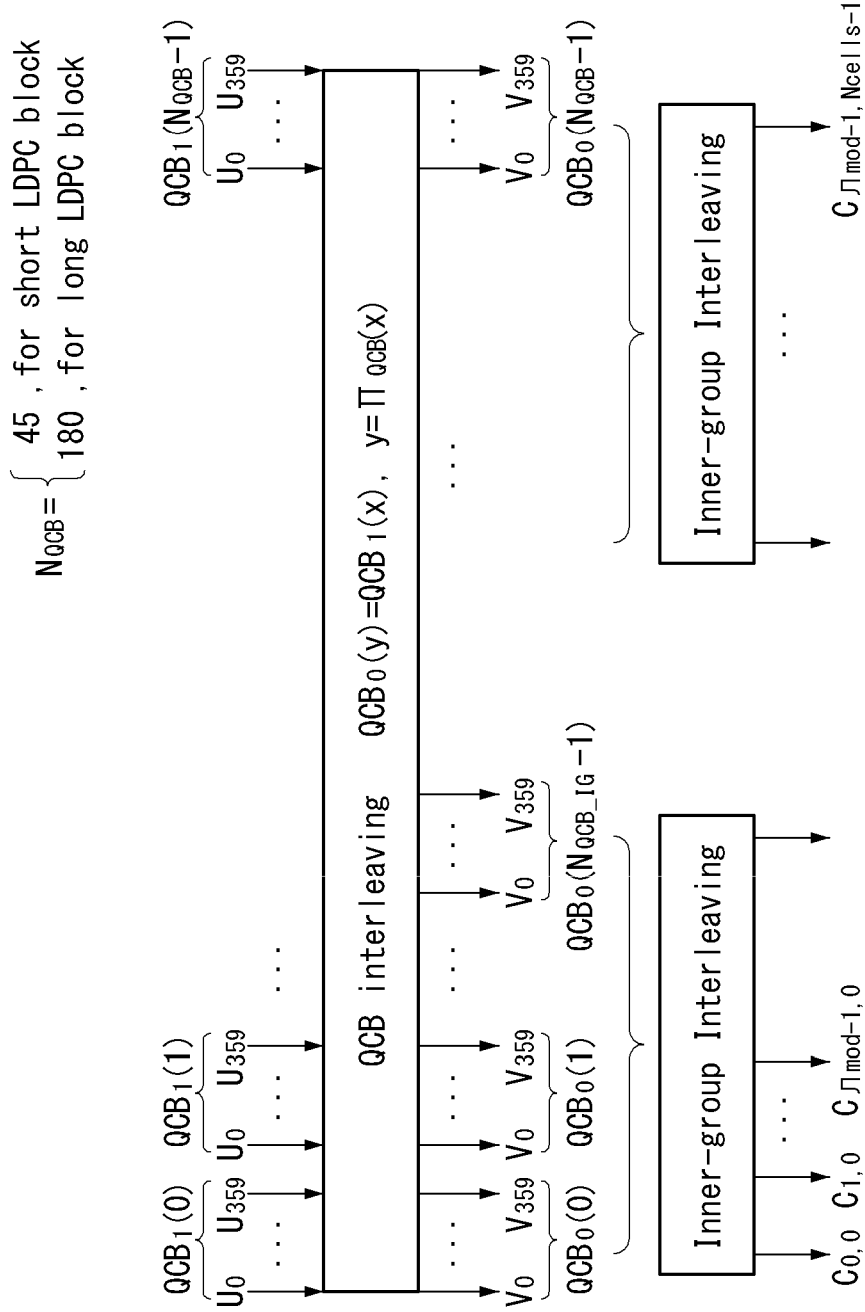
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | ηmod | NQCB_IG |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
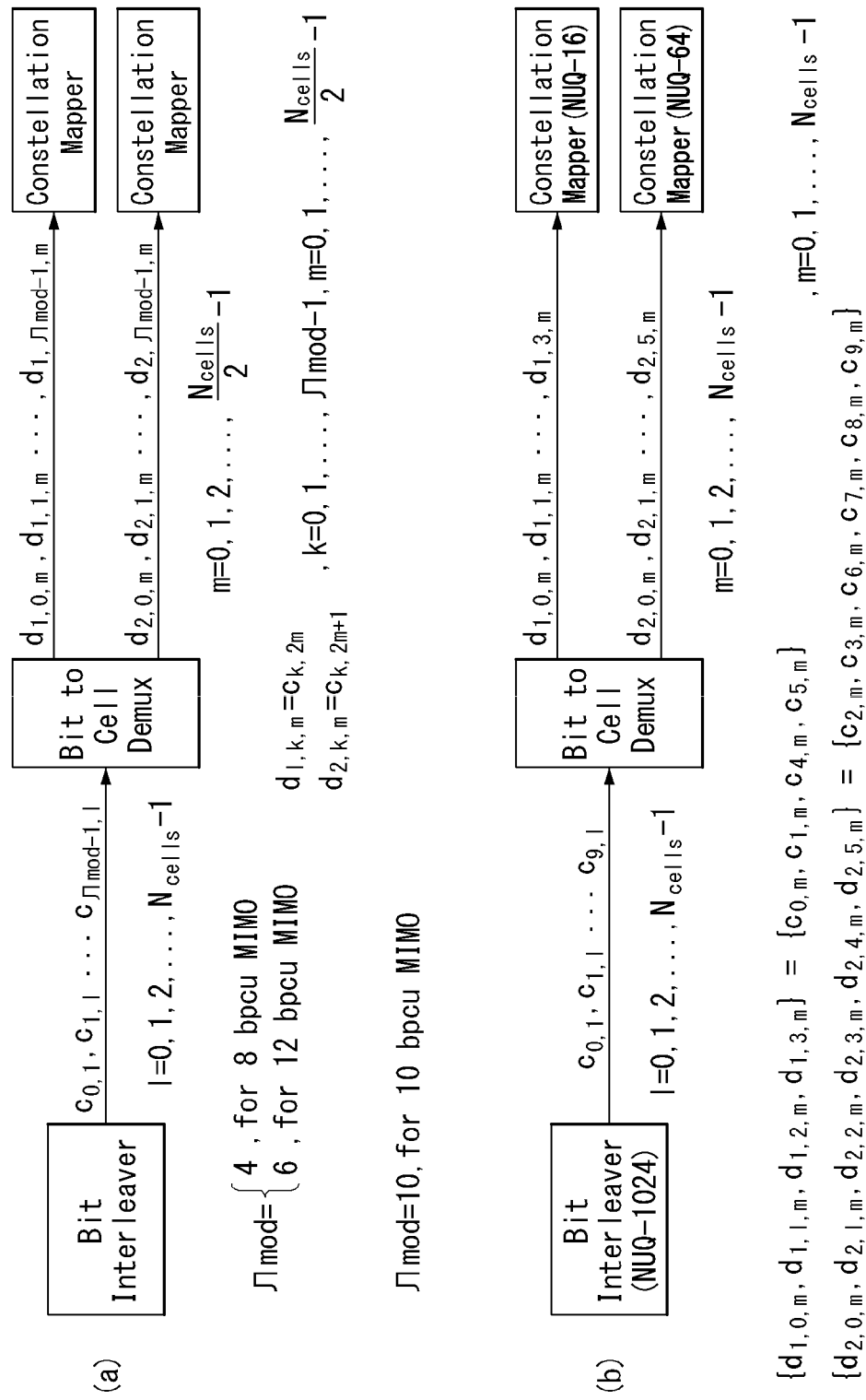
FIGS. 24(a)-24(b) illustrate a cell-word demultiplexing according to an embodiment of the present invention.

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0, 1, c1, 1, . . . , cη mod−1, 1) of the bit interleaving output is demultiplexed into (d1, 0, m, d1, 1, m . . . , d1, 1η mod−1, m) and (d2, 0, m, d2, 1, m . . . , d2, η mod−1, m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0, 1, c1, 1, . . . , c9, 1) of the Bit Interleaver output is demultiplexed into (d1, 0, m, d1, 1, m . . . , d1, 3, m) and (d2, 0, m, d2, 1, m . . . , d2, 5 m), as shown in (b).

Figure 25:
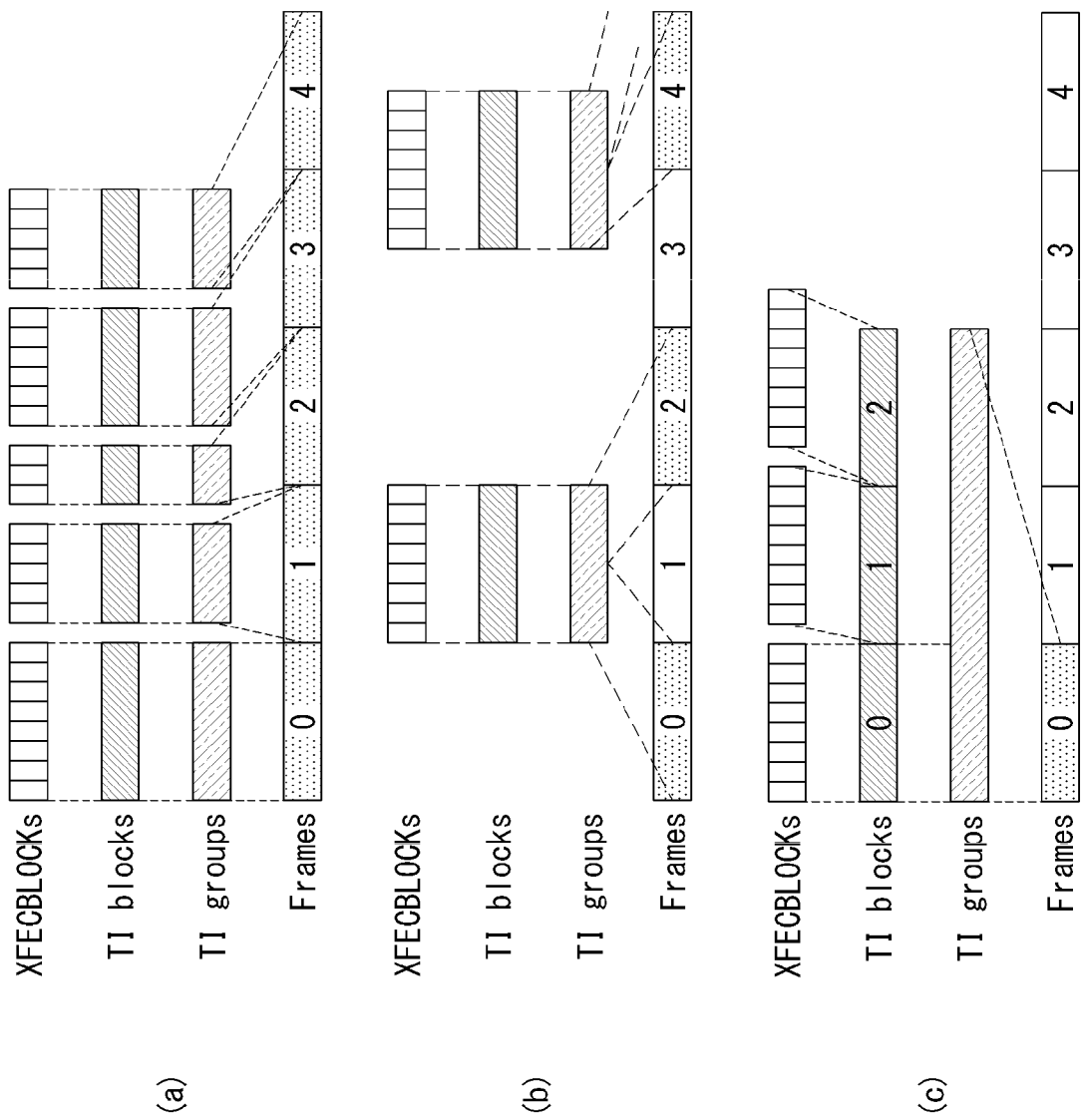
FIGS. 25(a)-25(c) illustrate a time interleaving according to an embodiment of the present invention.

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1' (NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1}, \ldots,$$
$$d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{ encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1}),$$

where $h_{n,s,i}$ is the ith output cell (for i=0, . . . , $N_{xBLOCK\_}^{TI}$(n, s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rowsError! Objects cannot be created from editing field codes. of a TI memory is equal to the number of cells Error! Objects cannot be created from editing field codes. i.e., Error! Objects cannot be created from editing field codes. while the number of columns Error! Objects cannot be created from editing field codes. is equal to the number Error! Objects cannot be created from editing field codes.

Figure 26:
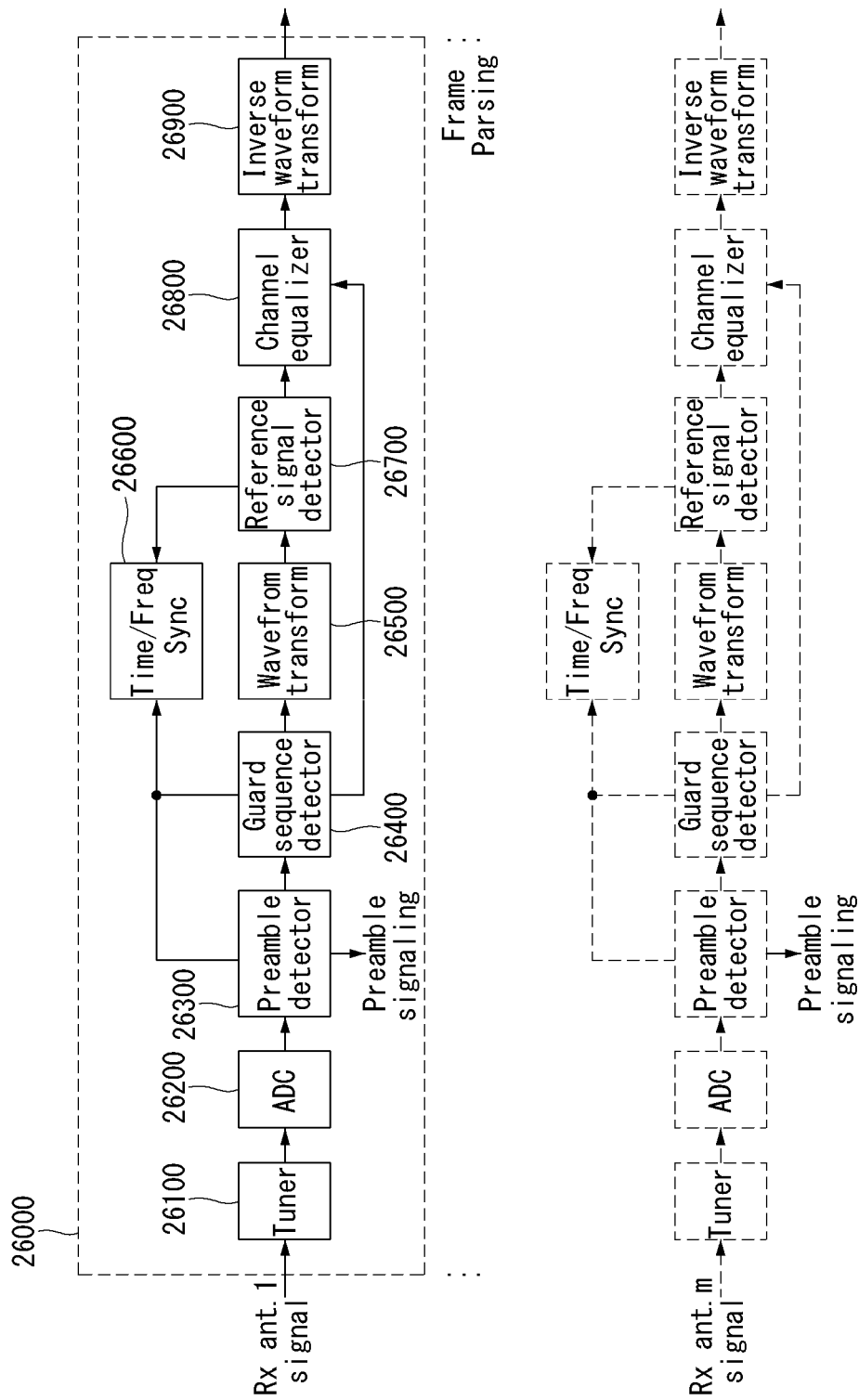
FIG. 26 illustrates one example of a synchronization and demodulation module of FIG. 9.

FIG. 26 illustrates a synchronization and demodulation module according to an embodiment of the present invention.

The synchronization and demodulation module illustrated in FIG. 26 corresponds to the embodiment of the synchronization and demodulation module described in FIG. 9. Further, the synchronization and demodulation module illustrated in FIG. 26 may perform an inverse operation of the waveform generation module described in FIG. 9.

As illustrated in FIG. 26, the synchronization and demodulation module according to the embodiment of the present invention as an embodiment of a synchronization and demodulation module of a receiving apparatus using m Rx antennas may include m processing blocks for demodulating and outputting a signal input as long as m paths. All m processing blocks may perform the same processing procedure. Hereinafter, an operation of a first processing block 26000 among m processing blocks will be primarily described.

The first processing block 26000 may include a tuner 26100, an ADC block 26200, a preamble detector 26300, a guard sequence detector 26400, a waveform transform block 26500, a time/frequency synchronization block 26600, a reference signal detector 26700, a channel equalizer 26800, and an inverse waveform transform block 26900.

The tuner 26100 selects a desired frequency band and compensates a magnitude of a received signal to output the signal to the ADC block 26200.

The ADC block 26200 may transform the signal output from the tuner 26100 to a digital signal.

The preamble detector 26300 may detect a preamble (alternatively, a preamble signal or a preamble symbol) in order to verify whether the digital signal is a signal of a system corresponding to the receiving apparatus. In this case, the preamble detector 2600 may decode basic transmission parameters received through the preamble.

The guard sequence detector 26400 may detect a guard sequence in the digital signal. The time frequency synchronization block 26600 may perform time/frequency synchronization by using the detected guard sequence and the channel equalizer 26800 may estimate a channel through a sequence received/restored by using the detected guard sequence.

When inverse waveform transform is performed at a transmitting side, the waveform transform block 26500 may perform an inverse transform procedure to the inverse waveform transform. When a broadcast transmitting/receiving system according to the embodiment of the present invention a multi-carrier system, the waveform transform block 26500 may perform an FFT transform procedure. Further, in the case where the broadcast transmitting/receiving system according to the embodiment of the present invention is a single carrier system, when received signals in a time domain are used to be processed in a frequency domain or all of the received signals are processed in the time domain, the waveform transform block 26500 may not be used.

The time/frequency synchronization block 26600 may receive output data of the preamble detector 26300, the guard sequence detector 26400, and the reference signal detector 26700 and perform time synchronization and carrier frequency synchronization including guard sequence detection and block window positioning for a detected signal. In this case, the time/frequency synchronization block 26600 may feed back and use an output signal of the waveform transform block 26500 for frequency synchronization.

The reference signal detector 26700 may detect a received reference signal. Therefore, the receiving apparatus according to the embodiment of the present invention may perform synchronization or channel estimation.

The channel equalizer 26800 may estimate a transmission channel up to each receiving apparatus from each transmitting antenna from the guard sequence or the reference signal and perform channel equalization for each received data by using the estimated channel.

When the waveform transform block 26500 performs waveform transform in order to efficiently perform the synchronization and channel estimation/equalization, the inverse waveform transform block 26900 may serve to restore each received data to an original received data domain again. In the case where the broadcast transmitting/receiving system according to the embodiment of the present invention is the single carrier system, the waveform transform block 26500 may perform FFT in order to perform the synchronization/channel estimation/equalization in the frequency domain and the inverse waveform transform block 26900 performs IFFT for a signal of which channel equalization is completed to restore a transmitted data symbol. When the broadcast transmitting/receiving system according to the embodiment of the present invention is a multi-carrier system, the inverse waveform transform block 26900 may not be used.

Further, the aforementioned blocks may be omitted according to an intention of a designer or substituted by other blocks having a similar or the same function.

Figure 27:
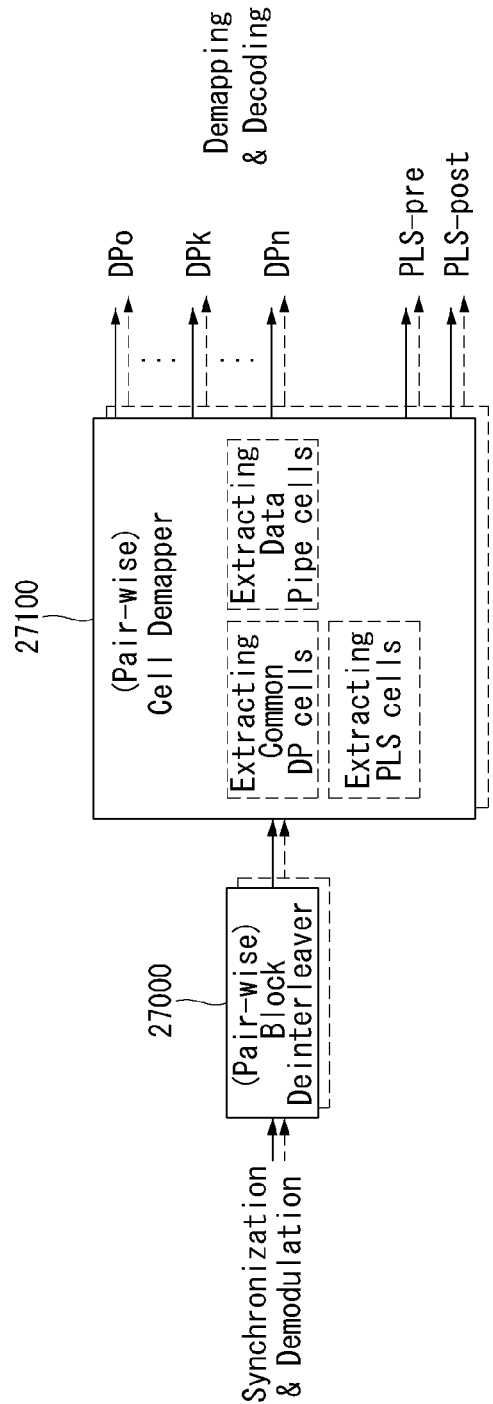
FIG. 27 illustrates one example of a frame parsing module of FIG. 9.
Figure 28A:
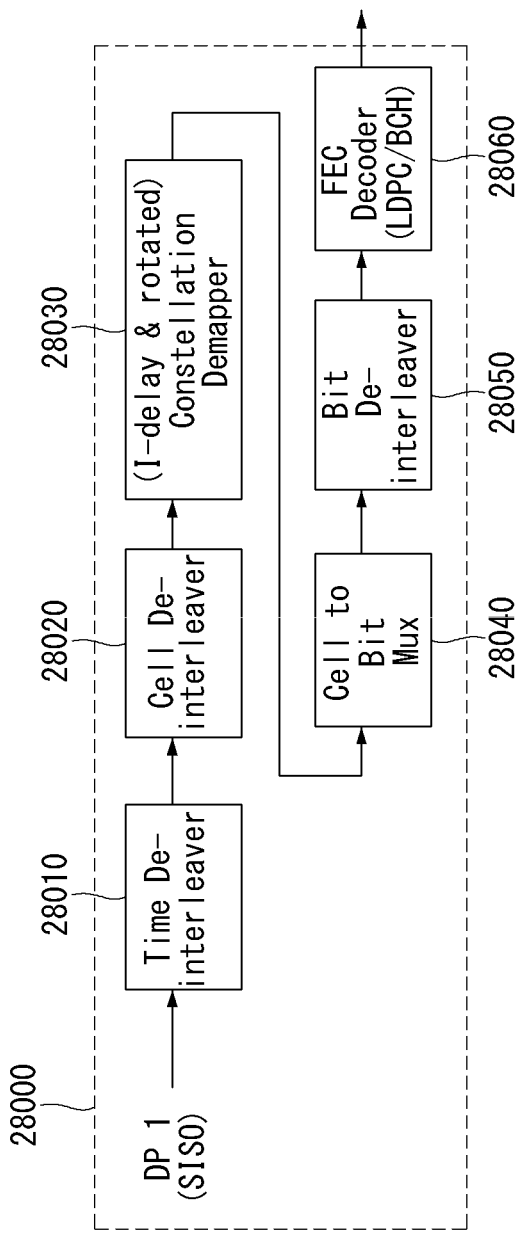
FIGS. 28a-28d illustrate one example of a demapping and decoding module of FIG. 9.
Figure 28B:
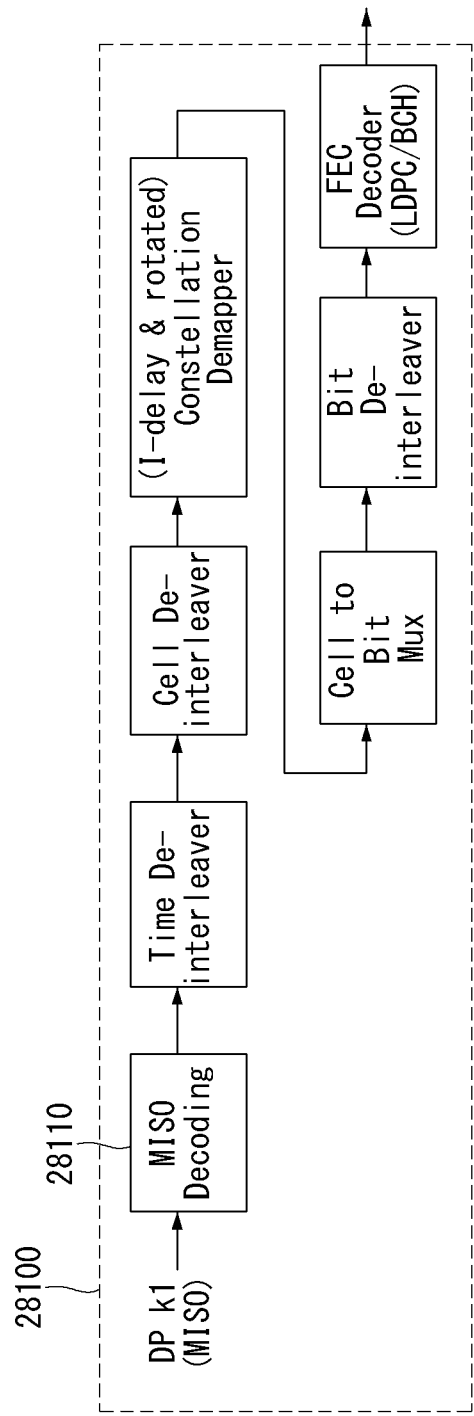
Figure 28C:
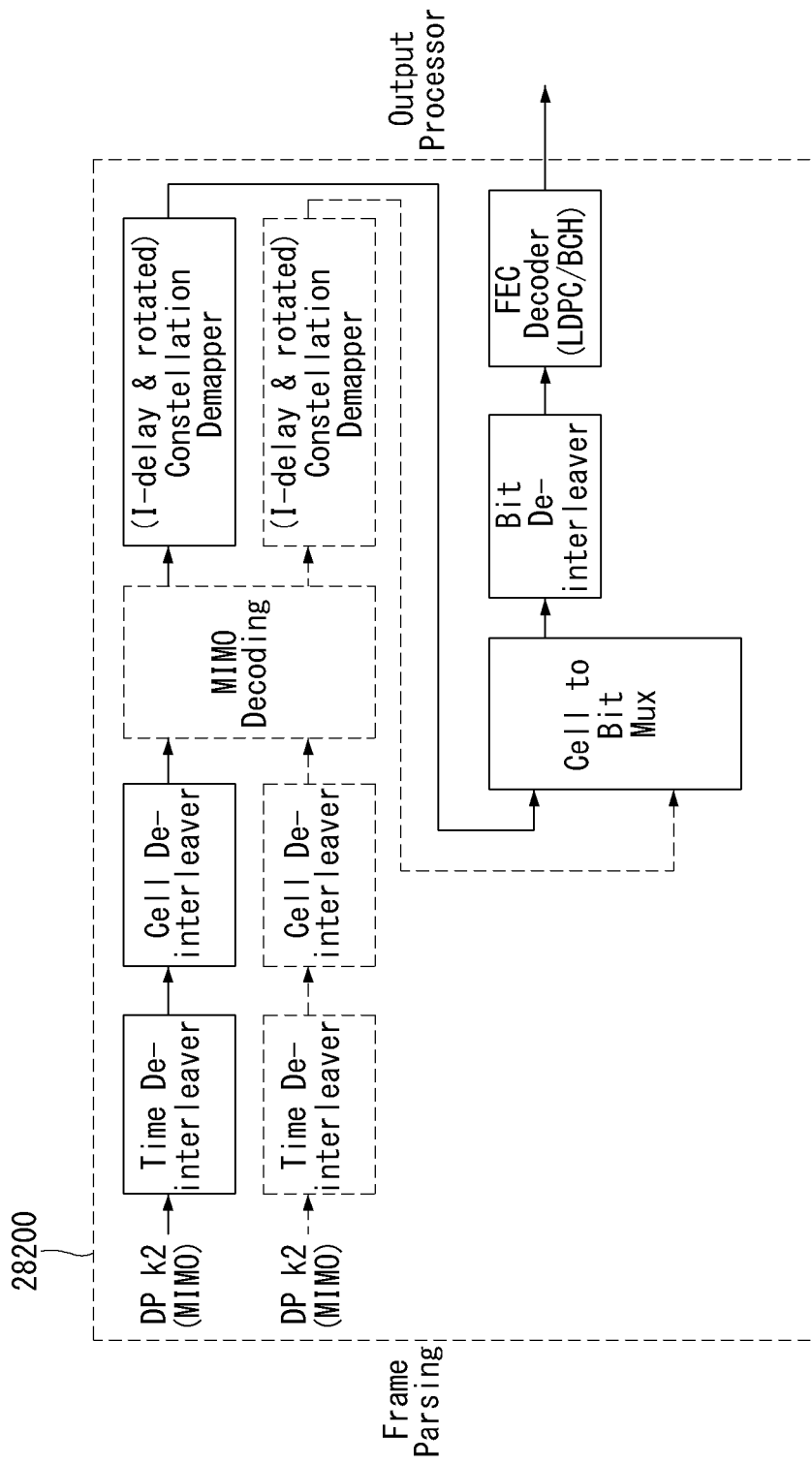
Figure 28D:
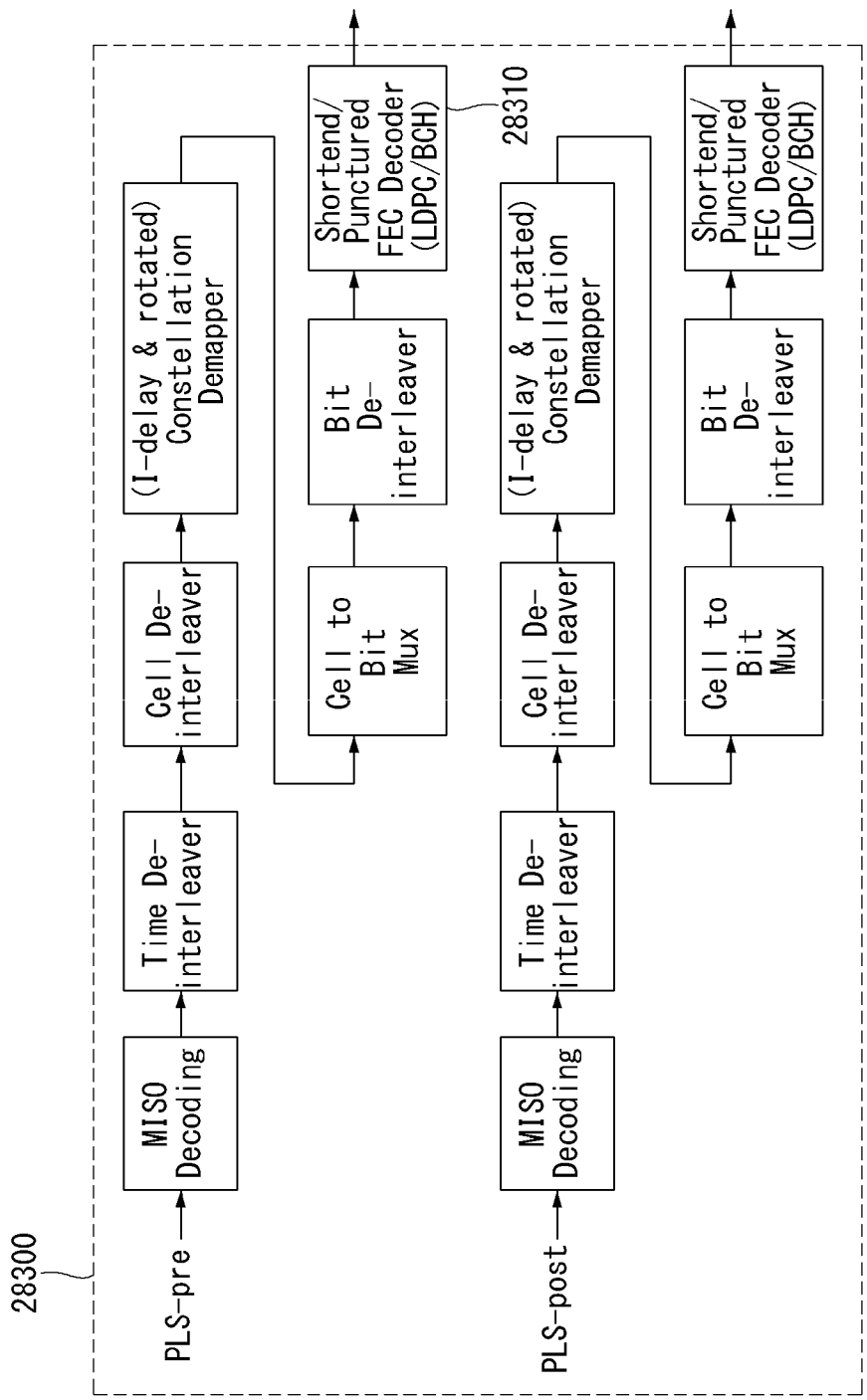

FIG. 27 illustrates a frame parsing module according to an embodiment of the present invention.

The frame parsing module illustrated in FIG. 27 correspond to the embodiment of the frame parsing module described in FIG. 9.

As illustrated in FIG. 27, the frame parsing module according to the embodiment of the present invention may include at least one or more block deinterleavers 27000 and at least one or more cell demapper 27100.

The block deinterleaver 27000 may perform deinterleaving for data per each signal block with respect to data input into respective data paths of m receiving antennas and processed in the synchronization and demodulation module. In this case, as described in FIG. 8, when pair-wise interleaving is performed at the transmitting side, the block deinterleaver 27000 may process two consecutive data for each input path as one pair. Therefore, the block deinterleaver 27000 may output two consecutive output data even when deinterleaving the data. Further, the block deinterleaver 27000 performs an inverse procedure of the interleaving procedure performed at the transmitting side to output the data according to an original data sequence.

The cell demapper 27100 may extract cells corresponding to common data from a received signal frame, cells corresponding to a data pipe, and cells corresponding to PLS data. In case of need, the cell demapper 27100 merges data distributed and transmitted to a plurality of parts to output the merged data as one stream. Further, as described in FIG. 7, when two consecutive cell input data are processed as one pair to be mapped, the cell demapper 27100 may perform the pair-wise cell demapping of processing two consecutive input cells as one unit as an inverse procedure corresponding thereto.

Further, the cell demapper 27100 may extract and output all PLS signaling data received through a current frame as PLS-pre and PLS-post data, respectively.

The aforementioned blocks may be omitted according to an intention of a designer or substituted by other blocks having a similar or the same function.

FIG. 28 illustrates a demapping and decoding module according to an embodiment of the present invention.

The demapping and decoding module illustrated in FIG. 28 corresponds to the embodiment of the demapping and decoding module described in FIG. 9.

As described above, the coding and modulation module of the transmitting apparatus according to the embodiment of the present invention may independently apply and process SISO, MISO, and MIMO schemes to input data pipes for respective paths. Therefore, the demapping and decoding module illustrated in FIG. 28 may also include blocks for SISO, MISO, and MIMO-processing data output from a frame parser to correspond to the transmitting apparatus, respectively.

As illustrated in FIG. 28, the demapping and decoding module according to the embodiment of the present invention may include a first block 28000 for the SISO scheme, a second block 28100 for the MISO scheme, and a third block 28200 for the MIMO scheme, and a fourth block 28300 processing PLS pre/post information. The demapping and decoding module illustrated in FIG. 28 is just an embodiment and the demapping and decoding module may include only the first block 28000 and the fourth block 28300, only the second block 28100 and the fourth block 28300, and only the third block 28200 and the fourth block 28300 according to the intension of the designer. That is, the demapping and decoding module may include blocks for processing the respective data pipes similarly or differently according to the intention of the designer.

Hereinafter, each block will be described.

The first block 28000 as a block for SISO-processing the input data pipe may include a time de-interleaver block 28010, a cell de-interleaver block 28020, a constellation demapper block 28030, a cell to bit mux block 28040, a bit de-interleaver block 28050, and an FEC decoder block 28060.

The time de-interleaver block 28010 may perform an inverse procedure of a time interleaver block. That is, the time de-interleaver block 28010 may deinterleave an input symbol interleaved in the time domain to an original position.

The cell de-interleaver block 28020 may perform an inverse procedure of a cell interleaver block. That is, the cell de-interleaver block 28020 may deinterleave positions of cells spread in one FEC block to original positions.

The constellation demapper block 28030 may perform an inverse procedure of a constellation mapper block. That is, the constellation demapper block 28030 may demap an input signal of a symbol domain to data of a bit domain. Further, the constellation demapper block 28030 may output bit data decided by performing a hard decision and output a log-likelihood ratio (LLR) of each bit corresponding to a soft decision value or a probabilistic value. When the transmitting side applies a rotated constellation in order to acquire an additional diversity gain, the constellation demapper block 28030 may perform 2-dimensional LLR demapping corresponding to the rotated constellation. In this case, the constellation demapper 28030 may perform a calculation so that the transmitting apparatus compensates a delay value performed with respect to an I or Q component at the time of calculating the LLR.

The cell to bit mux block 28040 may perform an inverse procedure of a bit to cell demux block. That is, the cell to bit mux block 28040 may restore bit data mapped in a bit to cell demux block to an original bit stream form.

The bit de-interleaver block 28050 may perform an inverse procedure of a bit interleaver block. That is, the bit de-interleaver block 28050 may deinterleave the bit stream output in the cell to bit mux block 28040 according to an original sequence.

The FEC decoder block 28060 may perform an inverse procedure of an FEC encoder block. That is, the FEC decoder block 28060 may correct an error which occurs on a transmission channel by performing LDPC decoding and BCH decoding.

The second block 28100 as a block for MISO-processing the input data pipe may include the time de-interleaver block, the cell de-interleaver block, the constellation demapper block, the cell to bit mux block, the bit de-interleaver block, and the FEC decoder block similarly to the first block 28000 as illustrated in FIG. 28, but the second block 28100 is different from the first block 28000 in that the second block 28100 further includes an MISO decoding block 28110. Since the second block 28100 performs a procedure of the same role from the time deinterleaver up to the output similarly to the first block 28000, a description of the same blocks will be omitted.

The MISO decoding block 28110 may perform an inverse procedure of the MISO processing block. When the broadcast transmitting/receiving system according to the embodiment of the present invention is a system using STBC, the MISO decoding block 28110 may perform Alamouti decoding.

The third block 28200 as a block for MIMO-processing the input data pipe may include the time de-interleaver block, the cell de-interleaver block, the constellation demapper block, the cell to bit mux block, the bit de-interleaver block, and the FEC decoder block similarly to the second block 28100 as illustrated in FIG. 28, but the third block 28200 is different from the second block 28100 in that the third block 28200 further includes an MIMO decoding block 28210. Operations of the time de-interleaver, cell de-interleaver, constellation demapper, cell to bit mux, and bit de-interleaver blocks included in the third block 28200 may be different from operations and detailed functions of the corresponding blocks included in the first and second blocks 28000 and 28100, but the blocks included in the third block 28200 are the same as the blocks included in the first and second blocks in terms of basic roles.

The MIMO decoding block 28210 may receive output data of the cell deinterleaver as an input with respect to m receiving antenna input signal and perform MIMO decoding as an inverse procedure of the MIMO processing block. The MIMO decoding block 28210 may perform maximum likelihood decoding in order to perform maximum decoding performance or sphere decoding for reducing complexity. Alternatively, the MIMO decoding block 28210 performs MMSE detection or perform iterative decoding combinationally with the MMSE detection to secure improved decoding performance.

The fourth block 28300 as a block for processing PLS pre/post information may perform SISO or MISO decoding. The fourth block 28300 may perform an inverse procedure of the fourth block.

The operations of the time de-interleaver, cell de-interleaver, constellation demapper, cell to bit mux, and bit de-interleaver blocks included in the fourth block 28300 may be different from operations and detailed functions of the corresponding blocks included in the first to third blocks 28000 to 28200, but the blocks included in the fourth block 28300 are the same as the blocks included in the first to third blocks in terms of basic roles.

A shortened/punctured FEC decoder 28310 may perform an inverse procedure of the shortened/punctured FEC encoder block. That is, the shortened/punctured FEC decoder 28310 may perform de-shortening and de-puncturing, and thereafter, FEC decoding data received while being shortened/punctured according to the length of the PLS data. In this case, since the FEC decoder used in the data pipe may be similarly used even in the PLS, separate FEC decoder hardware for only the PLS is not required, and as a result, system design is easy and efficient coding is available.

The aforementioned blocks may be omitted according to an intention of a designer or substituted by other blocks having a similar or the same function.

Consequently, as illustrated in FIG. 28, the demapping and decoding module according to the embodiment of the present invention may output to the output processor the data pipe and the PLS information processed for each path.

Figure 29:
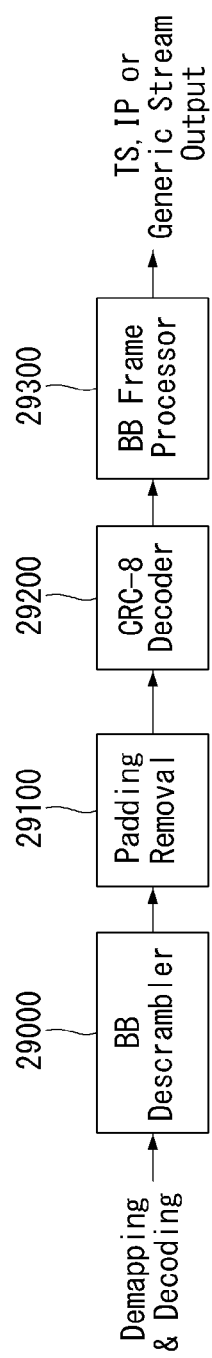
FIG. 29 illustrates one example of an output processor of FIG. 9.
Figure 30A:
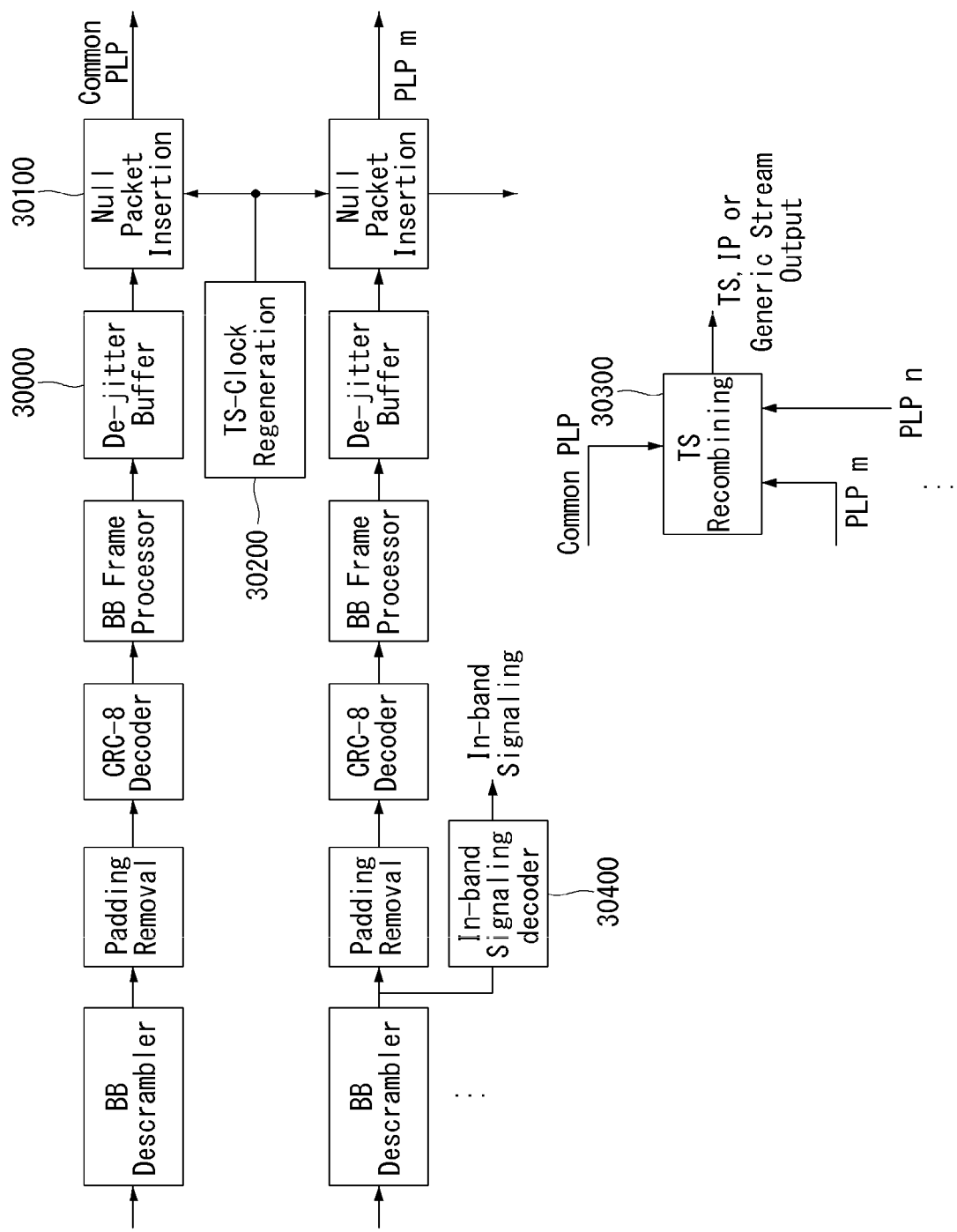
FIGS. 30a-30b illustrate another example of the output processor of FIG. 9.
Figure 30B:
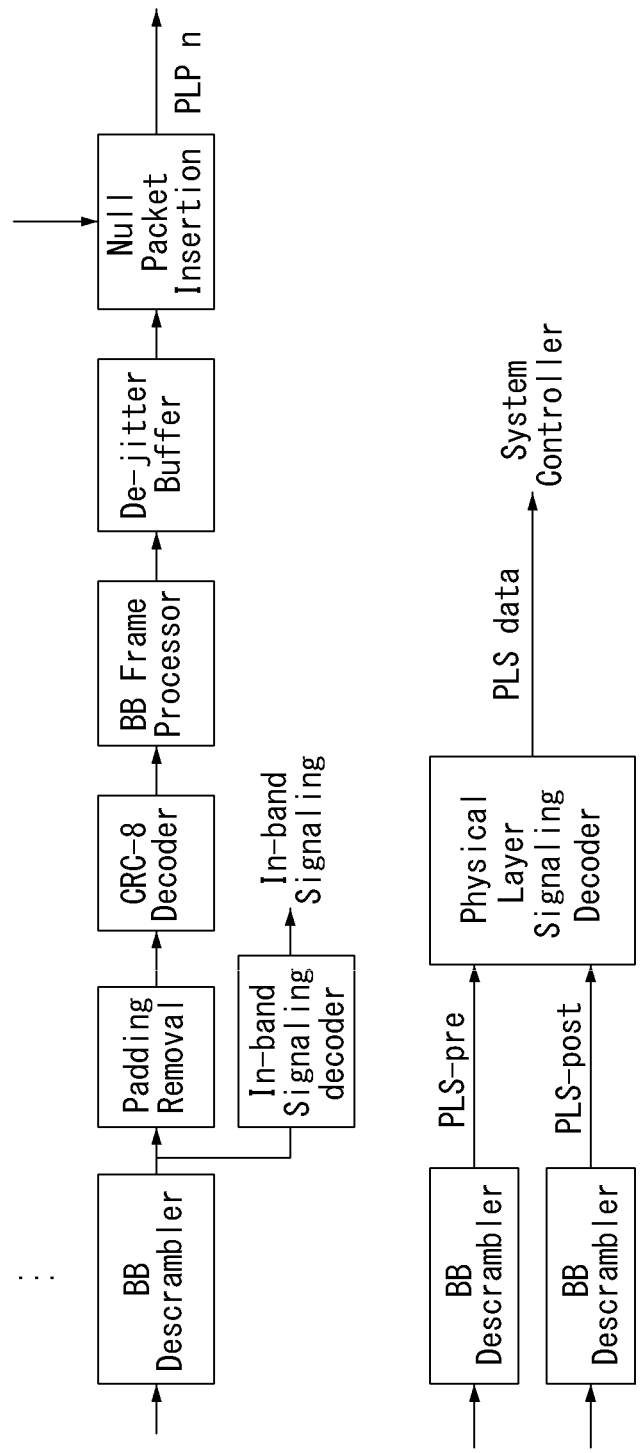
Figure 31A:
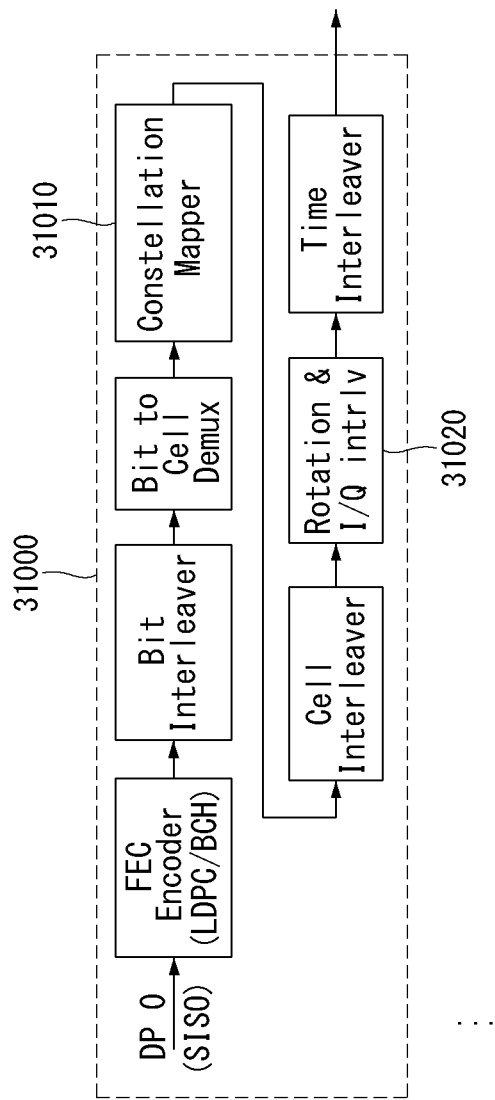
FIGS. 31a-31d illustrate a coding and modulation module according to another embodiment of the present invention.
Figure 31B:
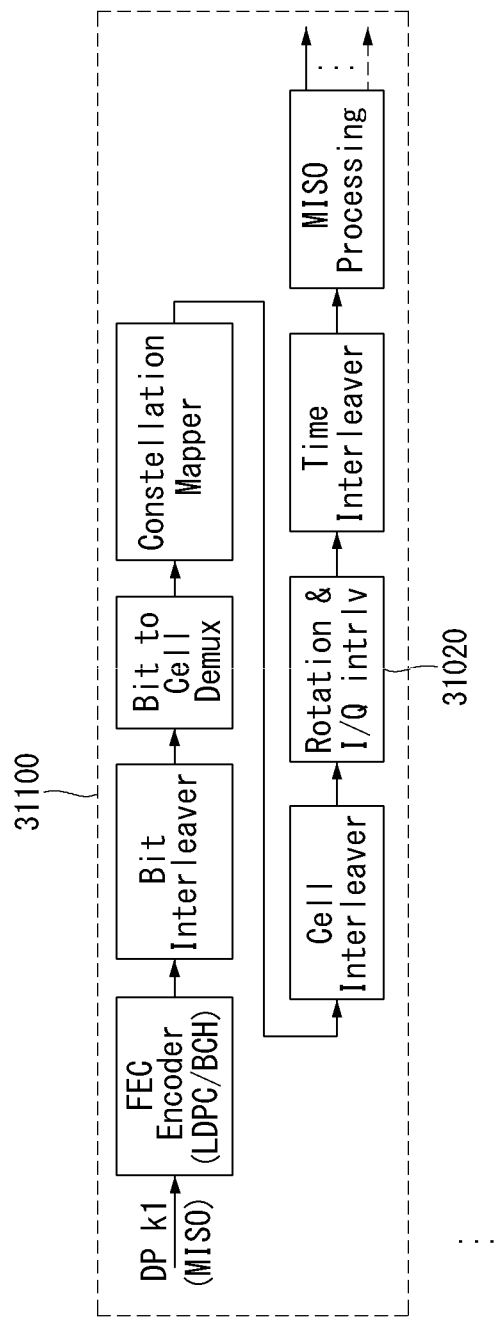
Figure 31C:
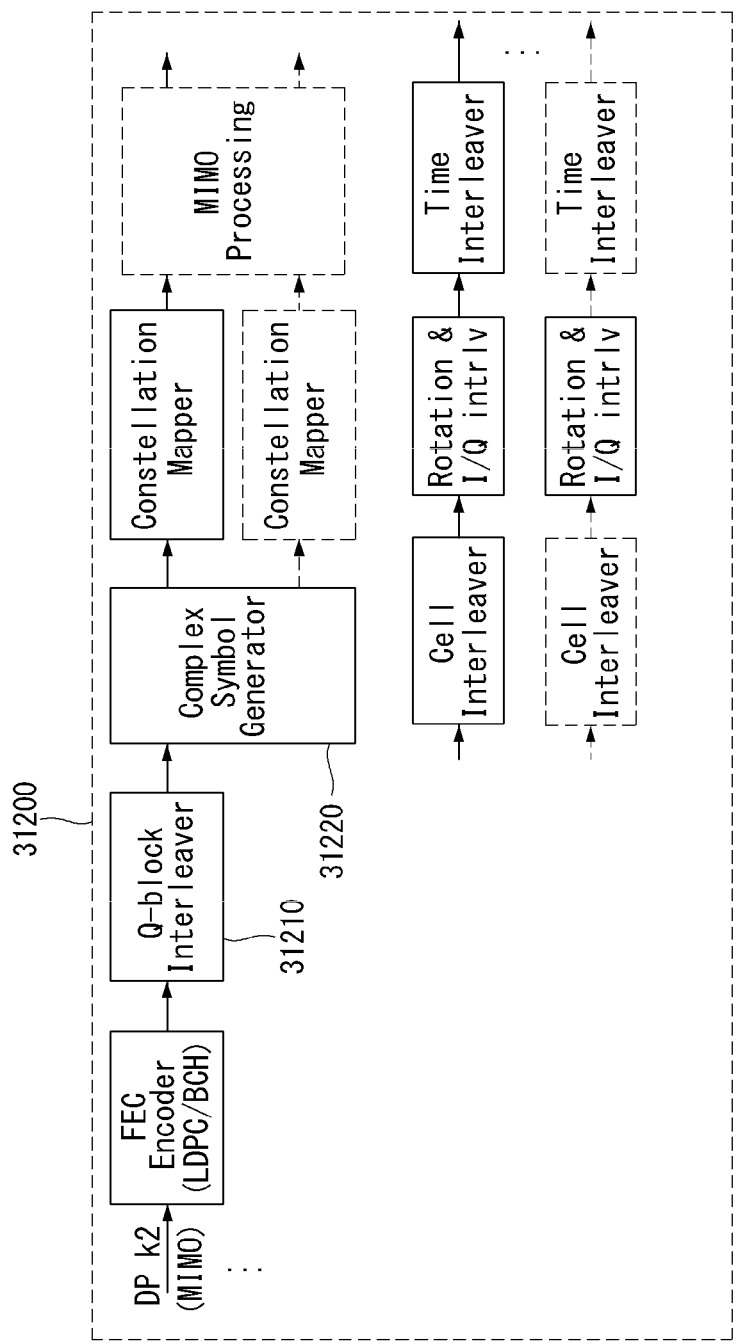
Figure 31D:
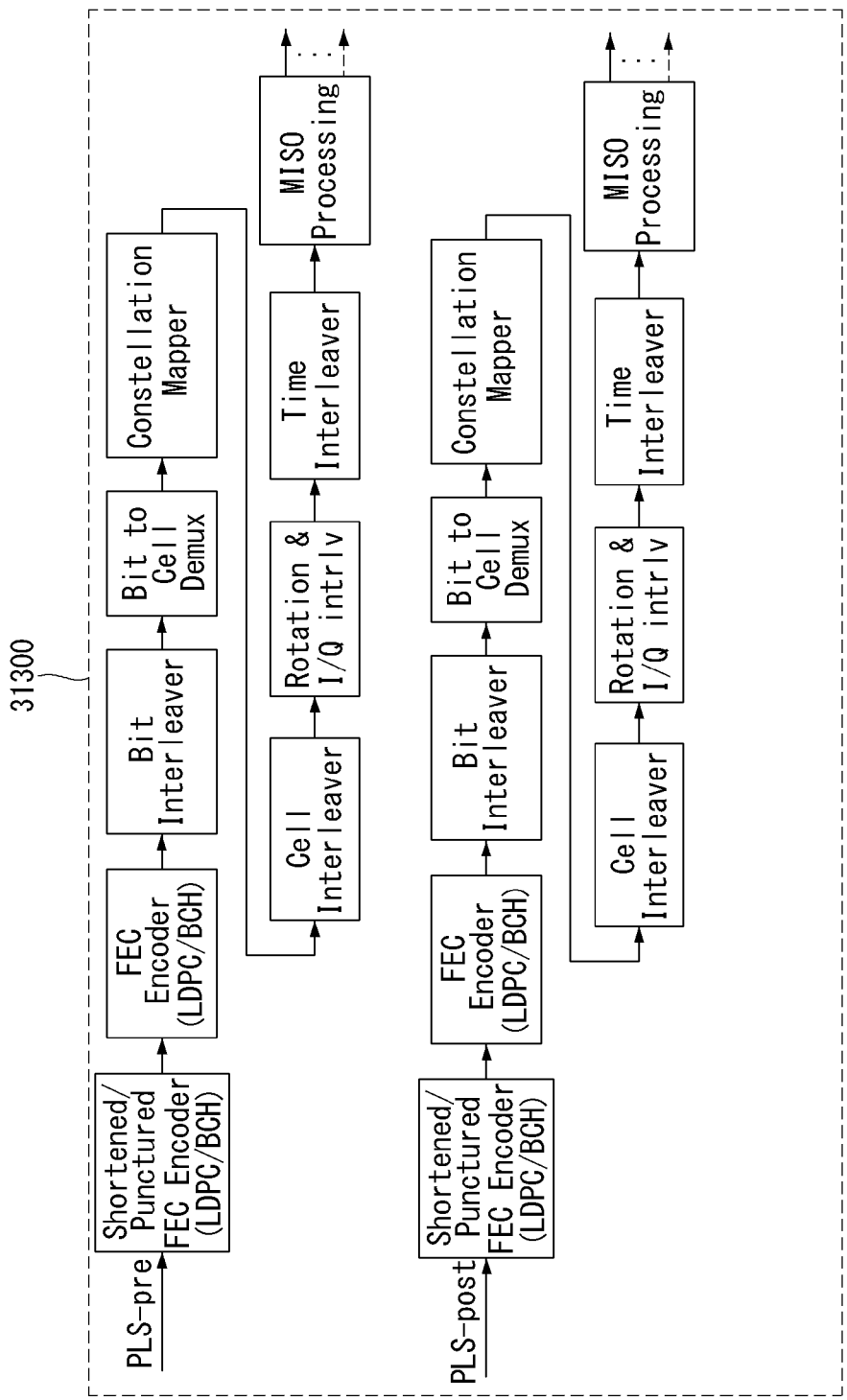
Figure 32A:
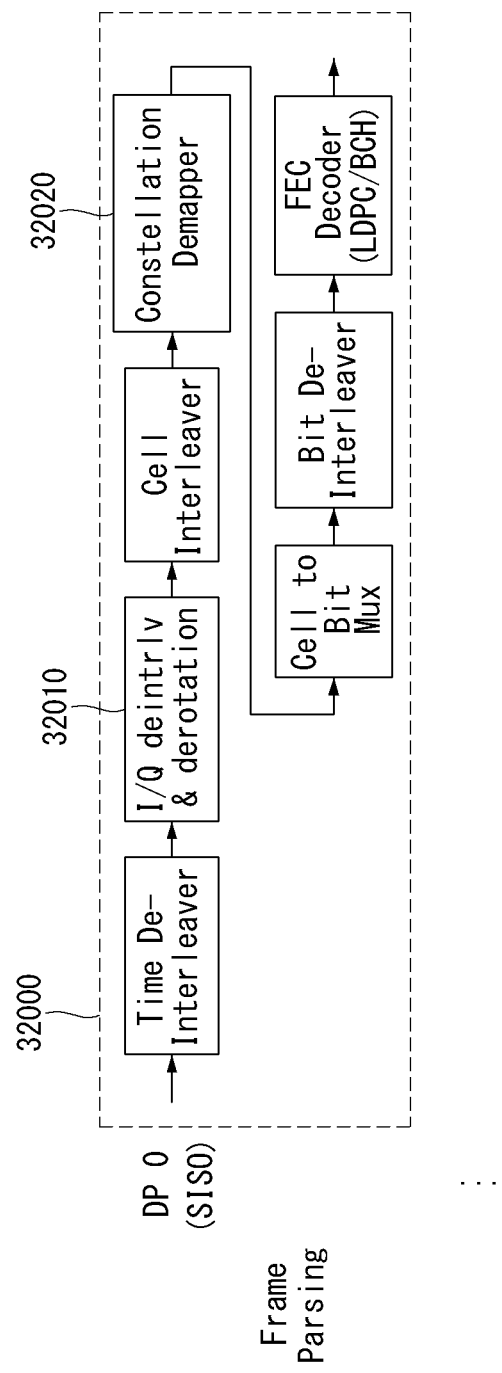
FIGS. 32a-32d illustrate a demapping and decoding module according to another embodiment of the present invention.
Figure 32B:
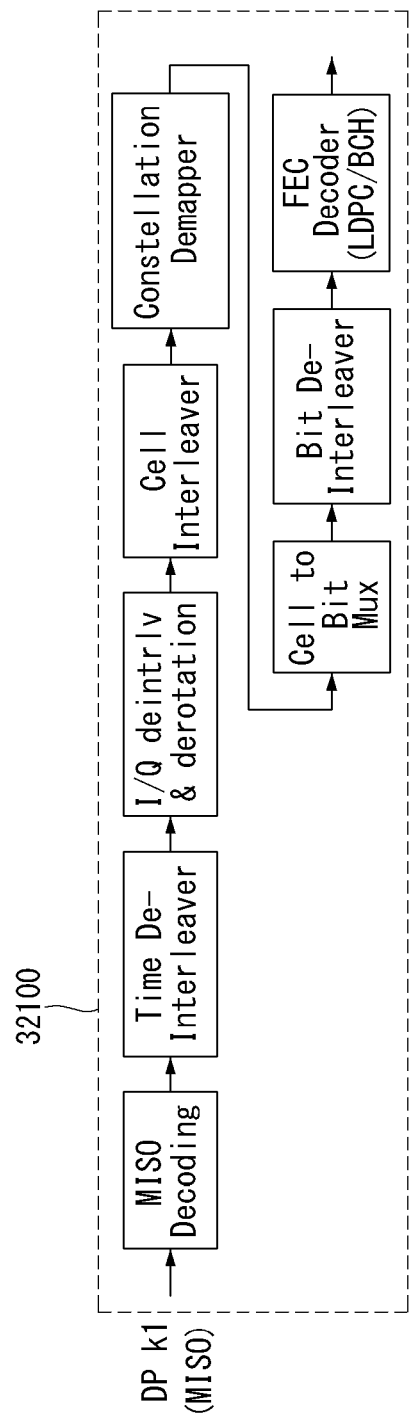
Figure 32C:
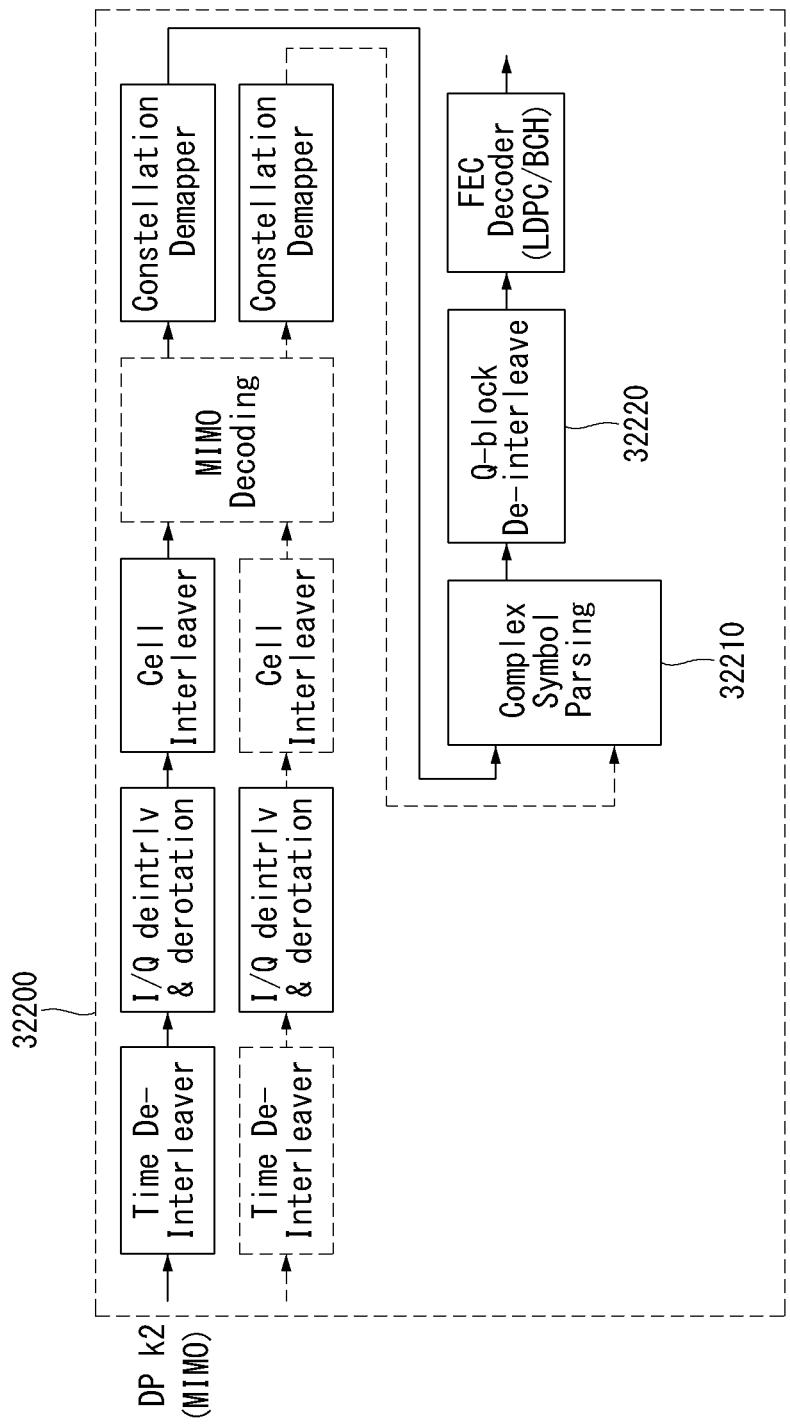
Figure 32D:
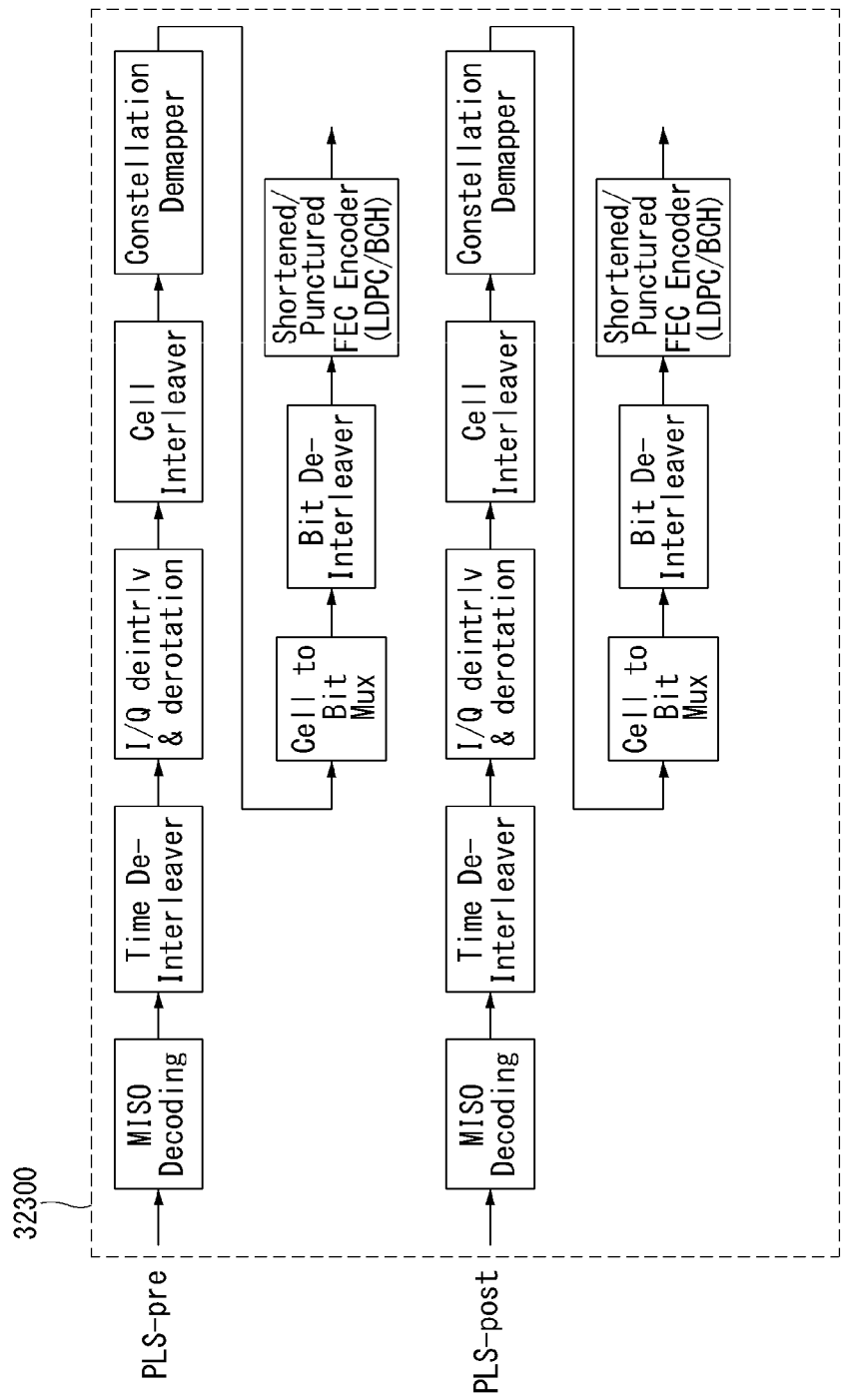

FIGS. 29 and 30 illustrate an output processor according to an embodiment of the present invention.

FIG. 29 illustrates an output processor according to an embodiment of the present invention.

The output processor illustrated in FIG. 29 corresponds to the embodiment of the output processor described in FIG. 9. Further, the output processor illustrated in FIG. 29 which is used to receive a single data pipe output from the demapping and decoding module and output a single output stream may perform an inverse operation of the input formatting module.

The output processor illustrated in FIG. 29 may include a BB scrambler 29000, a padding removable block 29100, a CRC-8 decoder block 29200, and a BB frame processor block 29300.

The BB scrambler block 29000 generates the same PRBS as used at the transmitting side with respect to an input bit stream and XOR-operates the PRBS and the bit stream to perform descrambling.

The padding removable block 29100 may remove a padding bit inserted by the transmitting side as necessary.

The CRC-8 decoder block 29200 perform CRC decoding of the bit stream received from the padding removable block 29100 to check a block error.

The BB frame processor block 29300 may decode information transmitted to the BB frame header and restore an MP3G-TS, an IP stream (v4 or v6), or a generic stream.

The aforementioned blocks may be omitted according to the intention of the designer or substituted by other blocks having a similar or the same function.

FIG. 30 illustrates an output processor according to another embodiment of the present invention.

The output processor illustrated in FIG. 30 corresponds to the embodiment of the output processor described in FIG. 9. Further, the output processor illustrated in FIG. 30 corresponds to the case of receiving multiple data pipes output from the demapping and decoding module. Decoding the multiple data pipes may include the case of merging common data which may be commonly applied to a plurality of data pipes and a data pipe associated with the common data and decoding the merged common data and data pipe or the case in which the receiving apparatus simultaneously decodes several services or service components (including a scalable video service).

The output processor illustrated in FIG. 30 may include the BB descrambler block, the padding removable block, the CRC-8 decoder block, and the BB frame processor block 29300 similarly to the output processor. The respective blocks may be different from the blocks described in FIG. 29 in terms of the operations and the detailed operations, but the respective blocks are the same as the blocks of FIG. 29 in terms of the basic role.

A de-jitter buffer block 30000 included in the output processor illustrated in FIG. 30 may compensate a delay arbitrarily inserted at the transmitting side according to a restored time to output (TTO) parameter for synchronizing the multiple data pipes.

Further, a null packet insertion block 30100 may restore a null packet removed in the stream by referring to restored deleted null packet (DNP) information and output the common data.

A TS clock regeneration block 30200 may restore detailed time synchronization of an output packet based on ISCR—input stream time reference information.

A TS recombining block 30300 recombines the common data output from the null packet insertion block 30100 and the data pipes associated with the common data to restore the recombined common data and data pipes to the original MPEG-TS, IP stream (v4 or v6), or generic stream and output the restored MPEG-TS, IP stream (v4 or v6), or generic stream. The TTO, DNP, and ISCR information may be all acquired through the BB frame header.

An in-band signaling decoder block 30400 may restore and output in-band physical layer signaling information transmitted through a padding bit field in each FEC frame of the data pipe.

The output processor illustrated in FIG. 30 performs BB descrambling PLS-pre information and PLS-post information input according to the PLS-pre path and the PLS-post path, respectively and decodes the descrambled data to restore the original PLS data. The restored PLS data may transferred to the system controller in the receiving apparatus and the system controller may provide a required parameter to the synchronization and demodulation module, the frame parsing module, the demapping and decoding module, and the output processor module in the receiving apparatus.

The aforementioned blocks may be omitted according to the intention of the designer or substituted by other blocks having a similar or the same function.

FIG. 31 illustrates a coding and modulation module according to another embodiment of the present invention.

The coding and modulation module illustrated in FIG. 31 may include a first block 31000 for the SISO scheme, a second block 31100 for the MISO scheme, and a third block 31200 for the MIMO scheme, and a fourth block 31300 for processing PLS pre/post information in order to control QoS for each service or service component transmitted through each data pipe. Further, the coding and modulation module according to the embodiment of the present invention may include blocks for similarly or differently processing the respective data pipes according to the intention of the designer as described above. The first to fourth blocks 31000 to 31300 illustrated in FIG. 31 may include substantially the same blocks as the first to fourth blocks.

However, the first to fourth blocks 31000 to 31300 are different from the aforementioned first to fourth blocks in that a function of a constellation mapper block 14010 included in the first to third blocks 31000 to 31200 is different from that of the constellation mapper block included in the first to third blocks, and a rotation and I/O interleaver block 31020 is included between the cell interleaver and the time interleaver of the first to fourth blocks 31000 to 31300, and a configuration of the third block 31200 for the MIMO scheme is different from that of the third block for the MIMO scheme.

The constellation demapper block 31010 illustrated in FIG. 31 may map an input bit word to a complex symbol.

The constellation mapper block 31010 illustrated in FIG. 31 may be commonly applied to the first to third blocks 31000 to 31200 as described above.

The rotation and I/O interleaver block 31020 independently interleaves in-phase and quadrature-phase components of respective complex symbols of cell-interleaved data output from the cell interleaver to output the interleaved components by the unit of the symbol. The number of input data and output symbols of the rotation and I/O interleaver block 31020 is two or more and may be changed according to the intention of the designer. Further, the rotation and I/O interleaver block 31020 may not interleave the in-phase components.

The rotation and I/O interleaver block 31020 may be commonly applied to the first to fourth blocks 31000 to 31300 as described above. In this case, whether the rotation and I/O interleaver block 31020 is applied to the fourth block 31300 for processing the PLS pre/post information may be signaled through the aforementioned preamble.

The third block 31200 for the MIMO scheme may include a Q-block interleaver block 31210 and a complex symbol generator block 31220 as illustrated in FIG. 31.

The Q-block interleaver block 31210 may perform permutation of a parity part of the FEC-encoded FEC block received from the FEC encoder. Therefore, a parity part of an LDPC H matrix may be made in a cyclic structure similarly to an information part. The Q-block interleaver block 31210 permutates sequences of bit blocks having a Q size in the LDPC H matrix and thereafter, performs row-column block interleaving of the bit blocks to generate and output a final bit stream.

The complex symbol generator block 31220 may receive the bit streams output from the Q-block interleaver block 14210 and map the received bit streams to the complex symbol and output the mapped bit streams and complex symbol. In this case, the complex symbol generator block 31220 may output the symbols through at least two paths. This may be changed according to the intension of the designer.

The aforementioned blocks may be omitted according to the intention of the designer or substituted by other blocks having a similar or the same function.

Consequently, as illustrated in FIG. 31, the coding and modulation according to another embodiment of the present invention may output the data pipe, the PLS-pre information, and the PLS-post information processed for each path to a frame structure module.

FIG. 32 illustrates a demapping and decoding module according to another embodiment of the present invention.

The demapping and decoding module illustrated in FIG. 32 corresponds to another embodiment of the demapping and decoding module described in FIGS. 9 and 28. Further, the demapping and decoding module illustrated in FIG. 32 may perform an inverse operation of the coding and modulation module described in FIG. 31.

As illustrated in FIG. 32, the demapping and decoding module according to another embodiment of the present invention may include a first block 32000 for the SISO scheme, a second block 32100 for the MISO scheme, a third block 32200 for the MIMO scheme, and a fourth block 32300 for processing the PLS pre/post information. Further, the demapping and decoding module according to the embodiment of the present invention may include blocks for similarly or differently processing the respective data pipes according to the intention of the designer as described above. The first to fourth blocks 32000 to 32300 illustrated in FIG. 32 may include substantially the same blocks as the first to fourth blocks 28000 to 28300 described in FIG. 28.

However, the first to fourth blocks 32000 to 32300 are different from the aforementioned first to fourth blocks in that an I/Q deinterleaver and derotation block 32010 is included between the time deinterleaver and the cell deinterleaver, a function a constellation demapper block 15020 included in the first to third blocks 32000 to 32200 is different from the function of the constellation mapper 28030 included in the first to third blocks 28000 to 28200 of FIG. 28, and a configuration of the third block 32200 for the MIMO scheme is different from that of the third block 28200 for the MIMO scheme illustrated in FIG. 28. Hereinafter, the same blocks as FIG. 28 will not described and the aforementioned differences will be primarily described.

The I/Q deinterleaver and derotation block 32010 may perform an inverse procedure of the rotation and I/Q interleaver block 31020 described in FIG. 31. That is, the I/Q deinterleaver and derotation block 32010 may deinterleave I and Q components I/Q interleaved and transmitted at the transmitting side and derotate and output the complex symbol having the restored I/Q component again.

The I/Q deinterleaver and derotation block 32010 may be commonly applied to the first to fourth blocks 32000 to 32300 as described above. In this case, whether the I/Q deinterleaver and derotation block 32010 is applied to the fourth block 32300 for processing the PLS pre/post information is may be signaled through the aforementioned preamble.

The constellation demapper block 32020 may perform an inverse procedure of the constellation mapper block 31010 described in FIG. 31. That is, the constellation demapper block 32020 may not perform derotation, but demap the cell-deinterleaved data.

The third block 32200 for the MIMO scheme may include a complex symbol generator block 32210 and a Q-block deinterleaver block 32220 as illustrated in FIG. 32.

The complex symbol parsing block 32210 may perform an inverse procedure of the complex symbol generator block 31220 described in FIG. 31. That is, the complex symbol parsing block 32210 may parse the complex data symbol, and demap the parsed complex data symbol to the bit data and output the data. In this case, the complex symbol parsing block 32210 may receive the complex data symbols through at least two paths.

The Q-block deinterleaver block 32220 may perform an inverse procedure of the Q-block interleaver block 31210 described in FIG. 31. That is, the Q-block deinterleaver block 32220 may restore the Q-size blocks by the row-column deinterleaving, restore the permutated sequences of the respective blocks to the original sequences, and thereafter, restore the positions of the parity bits to the original positions through the parity deinterleaving and output the parity bits.

The aforementioned blocks may be omitted according to the intention of the designer or substituted by other blocks having a similar or the same function.

Consequently, as illustrated in FIG. 32, the demapping and decoding module according to another embodiment of the present invention may output the data pipe and the PLS information processed for each path to the output processor.

Hereinafter, a new BBF header structure for reducing the overhead of the BBF transmission and adding various functions using the padding field proposed in the specification will be described in detail.

Figure 33:
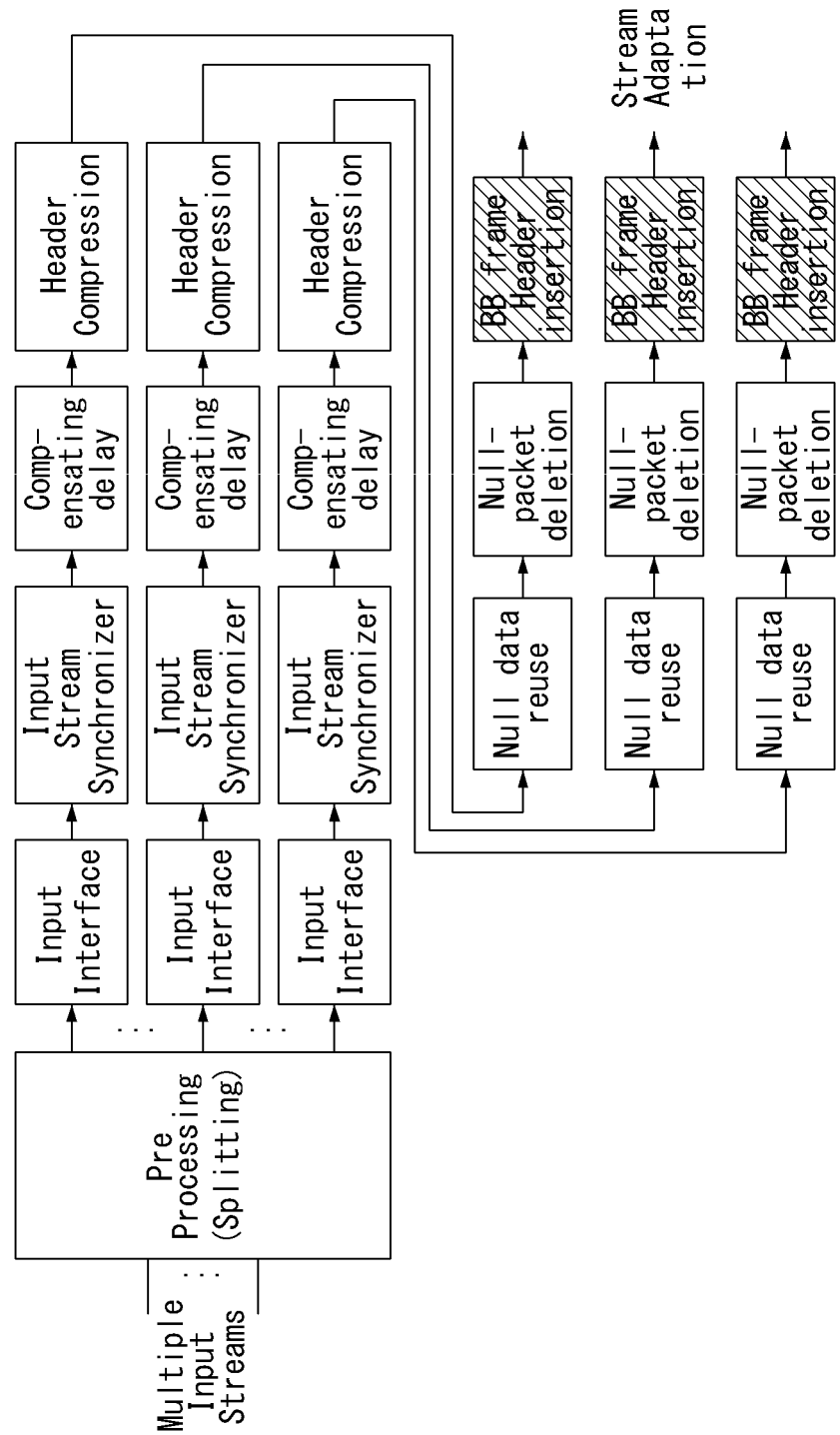
FIG. 33 illustrates one example of a mode adaptation module proposed in the specification.

FIG. 33 illustrates one example of a mode adaptation module proposed in the specification.

As described above, the input formatting module includes the mode adaptation module.

A configuration of the mode adaptation module of FIG. 33 may be partially different from that of the mode adaptation module described above.

As illustrated in FIG. 33, the mode adaptation module may be configured to include at least one of a pre processing or splitting block 3310, an input interface block 3320, an input stream synchronizer block 3330, a delay compensating block 3340, a header compression block 3350, a null data reuse block 3360, a null packet detection block 3370, and a BB frame header insertion block 3380.

The pre processing block may split or demultiplex a plurality of input streams to a plurality of data pipes. Herein, the data pipe may be referred to as a physical layer pipe (PLP). Herein, the input stream may be a MPEG2-TS, an Internet protocol (IP), and/or the generic stream (GS).

In some embodiments, an input stream having a different form may also be available.

The header compression block may compress a packet header. This may used to increase transmission efficiency of the TS or IP input stream. Since the receiver has had a priory information of the header, known data may be removed at the transmitting side. For example, information such as the PID, or the like may be compressed and information having different forms may be removed or substituted. In some embodiments, the header compression block may be positioned subsequent to the null packet deletion block.

The null data reuse block may perform an operation of inserting null data into the packet after the header compression. This block may be omitted in some embodiments.

The BB frame header insertion block may operate in a different mode than the aforementioned BB frame header insertion block.

The specification provides a method for reducing signaling of a data field length of the frame (Data field length signaling reduction method).

Further, the specification provides a method for reducing the overhead for the transmission of the BB frame to the FEC block.

That is, a new BB frame configuration method proposed in the specification may be performed in the BB frame header insertion block.

By the method proposed in the specification, the BB frame and the BB frame header may be configured. The specification may relate to a procedure in which the BB frame is generated in order to transfer the input stream to the FEC block through the input processing.

Further, the specification may relate to a method for increasing the transmission efficiency by decreasing the size of the BB frame header. Detailed contents associated with the BB frame header insertion block will be described below.

In the related art, in the BB frame, a data field length (DFL) was allocated to each BB frame header in order to notify the length of the data field to the receiving apparatus. The DFL may be 16 bits or 11 bits. As a result, the related art is large in overhead for the BBF transmission.

When the data field length is changed in the BB frame having the continuously same size, the BB frame may not fully be filled with the data or the BB frame may include in-band signaling information.

In another related art, the BB frame transmitted only an indicator instead of directly notifying the length of the data field. In addition, the BB frame signaled the length of a padding of the BB frame in the padding. However, in this case, since the in-band signaling is not considered, when the in-band signaling is operated, there may be a restriction.

A method proposed in the specification may be a method for configuring the BB frame header that can reduce the DFL and insert an additional field. Herein, the additional field may indicate a type of the in-band signaling, or the like or may be used for another purpose.

Through the method proposed in the specification, the overhead for the BBF transmission may be minimized and various functions may be added to the padding (alternatively, stuffing) field.

Figure 34:
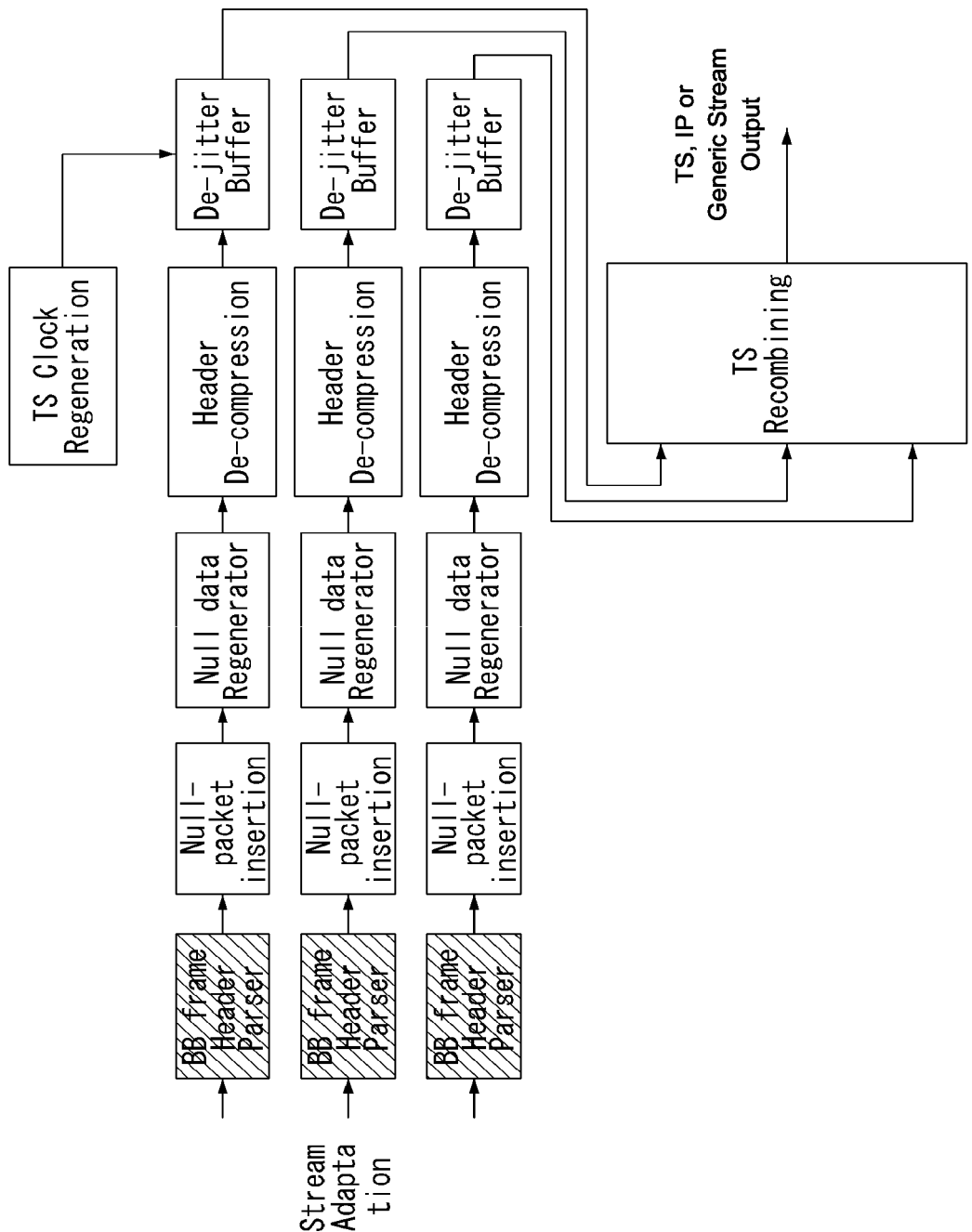
FIG. 34 illustrates one example of an output processor proposed in the specification.

FIG. 34 illustrates one example of an output processor proposed in the specification.

As described above, the output processor may include the BB frame header parser block. Components the output processor of FIG. 34 may be partially different from those of the output processor described above.

The output processor may be configured to include at least one of a BB frame header parser block 3410, a null packet insertion block 3420, a null data regenerator block 3430, a header decompression block 3440, a TS clock regeneration block 3450, a de-jitter buffer block 3460, and a TS recombining block 3470.

Herein, the null packet insertion block, the TS clock regeneration block, the de-jitter buffer bloc, and the TS recombining block may perform the same operations as the blocks of the output processor.

The BB frame header configuring method proposed in the specification may correspond to the BB frame header parser block at the receiving side (alternatively, the receiving apparatus or the receiver).

The BB frame header parser block 3410 may operate differently from the BB frame header parser block. The BB frame header parser block 3410 may perform an operation of parsing the BB frame header according to the method proposed in the specification.

The BB frame and the BB frame header configuring method proposed in the specification will be described below.

The null data regeneration block may correspond to the null data reuse block at the receiving side. The null data regeneration block may output an output to the heard decompression block. This block may be omitted in some embodiments.

The header decompression block may correspond to the header compression block at the receiving side. The header decompression block may restore the compression of the compressed packet header. As described above, the packet header may be compressed to increase the transmission efficiency of the TS or IP input stream. In some embodiments, the header decompression block may be positioned ahead of the null packet insertion block.

Figure 35:
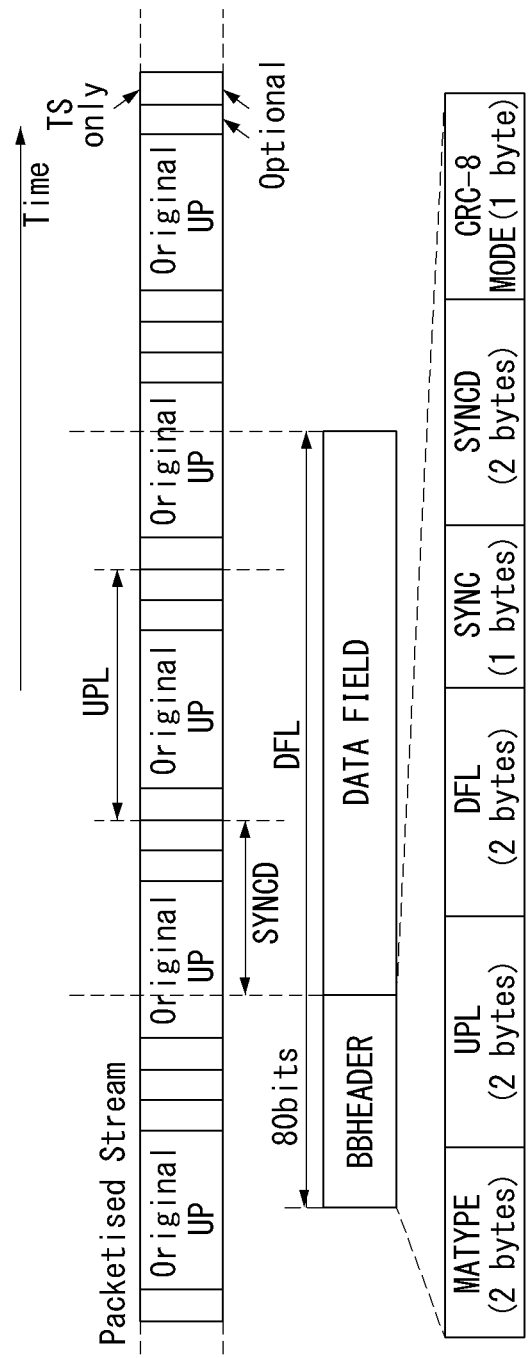
FIG. 35 illustrates one example of a BB frame structure in the related art.

FIG. 35 illustrates one example of a BB frame structure in the related art.

Data streams input into the input formatting module, in particular, the mode adaptation module may be sliced with an appropriate length so that the BICM module may perform FEC. Therefore, the BB frame may be generated.

The length of the data field of the BB frame corresponds to a value acquired by subtracting the length of the BB frame header from the total length of the BB frame.

An actual user packet (UP) may be inserted into a data field part of the BBF.

The length of the data field may be notified in the data field length (DFL) field of the BB frame header. The DFL field may be expressed as DFL.

The BB frame generated through input formatting may be encoded in a predetermined FEC block.

Herein, the total length of the BB frame may be fixed.

Further, when the length of the data field of the BBF is changed, the BB frame may be not fully filled with the UP because the UP is not sufficient or the in-band signaling information may be intentionally included.

When the BB frame may be not fully filled, the corresponding space may be filled with stuffing. The stuffing may be expressed as the padding.

FIG. 36 illustrates yet another example of the BB frame structure in the related art.

As illustrated in FIG. 36b, when the data field (alternatively, payload) of the BB frame is not fully filled with data to be transmitted, stuffing bytes may be inserted.

A STUFFI field may be inserted into the BBF header in order to signal the stuffing bytes. The BBF header is a TS header.

The STUFFI field represents an indicator of 1 bit indicating whether the stuffing bytes are present in the BB frame.

When the payload of the BB frame is fully filled with the UP, the stuffing bytes are not present. In this case, the STUFFI may be set to '0'.

When the payload of the BB frame is not fully filled with the UP, the stuffing bytes may be present. In this case, the STUFFI may be set to '1'.

When the stuffing bytes are included in the BB frame, the length of the stuffing byte may be verified through a first byte of the BB frame payload.

As one example, when the first byte value of the BB frame payload is 0xFF, one stuffing byte (stuffing byte of 1 byte) may be included in the BB frame payload.

When values of the first byte and a second byte of the BB frame payload are 0xFE and 0xFF, respectively, two stuffing bytes may be included in the BB frame payload.

Herein, when the stuffing bytes are two or more (the size of the stuffing byte is 2 bytes or more), the first and second byte values are set to MSB and LSB, respectively to signal the length of the stuffing byte.

In a table of FIG. 36a, 'N' represents the total length of the stuffing byte.

When a value of 'N' is 1 byte, the length of a field indicating the total length of the stuffing byte may be 1 byte. In this case, the field value may be set to 0xFF.

Herein, the field indicating the total length of the stuffing byte may be expressed as a stuffing byte length field.

When the value of 'N' is 2 bytes, the length of the length field of the stuffing byte may be 2 bytes.

In this case, the stuffing byte length field value may be set to 0xFE and 0xFF.

When the value of 'N' is '3 or more', as one example, even when N has a value between 3 and 65278, the length of the stuffing byte length field may be 2 bytes.

In this case, the stuffing byte length field may be constituted by the MSB and the LSB.

That is, the 2-byte stuffing byte length field may signal the total length of the stuffing byte.

As illustrated in FIG. 36, additional stuffing bytes may be present subsequent to the MSB and the LSB. That is, since the total stuff byte length is N and the lengths of the MSB and the LSB are 2 bytes, the length of the subsequent stuffing byte is N−2 bytes.

FIG. 37 illustrates yet another example of the BB frame structure in the related art.

As illustrated in FIG. 37, a 2-bit indicator may be used in order to indicate a state of the stuffing byte. The indicator may be expressed as a padding indicator (PADI).

When the stuffing byte, that is, the padding is not included in the BBF payload (alternatively, the data field or the FEC frame), the PADI may be set to '00'.

In a first BB frame illustrated in FIG. 37b, the PADI may be set to '00' and it may be verified that no padding in the BBF payload.

When the PADI is '01', it may be represented that the length of the padding included in the BBF payload is 1 byte.

In a second BB frame illustrated in FIG. 37b, the PADI may be set to '01' and it may be verified that the length of the padding is 1 byte. 'P' which is shown represents the padding byte.

When the PADI is '10', it may be represented that the padding bytes are two or more.

In this case, the padding field may signal the length of the padding by using the MSB and the LSB.

In a third BB frame illustrated in FIG. 37b, it can be seen that the PADI value is set to '10' and the first and second bytes of the padding field are allocated to the MSB and the LSB, respectively.

An additional padding marked with 'P' may be present subsequent to the MSB and the LSB.

FIG. 38 illustrates one example of a BB frame structure proposed in the specification.

The specification provides the following scheme for the BB frame and the configuration of the BB frame header.

The BB frame may be configured to include at least one of the BB frame header, the stuffing field, and the payload.

FIG. 38 illustrates one example of a BB frame structure in which the stuffing field is positioned ahead of the payload.

The stuffing field may be positioned subsequent to the payload in some embodiments and this will be described in detail in FIGS. 40 and 41.

The stuffing field and the payload are combined to be referred to as the BB frame payload (alternatively, the BB frame data field or FEC frame).

The BB frame header may describe a format of the payload, that is, the data filed.

Further, information associated with a deleted null packet (DNP) or an input stream synchronizer (ISSY) may be additionally inserted ahead of the stuffing field.

As described above, the payload may mean the data field.

The BB frame header may include the STUFFI field.

The STUFFI field may serve as the indicator indicating whether the stuffing bytes are present in the BB frame.

The STUFFI field may be 1 bit. In some embodiments, the position of the STUFF1 may be changed.

As one example, when the STUFFI value is '0', the BB frame does not include the stuffing field and may not include event he signaling field.

When the STUFFI field value is '1', the BB frame may include stuffing field or the in-band signaling field. That is, information other than the UP, that is, the padding or in-band field may be additionally present in the payload.

In some embodiments of the present invention, meanings represented by '0' and '1' of the STUFFI value may be switched to each other.

The stuffing field may include at least one of a stuffing field header and a stuffing data area.

The stuffing data area may include at least one of stuffing data and in-band signaling information.

The stuffing field header may be 2 bytes in some embodiments.

Further, the stuffing field header may include at least one of STUFF_ONE (alternatively, PAD_ONE), STUFF_TYPE (PAD_TYPE), and STUFF_LEN (alternatively, PAD_LEN).

A $1^{st}$ byte illustrated in FIG. 38 represents a first byte of the stuffing field.

A $2^{nd}$ byte may also be included in the stuffing field. In some embodiments, first two bytes ($1^{st}$ byte and $2^{nd}$ byte) may correspond to the stuffing field header.

In some embodiments, a third byte ($3^{rd}$ byte) or later may be included in the stuffing data area or the payload.

The PAD_ONE field may be expressed as a STUFF_ONE field in some embodiments.

When the STUFFI is '1', STUFF_ONE may be verified. The STUFF_ONE may represent whether the length of the stuffing byte is 1 byte. The STUFF_ONE may be a 1-bit MSB. When the STUFF_ONE is 1, the length of the stuffing byte may be 1 byte. In this case, STUFF_LEN_LSB representing the length of the stuffing byte may not be used.

Further, all values of STUFF_LEN_MSB may be set to 0. In this case, all values of STUFF_LEN_MSB may be set to 1. That is, in some embodiments, the 1-byte stuffing byte may have a value of 00000000, 11111111, 10000000, or 01111111.

When the STUFF_ONE is 0, the length of the stuffing byte may be larger than 1 byte.

In this case, the 2-byte stuffing field header may be used to represent the length and the type of the stuffing data area.

The values of the STUFF_ONE may be switched meanings to each other depending on the designer. That is, the meanings represented by 1 and 0 may be switched to each other.

The illustrated STUFF_ONE (PAD_ONE) may be positioned at the first bit of the first byte. The position may be changed in some embodiments. The STUFF_ONE may be positioned at the BB frame header in some embodiments.

In some embodiments, one field of 2 bits, which serves as the STUFFI and the STUFF_ONE may be configured in some embodiments. Since each of the STUFFI and the STUFF_ONE is 1 bit, one field of 2 bits is configured and the roles of the STUFFI and the STUFF_ONE may be substituted. The field may be positioned at the BB frame header or in the stuffing field.

PAD_LEN may be referred to as STUFF_LEN in some embodiments. The STUFF_LEN may include at least one of STUFF_LEN_MSB and STUFF_LEN_LSB.

The STUFF_LEN_MSB and the STUFF_LEN_LSB may be 5 and 8-bit fields, respectively.

The STUFF_LEN_MSB and STUFF_LEN_LSB fields may be used to represent the total length of the stuffing field. In some embodiments, the lengths of the STUFF_LEN_MSB and the STUFF_LEN_LSB are switched to each other to be 8 bits and 5 bits, respectively. Further, in some embodiments, the positions of both sides may also be switched to each other. In some embodiments, the field indicating the length of the padding may be positioned in the stuffing data area.

In the related art, the length of the padding was expressed by using first 2 bytes. However, when 64K LDPC is used, the length of the padding has a value of maximum 6370 bytes (64 k, 5/6 code rate, BCH code). Therefore, the length of the padding may be sufficiently expressed by 13 bits ($2^13$=8192 bytes).

Accordingly, the PAD_LEN proposed in the specification may have 13 (5+8) bits.

When the length of the padding is expressed by 13 bits, spare 2 bits in first 2 bytes may remain.

In the specification, a method is provided, which allocates spare 2 bits to PAD_TYPE to signal the type when the padding area is used for another purpose (for example, the in-band signaling).

STUFF_TYPE may be referred to as PAD_TYPE in some embodiments.

The STUFF_TYPE as the 2-bit field may represent the type of the stuffing data (alternatively, the stuffing data area) as described above.

As illustrated in FIG. 38, when the STUFF_TYPE value is '00', the stuffing data area may include only the stuffing data.

When the STUFF_TYPE value is '01', specific-type in-band signaling information may be included in the stuffing data area together with the stuffing data.

When the STUFF_TYPE value is '10', another-type in-band signaling information may be included in the stuffing data area together with the stuffing data.

When the STUFF_TYPE value is '11', both the specific-type and another-type in-band signaling information may be included in the stuffing data area together with the stuffing data.

Herein, the specific-type in-band signaling information may mean 'in-band A' and the another-type in-band signaling information may mean 'in-band B'.

This is just one embodiment and the type indicated by the STUFF_TYPE value may be changed by various schemes.

Further, the STUFF_TYPE may indicate the BB frame payload and the configuration of the payload. For example, the STUFF_TYPE may indicate the position of a normal first packet which is not cut in the payload.

As proposed in the specification, when the signaling is performed in the stuffing field, the in-band signaling may be inserted into a plurality of other frames. Further, this case may be distinguished from the case in which only the padding is included without the in-band signaling.

The STUFF_TYPE may be positioned at the BB frame header in some embodiments.

Alternatively, as described in the embodiment, the STUFF_TYPE may be positioned in the stuffing field. In some embodiments, the length of the STUFF_TYPE may be changed.

The values of the STUFF_TYPE may be switched meanings to each other depending on the designer.

For example, a meaning represented by 00 and a meaning represented by 11 may be switched to each other. Further, a meaning represented by 10 and a meaning represented by 01 may be switched to each other.

All of the stuffing data may have the value of 0 or 1 in some embodiments.

Hereinafter, case #1 to case #6 illustrated in FIG. 38 will be described in detail.

(1) Case #1 illustrates a case where stuffing data and in-band signaling are not included in the BB frame.

In this case, the STUFFI field may be set to '0'. Accordingly, in the structure of the BB frame, the data area, that is, the payload may be positioned next to the BB frame header.

(2) Case #2 illustrates a case where a stuffing field of 1 byte exists in the BB frame and the in-band signaling does not exist.

In this case, the STUFFI field may be set to '1'. That is, the BB frame includes a stuffing field and the stuffing field may have a size of 1 byte.

Here, the first bit of the stuffing field represents a STUFF_ONE field, and has a value of '1' because the size of the stuffing field is 1 byte.

The remaining 7 bits of the stuffing field may have a value of 1111111.

Accordingly, the stuffing field of 1 byte may be expressed by 11111111.

(3) Case #3 illustrates a case where a stuffing field of more than 1 byte exists in the BB frame and the in-band signaling does not exist.

That is, the stuffing field may be 2 byte or larger than 2 bytes.

Since the stuffing field exists, the STUFFI field may be set to '1'.

The stuffing field may have the stuffing field header of 2 bytes. The first bit of the first byte of the stuffing field header corresponds to a STUFF_ONE field.

The STUFF_ONE field may be set to a value of '0' because the size of the stuffing field is larger than 1 byte.

The first bit of the first byte of the stuffing field header corresponds to a STUFF_TYPE field.

Since only the stuffing data exists in the stuffing data area of the BB frame, as described above, the STUFF_TYPE may have a value of 00.

In the drawing, as another exemplary embodiment, a case where the STUFF_TYPE has a value of 11 is illustrated.

That is, this case is the case where only the stuffing data exists in the stuffing data area of the BB frame, and the STUF_TYPE field may be indicated as the value of 11.

Thereafter, STUFF_LEN_MSB and STUFF_LEN_LSB of the stuffing field header may have length information of the stuffing field. As described above, the length of the stuffing field may be expressed by using a total of 13 bits. After the STUFF_LEN_MSB and the STUFF_LEN_LSB, the stuffing data area may be positioned. In this case, only the stuffing data may be positioned in the stuffing data area.

(4) Case #4 illustrates a case where a stuffing field of more than 1 byte exists in the BB frame and the in-band signaling exists.

In this case, the stuffing data and in-band A signaling may exist in the stuffing data area of the BB frame.

The in-band A signaling may mean a specific type of in-band signaling described above. In this case, because the stuffing field exists, STUFFI may have a value of 1.

The first bit of the first byte of the stuffing field header is the STUFF_ONE field and may have a value of '0' because the size of the stuffing field is larger than 1 byte.

Second and third bits of the first byte of the stuffing field header may be the aforementioned STUFF_TYPE field.

Since only the in-band A signaling exists in the stuffing data area of the BB frame, as described above, the STUFF_TYPE may have a value of 10. According to an exemplary embodiment, the value may also be 01.

Next, STUFF_LEN_MSB and STUFF_LEN_LSB of the stuffing field header may have length information of the stuffing field. As described above, the length of the stuffing field may be expressed by using a total of 13 bits. After the STUFF_LEN_MSB and the STUFF_LEN_LSB, the stuffing data area may be positioned. In this case, the in-band A signaling in addition to the stuffing data may exist in the stuffing data area of the BB frame.

(5) Case #5 illustrates a case where a stuffing field of more than 1 byte exists in the BB frame and in-band B signaling exists.

In this case, the stuffing data and the in-band B signaling may exist in the stuffing data area of the BB frame.

The in-band B signaling may mean a different type of in-band signaling described above. In this case, because the stuffing field exists, STUFFI may have a value of 1.

The first bit of the first byte of the stuffing field header is the STUFF_ONE field and may have a value of '0' because the size of the stuffing field is larger than 1 byte.

Second and third bits of the first byte of the stuffing field header may be the aforementioned STUFF_TYPE field.

Since only the in-band B signaling exists in the stuffing data area of the BB frame, as described above, the STUFF_TYPE may have a value of 01. According to an exemplary embodiment, the value may also be 10.

Next, STUFF_LEN_MSB and STUFF_LEN_LSB of the stuffing field header may have length information of the stuffing field. As described above, the length of the stuffing field may be expressed by using a total of 13 bits. After the STUFF_LEN_MSB and the STUFF_LEN_LSB, the stuffing data area may be positioned. In this case, the in-band B signaling in addition to the stuffing data may exist in the stuffing data area of the BB frame.

(6) Case #6 illustrates a case where a stuffing field of more than 1 byte exists in the BB frame and in-band A and B signaling exist.

In this case, all of the stuffing data and the in-band A and B signaling may exist in the stuffing data area of the BB frame.

In this case, STUFFI may have a value of '1'. The first bit of the first byte of the stuffing field header is the STUFF_ONE field and may have a value of '0' because the size of the stuffing field is larger than 1 byte. Second and third bits of the first byte of the stuffing field header may be the aforementioned STUFF_TYPE field. Since the in-band A and B signaling exist in the stuffing data area of the BB frame, as described above, the STUFF_TYPE may have a value of 11.

In the drawing, as another exemplary embodiment, a case where the STUFF_TYPE has a value of 11 is illustrated. That is, this case is the case where all the in-band A and B signaling exist in the stuffing data area of the BB frame, and the STUF_TYPE field may be indicated as a value of 00.

Next, STUFF_LEN_MSB and STUFF_LEN_LSB of the stuffing field header may have length information of the stuffing field. As described above, the length of the stuffing field may be expressed by using a total of 13 bits.

After the STUFF_LEN_MSB and the STUFF_LEN_LSB, the stuffing data area may be positioned. In this case, the in-band A and B signaling in addition to the stuffing data may exist in the stuffing data area.

FIG. 39 is a diagram illustrating another example of the BB frame structure proposed in the specification.

FIG. 39A may illustrate a BB frame in the case where only the data exists without padding, that is, the stuffing data.

STUFFI of the BB frame header may have a value of 0. A payload may be positioned immediately after the BB frame header without the stuffing field. The case may correspond to Case #1 of FIG. 38.

FIG. 39B may be a case of having padding of 1 byte.

In this case, STUFFI of the BB frame header may have a value of 1. The first bit of the first byte may have a value of 1 as STUFF_ONE. This may mean that the padding is 1 byte. In FIG. 39, each bit of the padding may have a value of 11111111 (0xFF). Alternatively, according to an exemplary embodiment, each bit may have a value of 10000000. The case may correspond to Case #2 of FIG. 38.

FIG. 39C may be a case of having padding of n byte.

In this case, STUFFI of the BB frame header may have a value of 1. Further, STUFF_ONE may have a value of 0. STUFF_TYPE may indicate that only the stuffing data is used without in-band signaling.

That is, according to an exemplary embodiment, STUFF_TYPE may have a value of 00.

Next, the remaining 13 bits may indicate that the length of the stuffing field is n bytes. The 13 bits may be STUFF_LEN_MSB and STUFF_LEN_LSB. Stuffing data may be positioned after the STUFF_LEN_MSB and the STUFF_LEN_LSB. The case may correspond to a case where the stuffing field is 3 bytes or more in Case #3 of FIG. 38.

FIG. 38D may be a case of having padding of n bytes in addition to the in-band A signaling.

In this case, STUFFI of the BB frame header may have a value of 1. Further, STUFF_ONE may have a value of 0. STUFF_TYPE may indicate that the in-band A signaling is used.

That is, according to an exemplary embodiment, STUFF_TYPE may have a value of 01. The value itself of STUFF_TYPE may be changed as described above. Next, the remaining 13 bits may indicate that the length of the stuffing field is n bytes. The 13 bits may be STUFF_LEN_MSB and STUFF_LEN_LSB. The in-band A signaling may be positioned after the STUFF_LEN_MSB and the STUFF_LEN_LSB. The case may correspond to Case #4 of FIG. 38.

FIG. 38E may be a case of having padding of n bytes in addition to the in-band B signaling.

In this case, STUFFI of the BB frame header may have a value of 1. Further, STUFF_ONE may have a value of 0. STUFF_TYPE may indicate that the in-band B signaling is used.

That is, according to an exemplary embodiment, STUFF_TYPE may have a value of 10. The value itself of STUFF_TYPE may be changed as described above.

Next, the remaining 13 bits may indicate that the length of the stuffing field is n bytes.

The 13 bits may be STUFF_LEN_MSB and STUFF_LEN_LSB. The in-band B signaling may be positioned after the STUFF_LEN_MSB and the STUFF_LEN_LSB. The case may correspond to Case #5 of FIG. 38.

FIG. 38F may be a case of having padding of n bytes in addition to the in-band A and B signaling.

In this case, STUFFI of the BB frame header may have a value of 1. Further, STUFF_ONE may have a value of 0. STUFF_TYPE may indicate that the in-band A and B signalings are used.

That is, according to an exemplary embodiment, STUFF_TYPE may have a value of 11. The value itself of STUFF_TYPE may be changed as described above. Next, the remaining 13 bits may indicate that the length of the stuffing field is n bytes. The 13 bits may be STUFF_LEN_MSB and STUFF_LEN_LSB. The in-band A and B signalings may be positioned after the STUFF_LEN_MSB and the STUFF_LEN_LSB. The case may correspond to Case #6 of FIG. 38.

FIG. 40 is a diagram illustrating another example of the BB frame structure proposed in the specification.

FIG. 40 illustrates an example of a BB frame structure in the case where a stuffing field is positioned at an end of the BB frame (next to the payload).

The BB frame includes a BBF header and a BB frame payload.

The BBF header is inserted before the BB frame payload in order to represent a format of a BBF data field.

The BBF header may have a fixed length of 2 bytes.

The BBF header includes a STUFFI field corresponding to an indicator representing whether stuffing and padding exists in the BB frame. The STUFFI field may be expressed by 1 bit.

The BB frame payload may include a stuffing field and a payload.

The stuffing field is included in a case where all user packets (Ups) are not filled in the BB frame payload.

As an example, when the STUFFI field is set to '1', the BB frame payload may include the stuffing field.

The payload means an area where the UP is included.

The stuffing field may be configured by a stuffing header field (alternatively, stuffing field header) and stuffing data (area).

The stuffing data area may be expressed by the stuffing data field or the stuffing data.

The stuffing data, in-band signaling information, and the like may be included in the stuffing data area.

The stuffing header field may include a STUFF_ONE field, a STUFF_TYPE field, and a STUFF_LEN field.

The STUFF_LEN field represents a length of the entire stuffing field including the stuffing header field and may include a STUFF_LEN_MSB field and a STUFF_LEN_LSB field. The STUFF_LEN field is expressed by 13 bits.

The STUFF_ONE field means a field of 1 bit representing whether the length of the stuffing field is 1 byte or not.

As an example, when the STUFF_ONE field is set to '1', the length of the stuffing field is 1 byte. In this case, the STUFF_LEN_LSB field is not included in the stuffing field, that is, the STUFF_LEN field.

When the STUFF_ONE field is set to '0', the length of the stuffing field is larger than 1 byte. In this case, 2 bytes of the stuffing header is used for representing the type and the length of the stuffing data.

That is, the STUFF_TYPE field represents the type of the stuffing data and may be expressed by 2 bits.

The following Table 34 illustrates an example of the STUFF_TYPE field of FIG. 40.

TABLE 34

| STUFF_TYPE | Stuffing Data type |
|---|---|
| 00 | Stuffing data only |
| 01 | IN-BAND A is used with Stuffing data |
| 10 | IN-BAND B is used with Stuffing data |
| 11 | Both IN-BAND A and IN-BAND B are used with stuffing data |

Referring to Table 34 and FIG. 40, when the STUFF_TYPE field is set to (1) '00', the stuffing data area may be used as only the stuffing data, when the STUFF_TYPE field is set to (2) '01', the stuffing data area may be used as the In-Band A Signaling information and the stuffing data, when the STUFF_TYPE field is set to (3) '10', the stuffing data area may be used as the In-Band B Signaling information and the stuffing data, and when the STUFF_TYPE field is set to (4) '11', the stuffing data area may be used as the In-Band B Signaling information and the stuffing data.

In Table 34, In-Band A may be In-Band-ISSY, and In-Band B may be In-Band-PLS.

The STUFF_LEN_MSB field represents a most significant bit (MSB) value of the entire stuffing field length including the stuffing header field and is expressed by 5 bits.

As an example, when the STUFF_ONE field is set to '1', the STUFF_LEN_MSB field may be expressed by '11111'. Alternatively, the STUFF_LEN_MSB field may be expressed by '00000'.

The STUFF_LEN_LSB field represents a least significant bit (LSB) value of the entire stuffing field length and is expressed by 8 bits.

The stuffing data field may include stuffing and/or in-band signaling field(s).

Here, the 'stuffing and/or in-band signaling' means stuffing, in-band signaling or stuffing, and in-band signaling.

That is, the expression of 'A and/or B' may be the same as the meaning of at least one of A or B.

Referring to FIG. 40, the eighth bit of the Nth byte of the stuffing field represents the STUFF_ONE field, sixth and seventh bits of the Nth byte represent the STUFF_TYPE field, first to fifth bits of the Nth byte of the stuffing field represent the STUFF_LEN_LSB field, and the N−1-th byte of the stuffing field represents the STUFF_LEN_MSB field.

Further, the data UP, the stuffing data, the in-band A data, the in-band B data, or the in-band A data and B data from the (N−2)th byte of the stuffing field may be represented.

A more detailed description for Case #1 to Case #6 of FIG. 40 will refer to the description of Case #1 to Case #6 of FIG. 38 which corresponds to each case of FIG. 40.

The frame structure of FIG. 40 may perform the same function as the frame structure of FIG. 38.

Like the BB frame structure illustrated in FIG. 40, when the stuffing field is positioned at the end of the BB frame, the receiving apparatus may directly receive the user packet (UP) without checking the stuffing, and as a result, the access time to the UP is shorter than that in the BB frame structure illustrated in FIG. 38.

FIG. 41 is a diagram illustrating still another example of the BB frame structure proposed in the specification.

FIG. 41 illustrates various BB frame structures in the case where the stuffing field is positioned at the last of the BB frame (alternatively, positioned next to the payload and the FEC frame).

Since the frame structure of FIG. 41 is different from the frame structure of FIG. 39 in only the position of the stuffing field but the same as the frame structure of FIG. 39 in all other parts, the detailed description of FIG. 41 refers to FIG. 39.

Figure 42:
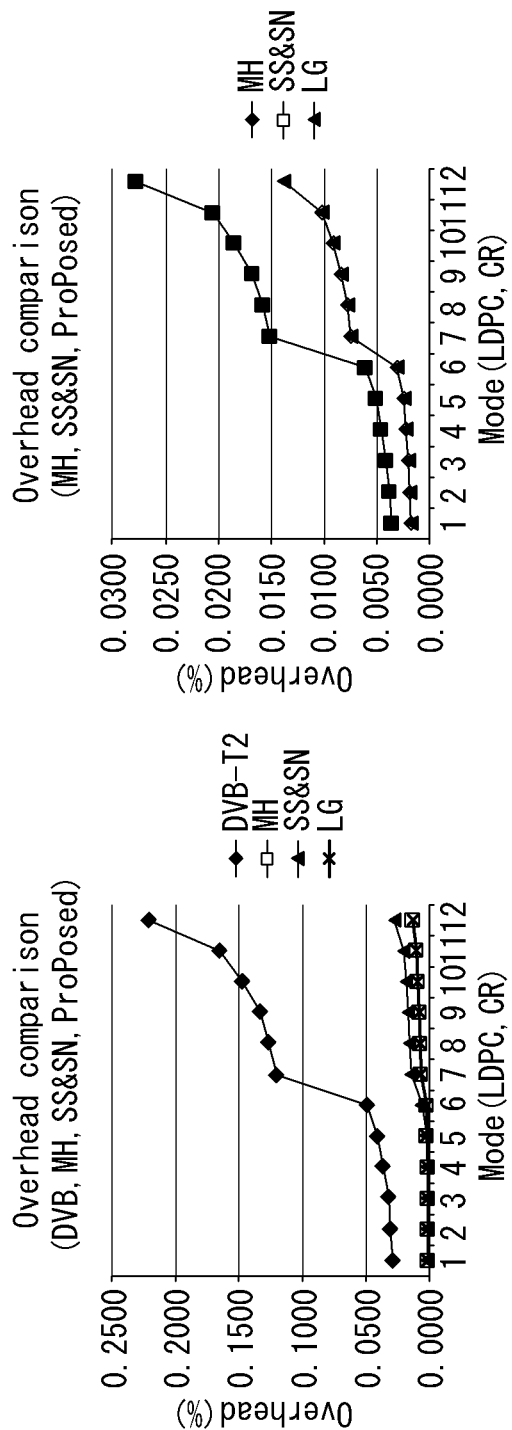
FIG. 42 illustrates comparison of a result of calculating overhead for transmission of a BB frame in various BB frame structures.

FIG. 42 is a diagram illustrating comparison of a result of calculating overhead for transmission of a BB frame in various BB frame structures.

A graph represented by DVB-T2 may be an overhead graph in the related art described above. The DVB-T2 may mean a terrestrial television broadcasting system-related standard of digital video broadcasting (DVB). The DVB-T2 may mean a next-generation terrestrial broadcasting-related standard in Europe. The graph represented by the DVB-T2 may be a graph obtained by calculating the overhead in the BB frame according to this standard technique.

A graph represented by MH may be another overhead graph in the related art described above. The MH may mean a mobile/handheld DTV system-related standard of consumer electronics association (CEA). The MH may mean a mobile handheld-related standard in North America. The graph represented by the MH may be a graph obtained by calculating the overhead in the BB frame according to this standard technique.

A graph represented by SS&SN may be yet another overhead graph in the related art described above. The SS&SN may mean one of the related art. The graph obtained by calculating the overhead when the BB frame and the BB frame header are configured by the method proposed in the related art is illustrated as the graph represented by the SS&SN.

The following Table 35 is a table illustrating a result of calculating the overhead upon the transmission of each BB frame.

The overhead may mean an overhead of a field representing a length of the data field.

In the related art, since a field of 2 bytes is used for each BB frame, the overhead may be a maximum of 0.22%.

In another related art, since only the field of 1 bit is used, the overhead may be just a maximum of 0.0139%. The overhead may be the lowest.

In yet another related art, a field of 2 bits may be used. In this case, the overhead may be two times larger than that of another related art.

A graph represented by LG may be an overhead graph according to the present invention. In the present invention, only the field of 1 bit may be used for signaling of the stuffing field. Accordingly, the overhead may be a minimum. Further, there is an advantage in that a residual field of 2 bits is additionally prepared to be used to indicate a type of the in-band signaling and the like. The present invention may support a structure which is usable as other uses, such as representing a configuration of the BB frame, by using the residual field.

Figure 43:
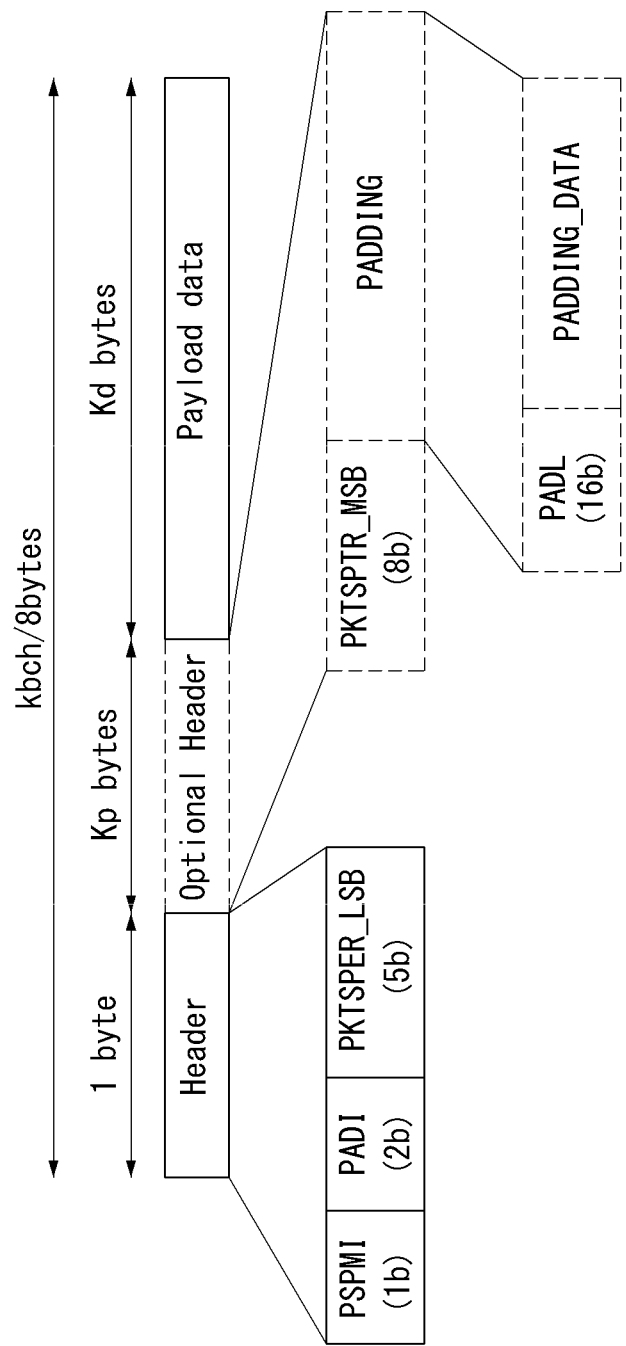
FIG. 43 illustrates one example of a BB frame structure in the related art.

FIG. 43 illustrates one example of a BB frame structure in the related art.

As illustrated in FIG. 43, the BB frame includes a header, an optional header, and payload data.

The header includes a packet start pointer mode indicator (PSPMI) field, a padding indicator (PADI) field, and a packet start pointer low significant bits (PKTSPTR_LSB) field.

The PSPMI field means a flag field having a size of 1 bit representing whether a packet start pointer (PKTSPTR) field is a short mode or a long mode.

The PKTSPTR field may be the same concept as a SYNCD field.

That is, the PSPMI field means a flag representing whether the length of the PKTSPTR field is small or large.

The PKTSPTR_LSB field represents 5 LSB bits of the PKTSPTR field of 13 bits.

The Optional Header may include a packet start pointer most significant bits (PKTSPTR_MSB) field and a padding field.

The PKTSPTR_MSB field represents 8 MSB bits of the PKTSPTR field of 13 bits.

Further, the padding field may include a padding data length (PADL) field and a PADDING_DATA field.

The PADL field represents a length of the padding data field and has a size of 15 bits.

The PADDING_DATA field has a variable length and represents padding information.

As illustrated in FIG. 43, the BB frame structure calculates the length of the data field in the receiving device by transmitting the length of the PADDING_DATA field without using information (for example, DFL) representing the length the data field, in order to express the length of the (payload) data field of a maximum of 13 bytes.

TABLE 35

| FEC | 64k | | | | | | 16k | | | | | |
| --- | --- | --- | --- | --- | --- | --- | --- | --- | --- | --- | --- | --- |
| CR | 5/6 | 4/5 | 3/4 | 2/3 | 3/5 | 1/2 | 5/6 | 4/5 | 3/4 | 2/3 | 3/5 | 1/2 |
| Kbch | 53840 | 51648 | 48408 | 43040 | 38688 | 32208 | 13152 | 12600 | 11880 | 10800 | 9720 | 7200 |
| VB-T2 | 0.0297 | 0.0310 | 0.0331 | 0.0372 | 0.0414 | 0.0497 | 0.1217 | 0.1270 | 0.1347 | 0.1481 | 0.1646 | 0.2222 |
| H | 0.0019 | 0.0019 | 0.0021 | 0.0023 | 0.0026 | 0.0031 | 0.0076 | 0.0079 | 0.0084 | 0.0093 | 0.0103 | 0.0139 |
| S&SN | 0.0037 | 0.0039 | 0.0041 | 0.0046 | 0.0052 | 0.0062 | 0.0152 | 0.0159 | 0.0168 | 0.0185 | 0.0206 | 0.0278 |
| G | 0.0019 | 0.0019 | 0.0021 | 0.0023 | 0.0026 | 0.0031 | 0.0076 | 0.0079 | 0.0084 | 0.0093 | 0.0103 | 0.0139 |

Here, the length of the padding field corresponds to the payload data size of the BB frame—the length of the data field.

When the padding field does not exist in the BB frame, the data field length (DFL) is calculated by using the BB frame size.

When the padding field exists in the BB frame, the PADI of 2 bits is included in the BB frame header to indicate the padding length.

More efficiently, in order to transmit the baseband frame (BBF) to the FEC block, that is, in order to reduce the overhead for the transmission of the BB frame header, the PKTSPRT field is divided into PKTSPTR_LSB and PKTSPTR_MSB to operate.

That is, the PKTSPTR field can support up to the size of 2 bytes, but when the length of the PKTSPTR field is small (≤31 byte), only the PKTSPTR_LSB may be used, and as a result, the transmission size of the PKTSPTR field may be shortened to 1 byte.

However, since the length of the PKTSPTR_LSB is small as 5 bits, only when the size of the PKTSPTR field is 31 byte or less, there is a disadvantage in that the BBF header of 1 byte can be configured.

As described in FIG. 35, the existing BB frame is used by allocating the DFL to each BB frame header in order to indicate the length of the data field of the BB frame to the receiving device (alternatively, receiving terminal, and as a result, the overhead when transmitting the BB frame to the FEC block largely occurs.

Accordingly, a new BB frame structure for enhancing transmission efficiency of the BB frame header and adding a new function of an error check will be described in detail.

That is, this specification provides a method of entirely reducing a size of the BB frame header by controlling the size of the SYNCD field included in the BB frame header, a method of performing an error check by using a residual 1 bit in the BB frame header, and the like.

Hereinafter, the methods and the BB frame structure proposed in this specification operate in a BB frame header insertion block of the transmitting device and a BB frame deader parser block in the receiving device.

Figure 44:
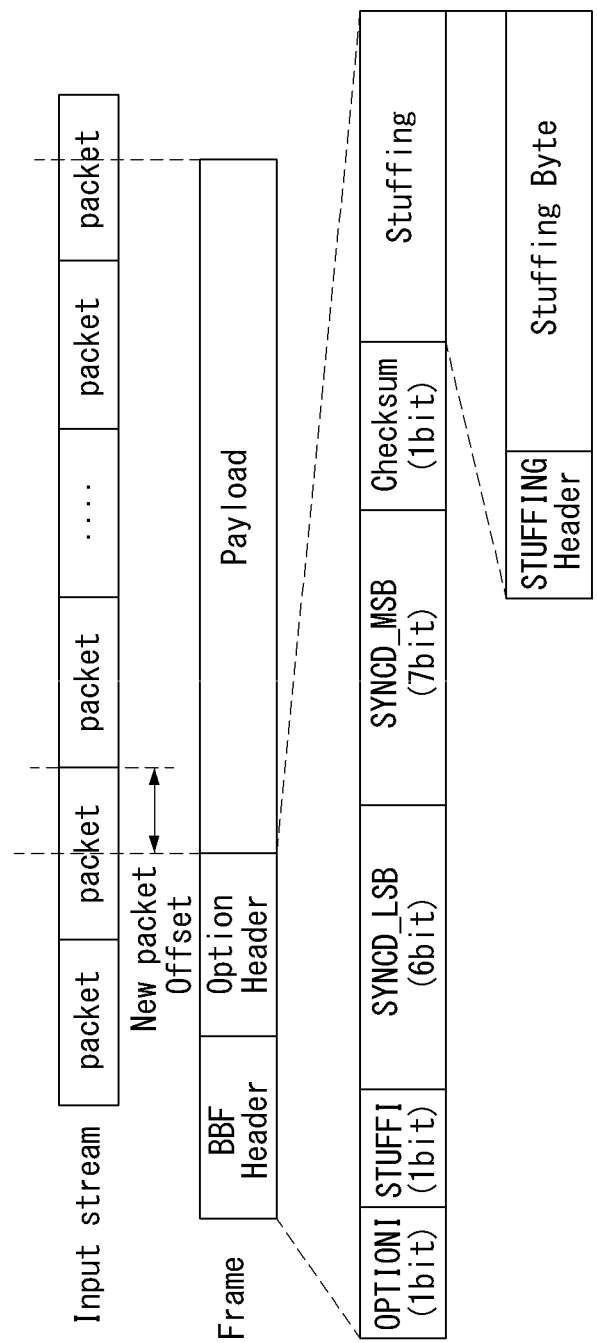
FIG. 44 illustrates one example of a BB frame structure proposed in the specification.

FIG. 44 is a diagram illustrating an example of the BB frame structure proposed in the specification.

An input stream of FIG. 44A forms a BB frame structure of FIG. 44B through a mode adaptation module of an input formatting module.

As illustrated in FIG. 44, the input stream including a plurality of packets is sliced or mapped to the payload through the mode adaptation module, and a header including information on the payload is added before the payload.

The payload may be expressed by a BB frame data field.

The header may include at least one of an OPTIONI field, a STUFFI field, a SYNCD_LSB field, a SYNCD_MSB field, a Checksum field, and a Stuffing field.

As described above, the Stuffing field may include a Stuffing Header field and a Stuffing Byte field.

The Stuffing Byte field may be expressed by the stuffing data field or the stuffing data area.

The BB frame header including the OPTIONI field, the STUFFI field, and the SYNCD_LSB field may be defined, and the Option Header including the SYNCD_MSB field and the Checksum field may be defined.

FIG. 44 illustrates that the BB frame header and the Option header are defined.

Further, the stuffing field may be included in the header or may not be included in the header.

When the stuffing field is not included in the header, a BB frame payload may be configured together with the payload.

The stuffing field may be positioned before the payload (FIG. 44) or after the payload.

The SYNCD field may represent a distance from a start of the data field to a start of the first transmitted UP starting in the data field.

Here, the SYNCD field may be divided into a SYNCD_LSB field and a SYNCD_MSB field and has a size of 13 bits.

The SYNCD_LSB field has a size of 6 bits as a value representing the LSB of the SYNCD and may express the SYNCD of a maximum of 63 bytes.

As illustrated in FIG. 44, when the header is divided in to the BB frame header and the Option Header, the SYNCD_LSB field may be included in the BB frame header.

Further, the SYNCD_MSB field has a size of 7 bits as a value representing the MSB of the SYNCD.

As illustrated in FIG. 44, when the header is divided in to the BB frame header and the Option Header, the SYNCD_MSB field may be included in the Option header.

The usage of the SYNCD_MSB field is determined by the OPTIONI field.

The OPTIONI field represents whether a position of a packet which newly starts among the packets transmitted through the payload is expressed by SYNCD_LSB of 6 bits.

As an example, when the OPTIONI field is set to '0', the OPTIONI field represents that a position of a packet which newly starts among the packets transmitted through the payload may be expressed by SYNCD_LSB of 6 bits.

When the OPTIONI field is set to '1', the OPTIONI field represents that a position of a packet which newly starts among the packets transmitted through the payload may not be expressed by SYNCD_LSB of 6 bits.

Accordingly, when the OPTIONI field is set to '1', the OPTIONI field needs to represent a position of a packet which newly starts in the payload by using the SYNCD_LSB field of 6 bits of the SYNCD_MSB field of 7 bits.

Here, when the SYNCD_MSB field is included in the Option header, the Option Header is include din the BB frame.

The STUFFI field has a size of 1 bit and means an indicator representing whether the stuffing field (alternatively, stuffing byte) or the in-band signaling field exists in the BB frame.

The Check-sum field may be used for an error check of the BB frame header or the OPTIONI field, with the size of 1 bit.

The Check-sum field may be included in the Option Header when the header is divided into the BB frame header and the Option Header.

As described above, the Stuffing field includes a STUFFING Header and a STUFFING Byte.

The SYNCD_LSB field of FIG. 44 and the PKTSPTR_LSB field of FIG. 43 may be used as the same meaning.

Here, the size of the SYNCD_LSB field of FIG. 44 proposed in this specification is increased to 6 bits by 1 bit, while the size of the PKTSPTR_LSB field is 5 bits.

That is, the length of the SYNCD which may be expressed by the SYNCD_LSB field of 6 bits becomes about two times to 63 ($2^6-1$) bytes, while the length of the PKTSPTR which may be expressed by the PKTSPTR_LSB field of 5 bits is a maximum of 31 ($2^5-1$) bytes.

That is, the case where the SYNCD_MSB field is added to the header or the BB frame header or the Option header by controlling the size of the SYNCD_LSB field proposed in this specification is reduced, and as a result, the overhead for the transmission of the BB frame may be reduced.

For example, it is assumed that a MPEG2-TS stream of 188 bytes is transmitted.

(1) In the case of the BB frame structure of FIG. 43, a case where only the PKTSPTR_LSB field is included in the BB frame header in order to transmit a TS packet of 188 bytes is included (that is, a case where the PKTSPTR length has a value of 31 bytes or less) corresponds to about 16.49% (31 bytes/188 bytes).

That is, the BB frame corresponding to 16.49% includes a header having a size of 1 byte, and the BB frame corresponding to remaining 83.51% includes a header having a size of 2 bytes.

Here, the header represents a format related with the payload, and may mean the BB frame header or mean including the BB frame header and the Option header.

Accordingly, the BB frame averagely includes a header having a size of 1.83 bytes.

(2) On the other hand, in the case of the BB frame structure of FIG. 44, a case where only the SYNCD_LSB field is included in the BB frame header in order to transmit a TS packet of 188 bytes is included (that is, a case where the SYNCD length has a value of 63 bytes or less) corresponds to about 33.51% (63 bytes/188 bytes).

That is, the BB frame corresponding to 33.51% includes a header having a size of 1 byte, and the BB frame corresponding to remaining 66.49% includes a header having a size of 2 bytes.

Accordingly, the BB frame averagely includes the BB frame header having a size of 1.66 bytes, and as a result, it can be seen that the overhead for the transmission of the BB frame may be largely reduced as compared with the case of having the BB frame structure of FIG. 43.

Further, the BB frame structure of FIG. 44 may perform an additional function which may detect an error for the header, by using 1 bit included in the Optional Header as the check-sum 1 bit of the header or the check-sum 1 bit of the OPTIONI field included in the header.

Figure 45:
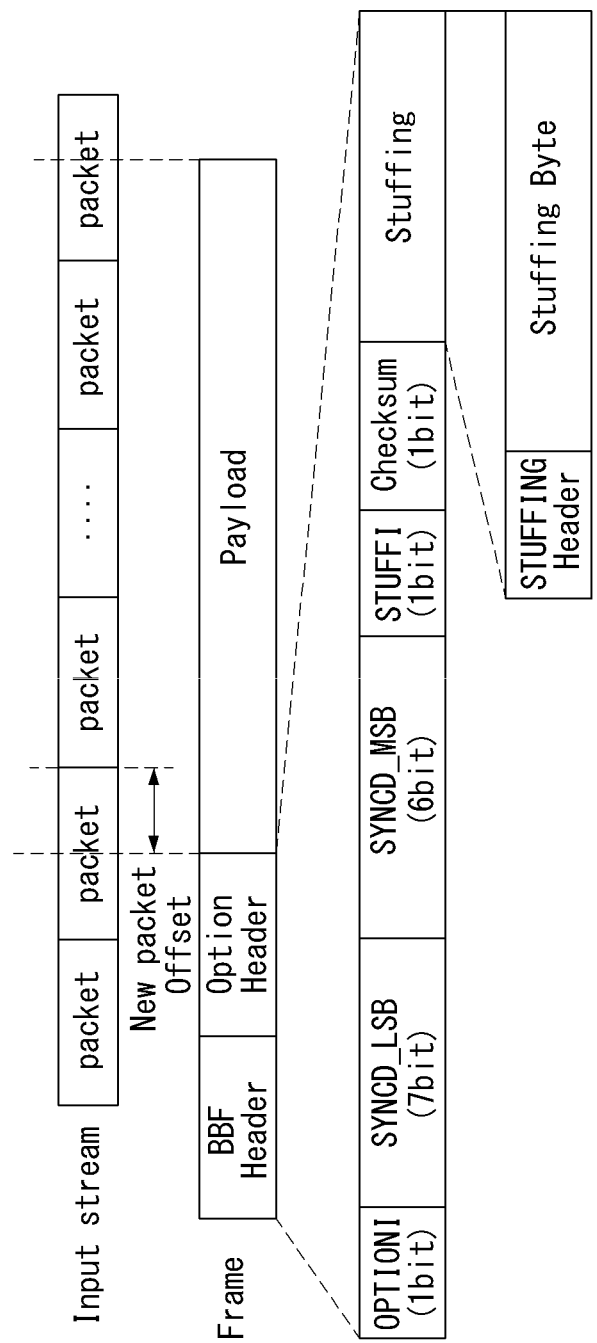
FIG. 45 illustrates another example of the BB frame structure proposed in the specification.

FIG. 45 is a diagram illustrating yet another example of the BB frame structure proposed in the specification.

The BB frame structure of FIG. 45 is different from the BB frame structure of FIG. 44 in the sizes of the SYNCD_LSB field/SYNCD_MSB field and the position of the STUFFI field, but other parts thereof are the same.

Hereinafter, the description for the same parts as the BB frame structure of FIG. 44 is omitted, and the different parts will be mainly described.

The OPTIONI field and the SYNCD_LSB field are combined to be defined as the BB frame header, and the SYNCD_MSB field, the STUFFI field, and the Checksum field are combined to be defined as the Option Header.

Further, the OPTIONI field, the SYNCD_LSB field, the SYNCD_MSB field, the STUFFI field, and the Checksum field are combined to be defined as one header.

In this case, the header may also be expressed by the BB frame header.

As yet another example, the STUFFI field and the check-sum field may be combined to a specific field.

In this case, the specific field may be used as a value indicating whether the stuffing field is present in the BB frame.

The specific field may be expressed as EXT_I field and may have a size of 2 bits.

As one example, the specific field value of (1) '00' indicates the case where no stuffing is present in the BB frame, (2) '01' indicates the case where the stuffing of 1 byte is present in the BB frame, (3) '10' indicates the case where the stuffing of 1 bytes is present in the BB frame, and (4) '11' indicates the case where the stuffing of 3 bytes or more is present in the BB frame.

The STUFF_TYPE field and the STUFF_LEN field which may be defined according to the specific field value, and meanings thereof will be described as an example.

When the specific field (e.g., EXT_I field) value is '00', since no stuffing is present, the STUFF_TYPE field and the STUFF_LEN field are not present in the stuffing field.

When the specific field value '01', the STUFF_TYPE field value is '000', and the STUFF_LEN field value is '00000', the stuffing of 1 byte is included in the BB frame (alternatively, the stuffing field).

When the specific field value '10', the STUFF_TYPE field value is '000', and the STUFF_LEN field value is '00000', the stuffing of 2 bytes is included in the BB frame (alternatively, the stuffing field). When the specific field value '110', the STUFF_TYPE field value is '000', and the STUFF_LEN field value is 'stuff_len', the stuffing of 3 bytes or more is included in the BB frame (alternatively, the stuffing field).

When the specific field value '11', the STUFF_TYPE field value is '001', and the STUFF_LEN field value is 'stuff_len', the stuffing and in-band A signaling are included in the BB frame (alternatively, the stuffing field).

The in-band A may be INBAND_ISSY.

When the specific field value '11', the STUFF_TYPE field value is '010', and the STUFF_LEN field value is 'stuff_len', the stuffing and in-band B signaling are included in the BB frame (alternatively, the stuffing field).

The in-band B may be INBAND_SIG.

When the specific field value '11', the STUFF_TYPE field value is '111', and the STUFF_LEN field value is '00000', the stuffing and other information are included in the BB frame (alternatively, the stuffing field).

Further, the STUFF_LEN field value may be divided into a STUFF_LEN_LSB field (5 bits) value and a STUFF_LEN_MSB field (8 bits) value.

As yet another example, when the specific field value '01', the STUFF_TYPE field value is '000', the STUFF_LEN_LSB field value is '00000', and the STUFF_LEN_MSB field value is 'Not exist', the stuffing of 1 byte is included in the BB frame (alternatively, the stuffing field).

When the specific field value '10', the STUFF_TYPE field value is '000', the STUFF_LEN_LSB field value is '00000', and the STUFF_LEN_MSB field value is '00000000', the stuffing of 2 bytes is included in the BB frame (alternatively, the stuffing field).

When the specific field value '11', the STUFF_TYPE field value is '000', the STUFF_LEN_LSB field value is 'stuff_len_lsb', and the STUFF_LEN_MSB field value is 'stuff_len_msb', the stuffing of 3 bytes or more is included in the BB frame (alternatively, the stuffing field).

When the specific field value '11', the STUFF_TYPE field value is '001', the STUFF_LEN_LSB field value is 'stuff_len_lsb', and the STUFF_LEN_MSB field value is 'Not exist', only the in-band A signaling is included in the BB frame (alternatively, the stuffing field). Preferably, only the in-band A signaling is included in the stuffing field only when the in-band A signaling may be expressed by 32 bytes. The in-band A may be the INBAND_ISSY.

When the specific field value '11', the STUFF_TYPE field value is '010', the STUFF_LEN_LSB field value is 'stuff_len_lsb', and the STUFF_LEN_MSB field value is 'stuff_len_msb', the stuffing and the in-band A signaling are included in the BB frame (alternatively, the stuffing field).

When the specific field value '11', the STUFF_TYPE field value is '111', the STUFF_LEN_LSB field value is 'stuff_ len_lsb', and the STUFF_LEN_MSB field value is 'stuff_len_msb', the stuffing and other information are included in the BB frame (alternatively, the stuffing field).

As illustrated in FIG. 45, the size of the SYNCD_LSB field is 7 bits, and the size of the SYNCD_MSB field is 6 bits.

Like FIG. 45, when the size of the SYNCD_LSB field is 7 bits, a length of the larger number of SYNCDs may be expressed.

That is, when the size of the SYNCD_LSB field is 7 bits, an expressible length of the SYCND is 127 ($2^7-1$) bytes and becomes about four times larger than the case (31 byte) of FIG. 44.

Similarly, it is assumed that a MPEG2-TS stream of 188 bytes is transmitted.

In the case of the BB frame structure of FIG. 45, a case where only the SYNCD_LSB field is included in the BB frame header in order to transmit a TS packet of 188 bytes is included (that is, a case where the SYNCD length has a value of 127 bytes or less) corresponds to about 67.55% (127 bytes/188 bytes).

That is, the BB frame corresponding to 67.55% includes a header having a size of 1 byte, and the BB frame corresponding to remaining 32.45% includes a header having a size of 2 bytes.

Accordingly, the BB frame averagely includes a header having a size of 1.32 bytes, and as a result, the overhead for the transmission of the BB frame may be largely reduced as compared with the case of having the BB frame structures of FIGS. 43 and 44.

Similarly, even in the BB frame structure of FIG. 45, the error check for the header may be additionally performed by using residual 1 bit existing in the header as the Checksum (as the check-sum 1 bit of the header or as the check-sum of the OPTIONI field.

In the specification, methods and apparatuses for receiving and transmitting a broadcast signal are used.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

What is claimed is:

1. A method for transmitting a broadcast signal, comprising:
   formatting input streams into multiple physical layer pipes (PLPs);
   encoding data of the multiple PLPs;
   generating at least one signal frame by mapping the encoded data; and
   modulating the at least one signal frame using an orthogonal frequency division multiplexing (OFDM) scheme and transmitting the broadcast signal comprising the at least one modulated signal frame,
   wherein the formatting comprises
   mapping data packets to a payload of a baseband frame (BBF), and
   adding a header before the payload,
   wherein the header comprises at least one of first control information or second control information,
   wherein the second control information comprises at least one of a second control information LSB(least significant bit) field or a second control information MSB (most significant bit) field,
   wherein the first control information indicates whether the second control information is enabled to be expressed by only the second control information LSB field, and
   wherein the second control information is information related to the start position of the first data packet in the BBF.

2. The method of claim 1, wherein
the value of the second control information is offset from the start of the payload to the start of the first data packet in the BBF.

3. The method of claim 1, wherein:
the size of the second control information LSB field is 6 bits or 7 bits, and
the size of the second control information MSB field is 7 bits or 6 bits.

4. The method of claim 1, wherein:
the baseband frame comprises a stuffing field including stuffing data, and
the stuffing field is included in the baseband frame when the payload is not filled with a data packet or in-band signaling is used.

5. The method of claim 4, wherein
the header comprises a STUFFI field indicating whether the stuffing field is included in the baseband frame.

6. The method of claim 5, wherein
the STUFFI field is located subsequent to the second control information or the first control information.

7. The method of claim 4, wherein
the stuffing field comprises a stuffing header and stuffing data.

8. The method of claim 4, wherein
the stuffing field comprises at least one of a STUFF_ONE field representing whether the length of the stuffing field is 1 byte, a STUFF_TYPE field representing the type of the stuffing data, or a STUFF_LEN field representing the length of the stuffing field.

9. The method of claim 8, wherein
the STUFF_LEN field comprises at least one of a STUFF_LEN_MSB (most significant bit) field or a STUFF_LEN_LSB (least significant bit) field.

10. The method of claim 8, wherein
the stuffing data represents stuffing or in-band signaling.

11. The method of claim 9, wherein
when the length of the stuffing field is 1 byte, the STUFF_LEN_LSB field is not included in the STUFF_LEN field.

12. The method of claim 6, wherein
the stuffing field is located subsequent to the payload.

13. The method of claim 1, wherein:
the first control information is an OPTIONI field and a packet start pointer mode indicator (PSPMI), and
the second control information is a SYNCD field or a packet start pointer (PKTSPTR) field.

14. A transmission apparatus for transmitting a broadcast signal, comprising:
   an input formatting module configured to format input streams into multiple physical layer pipes (PLPs);
   a bit interleaved coding and modulation (BICM) module configured to encode data of the multiple PLPs;
   a frame building module configured to generate at least one signal frame by mapping the encoded data; and
   an orthogonal frequency division multiplexing (OFDM) generation module configured to modulate the at least one signal frame using an OFDM scheme and transmit the broadcast signal comprising the at least one modulated signal frame, wherein the input formatting module includes a baseband frame slicer module configured to map data packets to a payload of a baseband frame (BBF), and a baseband frame header insertion module configured to add a header before the payload, wherein the header comprises at least one of first control information and second control information, wherein the second control information comprises at least one of a second control information LSB (least significant bit) field or a second control information MSB (most significant bit) field, wherein the first control information indicates whether the second control information is enabled to be expressed by only the second control information LSB field, and wherein the second control information is information related to the start position of the first data packet in the BBF.

15. The apparatus of claim 14, wherein
the header further comprises an indicator that indicates whether stuffing data is included in the baseband frame.

16. The apparatus of claim 14, wherein:
the baseband frame comprises a stuffing field including stuffing data, and
the stuffing field is included in the baseband frame when the payload is not filled with a data packet or in-band signaling is used.

17. The apparatus of claim 16, wherein
the stuffing field comprises at least one of a STUFF_ONE field representing whether the length of the stuffing field is 1 byte, a STUFF_TYPE field representing the type of the stuffing data, and a STUFF_LEN field representing the length of the stuffing field.

18. The apparatus of claim 15, wherein
the value of the second control information is offset from the start of the payload to the start of the first data packet in the BBF.

19. The apparatus of claim 14, wherein:
the first control information is an OPTIONI field and a packet start pointer mode indicator (PSPMI), and
the second control information is a SYNCD field or a packet start pointer (PKTSPTR) field.

20. A receiving apparatus for receiving broadcast signals, the apparatus comprising:
a demapping and decoding module; and
an output processor module for restoring multiple physical layer pipes output from the demapping and decoding module to input streams,
wherein the output processor module comprises
a baseband frame processor block for decoding information transmitted to a header of a baseband frame and restoring the input streams by using the decoded information,
wherein the header comprises at least one of first control information and second control information,
wherein the second control information comprises at least one of a second control information LSB (least significant bit) field or a second control information MSB (most significant bit) field,
wherein the first control information indicates whether the second control information is enabled to be expressed by only the second control information LSB field, and
wherein the second control information is information that indicates offset from the start of the payload to the start of the first data packet in the BBF.

* * * * *